(12) United States Patent
Hasegawa et al.

(10) Patent No.: US 11,167,369 B2
(45) Date of Patent: *Nov. 9, 2021

(54) METHOD OF MANUFACTURING WELDED STRUCTURE OF FERRITIC HEAT-RESISTANT STEEL AND WELDED STRUCTURE OF FERRITIC HEAT-RESISTANT STEEL

(71) Applicant: Nippon Steel & Sumitomo Metal Corporation, Tokyo (JP)

(72) Inventors: Yasushi Hasegawa, Tokyo (JP); Hirokazu Okada, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 16/325,524

(22) PCT Filed: Sep. 29, 2017

(86) PCT No.: PCT/JP2017/035683
§ 371 (c)(1),
(2) Date: Feb. 14, 2019

(87) PCT Pub. No.: WO2018/062544
PCT Pub. Date: Apr. 5, 2018

(65) Prior Publication Data
US 2019/0210137 A1    Jul. 11, 2019

(30) Foreign Application Priority Data

Sep. 30, 2016 (JP) .............................. JP2016-195115

(51) Int. Cl.
*B23K 9/23* (2006.01)
*B23K 9/235* (2006.01)
(Continued)

(52) U.S. Cl.
CPC .................. *B23K 9/23* (2013.01); *B23K 9/02* (2013.01); *B23K 9/16* (2013.01); *B23K 9/235* (2013.01);
(Continued)

(58) Field of Classification Search
CPC ............ B23K 15/0033; B23K 15/0046; B23K 2101/12; B23K 2103/04; B23K 26/24;
(Continued)

(56) References Cited

FOREIGN PATENT DOCUMENTS

JP     H04350118 A    12/1992
JP     2001003120 A    1/2001
(Continued)

OTHER PUBLICATIONS

English Abstract & Family List of JP2008214753A.
(Continued)

*Primary Examiner* — Jenny R Wu
(74) *Attorney, Agent, or Firm* — Banner & Witcoff, Ltd.

(57) ABSTRACT

A method of manufacturing a welded structure of a ferritic heat-resistant steel is provided that prevents Type IV damage and that has good on-site operability without adding a high B concentration. The method includes: the step of preparing a base material including 8.0 to 12.0% Cr, less than 0.005% B and other elements; the step of forming an edge on the base material; a pre-weld heat treatment step in which a region located between a surface of the edge and a position distant from the surface of the edge by a pre-weld heat treatment depth of 30 to 100 mm is heated to a temperature of 1050 to 1200° C. and is held at this temperature for 2 to 30 minutes; a welding step in which the edge is welded to form the weld metal; and a post-weld heat treatment step in which a region located between the surface of the edge and a position distant from the surface of the edge by a distance not smaller than the pre-weld heat treatment depth and not (Continued)

greater than 100 mm is heated to a temperature of 720 to 780° C. and is held at this temperature for a time period not shorter than 30 minutes and satisfying the following formula, (1):

$$(\text{Log}(t)+12)\cdot(T+273)<13810 \quad (1).$$

6 Claims, 9 Drawing Sheets

(51) Int. Cl.
| | |
|---|---|
| C22C 38/06 | (2006.01) |
| C22C 38/00 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/02 | (2006.01) |
| C22C 38/04 | (2006.01) |
| C21D 9/50 | (2006.01) |
| C21D 9/08 | (2006.01) |
| B23K 26/24 | (2014.01) |
| B23K 9/16 | (2006.01) |
| B23K 9/02 | (2006.01) |
| B23K 26/60 | (2014.01) |
| B23K 26/70 | (2014.01) |
| B23K 26/32 | (2014.01) |
| B23K 15/00 | (2006.01) |
| B23K 103/04 | (2006.01) |
| B23K 101/12 | (2006.01) |

(52) U.S. Cl.
CPC ...... *B23K 15/0033* (2013.01); *B23K 15/0046* (2013.01); *B23K 26/24* (2013.01); *B23K 26/32* (2013.01); *B23K 26/60* (2015.10); *B23K 26/70* (2015.10); *C21D 9/08* (2013.01); *C21D 9/50* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 2101/12* (2018.08); *B23K 2103/04* (2018.08)

(58) Field of Classification Search
CPC ........ B23K 26/32; B23K 26/60; B23K 26/70; B23K 9/02; B23K 9/16; B23K 9/23; B23K 9/235; C21D 9/08; C21D 9/50; C22C 38/00; C22C 38/001; C22C 38/002; C22C 38/005; C22C 38/02; C22C 38/04; C22C 38/06; C22C 38/42; C22C 38/44; C22C 38/46; C22C 38/48; C22C 38/50; C22C 38/54

See application file for complete search history.

(56) References Cited

FOREIGN PATENT DOCUMENTS

| | | | | |
|---|---|---|---|---|
| JP | 2008214753 | A | | 9/2008 |
| JP | 2008248385 | A | | 10/2008 |
| JP | 2008266785 | A | | 11/2008 |
| JP | 2008266786 | A | | 11/2008 |
| JP | 2008291363 | A | * | 12/2008 |
| JP | 2008291363 | A | | 12/2008 |
| JP | 2009293063 | A | | 12/2009 |
| JP | 2010007094 | A | | 1/2010 |
| JP | 2016014178 | A | * | 1/2016 |
| JP | 2016014178 | A | | 1/2016 |
| JP | 2016130339 | A | | 7/2016 |

OTHER PUBLICATIONS

English Abstract & Family List of JP2008248385A.
English Abstract & Family List of JP2008266785A.
English Abstract & Family List of JP2008266786A.
English Abstract & Family List of JP2008291363A.
English Abstract & Family List of JP2009293063A.
English Abstract & Family List of JP2010007094A.
English Abstract & Family List of JP2001003120A.
English Abstract & Family List of JP2016014178A.
English Abstract & Family List of JP2016130339A.
English Abstract & Family List of JPH04350118A.

* cited by examiner

1 μm

1 μm

METHOD OF MANUFACTURING WELDED STRUCTURE OF FERRITIC HEAT-RESISTANT STEEL AND WELDED STRUCTURE OF FERRITIC HEAT-RESISTANT STEEL

RELATED APPLICATION DATA

This application is a National Stage Application under 35 U.S.C. 371 of co-pending PCT application number PCT/JP2017/035683 designating the United States and filed Sep. 29, 2017; which claims the benefit of JP application number 2016-195115 and filed Sep. 30, 2016 each of which are hereby incorporated by reference in their entireties.

TECHNICAL FIELD

The present invention relates to a method of manufacturing a welded structure of a ferritic heat-resistant steel and a welded structure of a ferritic heat-resistant steel. More particularly, the present invention relates to a welded structure of a ferritic heat-resistant steel having portions joined together by welding and to which stresses are applied for a prolonged period of time at high temperatures, such as those used in power plants or chemical plants, and a method of manufacturing such a structure.

BACKGROUND ART

As demand for energy resources continues to grow, various techniques need to be developed to generate electric power or refine fuel, which both represent indispensable energy in all industries. Especially in Japan, where resources are scarce, an early completion of development of such techniques is strongly desired. However, it is difficult to supply renewable energy on a commercial basis in a massive and stable manner, and spreading the supply of such energy presupposes techniques for reducing costs or techniques for storing energy. As such, significant reliance remains on existing energy conversion techniques, especially power plants that convert fossil fuel or nuclear fuel into electric energy, such as coal-fired thermal power plants, natural-gas direct-fired thermal power plants, and nuclear power plants. On the other hand, problems with these conventional power-generation techniques include resource life and large environmental impact; particularly, $CO_2$ emissions need to be reduced at the same time, which is an urgent problem. Further, toxic substances contained in fossil fuel, which is a major power source of vehicles, especially sulfur oxides such as $SO_x$, are likely to be subjected to ever stricter regulations, and it is desired that oil refining reactors, which are intended to solve this problem, operate at higher temperatures and under higher pressures than conventional levels.

Recently, the efficiency of thermal power generation, for example, has stagnated at about 40 to 50%, and higher efficiencies are currently desired to prevent emissions of carbon dioxide from increasing. In not only power plants but also other power generators, the thermal efficiency for energy conversion substantially depends on temperature and pressure; in power plants, the higher the temperature of steam that drives the turbine of the generator, the higher the energy conversion efficiency becomes.

Presently, steam temperatures in coal-fired thermal power plants are 620° C. at most, where a temperature increase of 100° C. is expected to increase efficiency by about 5%, and an increase of 200° C. is expected to increase efficiency by about 10%. This means that improving the efficiency of power plants for converting energy at high temperature and under high pressure may effectively provide useful techniques that can solve the above-mentioned environmental and resource problems at the same time. However, increasing the temperature of steam for driving the turbine of the generator requires improving the performance of not only parts of the turbine, but also that of the heat-resistant steel used in the heat exchanger or piping.

Furthermore, in oil refining reactors, problems presented in connection with future base materials include improving high-temperature corrosion resistance, for which demand is likely to be higher, and obtaining high-temperature strength, which is required by the nature as a pressure container. Under these circumstances, interest has been particularly increasing in increasing the performance of heat-resistant steel used at high temperatures.

Particularly important characteristics required of heat-resistant steel are creep properties; it is necessary that no creep rupture occurs for a prolonged period of time to enable the plant to operate for decades. Heretofore, assuming that the upper limit of use temperature is 600° C., research and development of 9% Cr ferritic heat-resistant steel has been conducted, where high-temperature ferritic heat-resistant steels such as KA-STBA 28 or KA-STBA 29 in accordance with the technical interpretations for thermal power generation equipment defined by the Nuclear and Industrial Safety Agency have been developed and commercialized. These ferritic heat-resistant steels have low coefficients of thermal expansion and are resistant to creep fatigue fracture or deformation, when used in piping members, caused by thermal stresses. Furthermore, they have the same weldability and operability as typical steel materials. Moreover, they contain less alloy of expensive metals such as Ni than austenitic heat-resistant steels, which are used at higher temperatures, a property that makes them more economical and thus attractive from industrial viewpoints. However, the atomic structure of iron is BCC (body-centered cubic lattice) and thus has a higher lattice constant, which causes substances to diffuse quickly at high temperatures. Thus, to provide durability for a prolonged period of time, it is physically and chemically unavoidable that ferritic heat-resistant steels are inferior to austenitic heat-resistant steels. Thus, demand for an increased strength of ferritic heat-resistant steels, which have high creep-rupture strength, has always been high and ferritic heat-resistant steels that can replace austenitic heat-resistant steels have been developed.

A problem with the use of ferritic heat-resistant steel for a prolonged period of time at high temperatures is that its creep strength is lower than that of austenitic heat-resistant steel and, in addition, it is very difficult to prevent production of portions with lower creep strengths, which are locally found in the weld heat-affected zone of a welded joint.

If the starting microstructure is a low-temperature transformation microstructure (mainly bainite or martensite), a ferritic heat-resistant steel has a so-called transformation point, which is the temperature at which phase transformation occurs between a phase, which is stable at room temperature, and γ phase, which is stable at high temperature. This transformation point contributes to production of low-temperature transformation microstructure with high strength containing dislocations in high density. On the other hand, the transformation point itself causes a large change to the microstructure of the steel (i.e. rearrangement of atoms forming the crystal lattice), and thus the microstructure of a heat-resistant steel that has been subjected to a heat history straddling the transformation point is significantly different from the initial refined microstructure that was originally introduced to provide high creep strength.

This phenomenon most strongly affects the microstructure of the heat-affected zone of a welded joint (hereinafter referred to as "HAZ"). The fusion zone between the HAZ and weld metal is at a high temperature not lower than 1500° C.; when the heat from this zone affects the base material, this produces a series of microstructure sections with different maximum temperatures reached (i.e. maximum heating temperatures) for different portions depending on the distance from the weld metal. That is, a HAZ has a microstructure with a series of metal microstructure sections that were produced as the maximum heating temperature changed from room temperature to 1500° C., depending on the distance from the weld metal. However, since the holding time for the maximum heating temperature is a short period of time of several seconds, this microstructure is peculiar and is generally divided into "coarse-grain HAZ", "fine-grain HAZ" and "dual-phase HAZ", starting from the section closest to the weld metal.

FIG. 1 shows various portions of a welded joint including its HAZ, and the microstructure configuration divided as mentioned above. As shown in FIG. 1, a HAZ 6 is formed between the weld metal 1 and the base material 5, where the HAZ 6 is composed of, starting from the section closest to the weld metal 1: a coarse-grain HAZ 2, a fine-grain HAZ 3, and a dual-phase HAZ 4.

A creep damage occurring in the fine-grain HAZ with a resulting fracture originating from the welded joint is referred to as "Type IV damage". Such a Type IV damage in a welded structure made of ferritic heat-resistant steel has not been resolved, and attempts have recently been made to resolve this problem. Type IV damage is a fracture specific to a welded joint, where, even though the base material is under time and temperature conditions that allow good use in a creep environment, only the welded joint suffers creep deformation, leading to a fracture.

Experience has recently shown that this phenomenon necessarily occurs in conventional materials (i.e. materials that have already been registered in the standards and have fixed allowable stresses). This has led to a situation where a safety coefficient for creep strength, called "coefficient of reduction in the creep strength of welded joints" for safe use of steel including welded joints, has been proposed for standards in various countries.

Such Type IV damage is thought to be unavoidable in all commercialized ferritic heat-resistant steel, and various discussions about the mechanism in which it occurs have been made.

The region before welding that will be a fine-grain HAZ is a ferritic heat-resistant steel that originally has the same microstructure as the base material, and welding subjects this region to a thermal cycle for a HAZ, where it is exposed to a temperature directly above the transformation point for several seconds. Further, heat from welding causes the matrix itself to experience an α-to-γ transformation, and the difference in the solid-solution limit for C between the α phase and the γ phase causes the carbides other than the carbides that were originally present as coarse precipitates (mainly $M_{23}C_6$-type carbides in ferritic heat-resistant steel) to instantly dissolve again to form γ phase. However, especially in the fine-grain HAZ, several dozens of percent of carbides that were present as coarse precipitates remain undissolved, though they shrink. This is thought to be the major cause of Type IV damage.

Typically, the joint after welding is subjected to a post-weld heat treatment (also referred to as stress-relieving annealing or SR treatment). If the heat-treatment temperature is high and different from the tempering temperature by only several dozens of degrees, the carbides that have remained undissolved, discussed above, together with the carbon that has dissolved, represent new precipitation nuclei for carbide-forming elements. The carbides that have remained undissolved are coarsened by the thermal cycle as a result and, at the same time, reduce the opportunity for precipitation of fine carbides. That is, as a result of research, the present inventors found out that, if the coarse carbides that had precipitated before welding remain undissolved, the so-called "precipitation strengthening property" originating from carbides will be lost.

This demonstrates that Type IV damage is unavoidable in a heat-resistant steel that has a transformation point as discussed above and in which carbon is contained and carbides are precipitated to increase creep rupture strength. That is, Type IV damage may occur in any steel type that is a heat-resistant steel in which carbides are used to increase creep strength, and is particularly significant in a high-Cr steel that is designed presupposing a prolonged use at high temperatures. This phenomenon also occurs in a low-Cr heat-resistant steel (steel type containing 1% or less Cr) that is mainly intended to be used at low temperatures, but is not a problem unless used at high temperatures. Of course, Type IV damage remains as an unavoidable problem in thermal power plants in which such a steel is used at a high temperature of 500° C. or higher. Since there is practically no ferritic heat-resistant steel that does not use the precipitation strengthening property derived from carbides to increase creep strength and exactly the same phenomenon occurs even when carbon is replaced by nitride, it is very difficult to prevent Type IV damage in a ferritic heat-resistant steel.

In the past, since Type IV damage occurs in the fine-grain region, the cause of Type IV damage was explained for some time as softening in the strength in the fine-grain HAZ, and it was also thought that Type IV damage results from the loss of dislocation strengthening due to the reduction in hardenability caused by the small crystal grain size. However, these hypotheses are not supported anymore because detailed research has shown that the fine-grain HAZ has strengths at room temperature or high temperature that are higher than such strengths of the dual-phase HAZ or portions of the base material near the dual-phase HAZ (results of tensile tests for a short period of time, rather than creep strength). Furthermore, while there has been no proof as to whether there is a reduction in hardenability, now that precipitates are generally understood as the main strengthening factor predominant in creep strength for a long period of time, no grounds for the mechanism of creep strength reduction caused by the nature of fine-grain microstructure have been given based on that reasoning. That is, no grounds for the direct causality of Type IV damage have been found in those hypotheses.

Further, it is known from experiments that the relationship between creep strength and crystal grain size is in inverse proportion in an austenitic heat-resistant steel in which only grain boundaries can deform, but it is also known that there is no correspondence in ferritic heat-resistant steel in which the microstructure can uniformly deform. Therefore, the inventors concluded that, even when a HAZ in which no fine-grain HAZ is produced is created or a ferritic heat-resistant steel in which a fine-grain HAZ cannot easily be produced is presented, it is difficult to completely prevent Type IV damage unless the coarsening of carbides due to the HAZ thermal cycle is not prevented.

To prevent production of such a fine-grain HAZ in a conventional ferritic heat-resistant steel, JP 2008-214753 A, JP 2008-248385, JP 2008-266785 A, JP 2008-266786 A and JP 2008-291363 A disclose techniques to perform heat treatment before welding (normalizing for a short period of time) on an entire steel pipe containing 50 ppm or less B to enable prevention of Type IV damage. These documents describe that, as a result of this heat treatment, the average grain size of austenite crystal grains before low-temperature transformation will be 100 μm or larger, thereby preventing grains of the low-temperature transformation microstructure from becoming finer.

The present technique uses a short-time normalizing process before welding to cause the retained γ, which is a microstructure that is usually to be caused to disappear, to remain in martensite laths or on bainite grain boundaries, thereby facilitating growth and coalescence thereof during reheating in welding to reproduce prior γ grains that had been produced at high temperature in the base material before welding, known as "microstructure memory effect".

This technique requires a furnace for performing heat treatment at high temperature on an entire member including an edge before welding (a steel pipe with a length of 10 m or longer in most cases), which makes on-site operation difficult. Further, heating the entire steel pipe may cause a deformation of the product, i.e. steel pipe, and reheating requires a long time and a large process load; for these reasons, this technique does not provide a realistic solution from a viewpoint of on-site operation.

Meanwhile, JP 2009-293063 A and JP 2010-007094 A propose steel pipes that use steel-material components that do not require growth and coalescence of retained γ in techniques using the same microstructure memory effect (hereinafter simply referred to as "memory effect").

These techniques add B in high concentrations of 100 ppm or higher, and the resulting shear-type memory effect with α-to-γ transformation is used. They are the same as the techniques of JP 2008-214753 A and other above-listed documents in that prior γ grains in the base material are reproduced at high temperature and do not produce a fine-grain region, and are thus thought to produce no Type IV damage.

The high-B containing steels described in JP 2009-293063 A and JP 2010-007094 A achieve prevention of production of a fine-grain region; however, in the portions corresponding to a fine-grain region, a short-time re-solution of carbides may cause partial solution and re-precipitation, during which coarsening of carbides occurs, a problem that these techniques cannot sufficiently solve. The techniques of JP 2009-293063 A and JP 2010-007094 A provide crystal microstructures that are substantially the same as the base material, where the memory effect ensures that the positions of precipitation of carbides remain on large-angle grain boundaries. Thus, compared with conventional ferritic heat-resistant steels in which complete recrystallization occurs to produce a fine-grain region and the positions of precipitation of coarsened carbides are unrelated with the crystal-grain boundaries that are newly produced, Type IV damage is mitigated (delayed). That is, even though the coarsening of precipitates is not completely prevented, a certain degree of microstructure stabilization is achieved by precipitates on grain boundaries. Thus, in the case of high-B-containing steel, the occurrence of Type IV damage is delayed and, in terms of strength reduction, these techniques are effective for a limited long-time use, such as 100,000 hours, which means that Type IV damage itself is mitigated. However, for a longer time in creep environments, a reduction in the creep strength of the HAZ is unavoidable since coarsening of carbides has preceded. This has been shown by the results of creep tests for a prolonged period of time, particularly creep tests for 30,000 hours or longer.

The stabilization of microstructure achieved by precipitates on grain boundaries is a new hypothesis about strengthening proposed in recent years, and was thought to be ineffective for strengthening in the past, based on the assumption that even coarse precipitates on large-angle grain boundaries can help strengthening particularly during a very-long-time creep deformation longer than 100,000 hours because, in a creep deformation where large-angle grain boundaries may migrate after a long period of time, a series of coarse carbide particles that are left after grain-boundary migration can serve as barriers that prevent dislocation motion. Since these coarse precipitate particles are arranged in a series, this makes the distance between the particles smaller to produce a strengthening effect, which is, however, completely eliminated by Type IV damage. This is one assumption that can explain the reason why the reduction of strength due to Type IV damage is more significant for a longer period of time.

Other than these methods, JP 2001-003120 A describes a technique in which a welded steel pipe is subjected to a reheating process for the entire welded structure (normalizing and tempering) to produce a microstructure that is substantially the same as that of the base material. The purpose of this method is to eliminate the non-uniformity of strength of the joint by performing heat treatment on the entire structure including the weld metal. However, this requires an even larger furnace than the heat treatment furnace described in JP 2008-214753 A, for example, which means low on-site operability. Further, in a weld metal, the alloy composition is originally decided such that the creep strength is at its maximum when the cast microstructure that is welded is, without an interruption, subjected to a post-weld heat treatment at a lower temperature than the tempering temperature; thus, a typical weld metal is not designed to provide strength after a refining process including normalizing and tempering, similar to the process for the base material. That is, applying a heat treatment that is applied again to the base material to the weld metal again is not preferred in terms of the creep properties of the weld joint. As a result, the joint develops a rupture beginning at the weld metal due to a reduction in the creep strength of the weld metal, a factor different from Type IV damage, such that creep strength of the weld joint is not achieved. That is, techniques such as that of JP 2001-003120 A is incomplete to address Type IV damage.

JP 2016-14178 A and JP 2016-130339 A disclose techniques that use steels containing 100 ppm and 80 ppm, respectively, or more B and prevent Type IV damage by local heat treatment. These techniques use a microstructure memory effect using retained γ that is present on lath boundaries, which are significant in B-containing steel; however, retained γ, however in a small amount, may remain in the base material or portions that have been subjected to a pre-weld heat treatment, and thus toughness tends to be low.

Thus, a structure of a ferritic heat-resistant steel with a low-temperature transformation microstructure that has good on-site operability and develops no Type IV damage at all has not been developed. Further, a technique for preventing Type IV damage taking account of economy and on-site operability has not been proposed for ferritic heat-resistant steel containing only 50 ppm or less B.

Disclosure of the Invention

An object of the present invention is to provide a method of manufacturing a welded structure of a ferritic heat-resistant steel that can prevent Type IV damage without adding B in large concentrations and that has good on-site operability, and to provide a welded structure of a ferritic heat-resistant steel without Type IV damage.

A method of manufacturing a welded structure of a ferritic heat-resistant steel according to an embodiment of the present invention is a method of manufacturing a welded structure of a ferritic heat-resistant steel including a base material, a weld heat-affected zone and a weld metal, including: the step of preparing the base material, the base material having a chemical composition including, in mass %; 0.05 to 0.12% C; 0.02 to 0.45% Si; 0.40 to 0.80% Mn; 8.0 to 12.0% Cr; 0.003 to 0.080% N; 0.30 to 1.30% Mo; 0.005 to 0.10% Nb; 0.005 to 0.50% V; 0 to 2.0% W; 0 to 3.5% Re; 0 to 0.15% Ti; 0 to 0.15% Zr; 0 to 0.0050% Ca; 0 to 0.0050% Mg; 0 to 0.0500% Y; 0 to 0.0500% Ce; and 0 to 0.0500% La, Ni being limited to below 0.20%, Cu below 0.20%, B below 0.005%, Al below 0.025%, P below 0.020%, S below 0.010%, and 0 below 0.010%, the balance being Fe and impurities; the step of forming an edge on the base material; a pre-weld heat treatment step in which a region located between a surface of the edge and a position distant from the surface of the edge by a pre-weld heat treatment depth of 30 to 100 mm is heated to a temperature of 1050 to 1200° C. and is held at this temperature for 2 to 30 minutes; a welding step in which, after the pre-weld heat treatment step, the edge is welded to form the weld metal; and a post-weld heat treatment step in which, after the welding step, a region located between the surface of the edge and a position distant from the surface of the edge by a distance not smaller than the pre-weld heat treatment depth and not greater than 100 mm is heated to a temperature of 720 to 780° C. and is held at this temperature for a time period not shorter than 30 minutes and satisfying the following formula, (1):

$$(\mathrm{Log}(t)+12)\cdot(T+273)<13810 \quad (1).$$

Here, t is the holding time and T is the temperature. The unit of t is hour and the unit of T is ° C. Log is the common logarithm.

A welded structure of a ferritic heat-resistant steel according to an embodiment of the present invention is a welded structure of a ferritic heat-resistant steel including a base material, a weld heat-affected zone and a weld metal, the base material having a chemical composition including, in mass %: 0.05 to 0.12% C; 0.02 to 0.45% Si; 0.40 to 0.80% Mn; 8.0 to 12.0% Cr; 0.003 to 0.080% N; 0.30 to 1.30% Mo; 0.005 to 0.10% Nb; 0.005 to 0.50% V; 0 to 2.0% W; 0 to 3.5% Re; 0 to 0.15% Ti; 0 to 0.15% Zr; 0 to 0.0050% Ca; 0 to 0.0050% Mg; 0 to 0.0500% Y; 0 to 0.0500% Ce; and 0 to 0.0500% La, Ni being limited to below 0.20%, Cu below 0.20%, B below 0.005%, Al below 0.025%, P below 0.020%, S below 0.010%, and 0 below 0.010%, the balance being Fe and impurities, wherein an average grain size of $M_{23}C_6$-type carbides precipitated on large-angle grain boundaries of the weld heat-affected zone is not more than 300 nm, an average inter-particle-surface distance of the $M_{23}C_6$-type carbides on the large-angle grain boundaries is not more than 200 nm, and a coverage of the large-angle grain boundaries with the $M_{23}C_6$-type carbides is not less than 40%. M of the $M_{23}C_6$-type carbides is one or more of Cr, Fe, Mo and W in not less than 70 atom % in total.

The present invention provides a method of manufacturing a welded structure of a ferritic heat-resistant steel that can prevent Type IV damage without adding B in large concentrations and that has good on-site operability, and a welded structure of a ferritic heat-resistant steel without Type IV damage.

EMBODIMENTS FOR CARRYING OUT THE INVENTION

Figure 1:
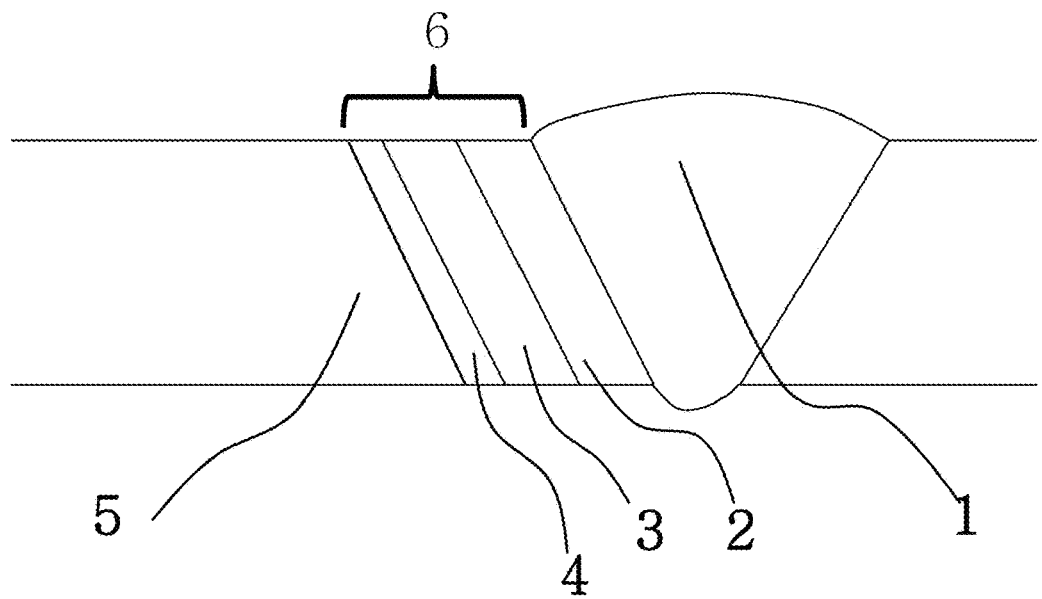
FIG. 1 is a schematic cross-sectional view of a joint illustrating various portions including the heat-affected zone of a welded joint and various microstructure sections.

As discussed above, the problem to be solved by the present invention is to provide a weld structure in which no Type IV damage occurs in the HAZ of a welded joint of a steel satisfying a predetermined main chemical components and limit values and there is no significant difference between the creep strength of the welded joint and that of the base material. The Cr content of the associated steel is not lower than 8.0%. To provide corrosion resistance, the creep rupture strength for a use temperature range of 500° C. or larger and after 100,000 hours is considered as a factor of temperature and the target for the rupture strength for 600° C., used as a representative value, should be 75 MPa or larger. At the same time, to provide the machinability of the edge and the operability of the welding, the target for the Charpy impact toughness value for 0° C. should be 27 J or higher to provide a toughness that sufficiently prevents weld cracking.

An object of the present invention is to completely prevent coarsening of carbides due to an HAZ thermal cycle through partial solid solution thereof, which is the fundamental reason for Type IV damage. To do this, the present invention optimizes component design to provide a chemical composition that prevents Type IV damage in the structure itself and, at the same time, performs a heat treatment before welding on a portion near the edge of the welded joint under limited conditions of this process.

The welded structure of a ferritic heat-resistant steel of the present invention is composed of a base material, an HAZ and a weld metal, and is not limited to a specific shape and may be shaped as a pipe or a plate. Further, if the structure is shaped as a pipe, the invention is suitable for a structure with a length of 100 mm or more, and if the structure is shaped as a plate, the invention is suitable for a structure with a length or a width of 100 mm or more. Further, since objects to which the present invention is suitably applied include high-temperature pressure vessels, its plate thickness (or wall thickness for a steel pipe) is preferably 4 mm or more.

The techniques that provide basis for the present invention will now be described together with the results of experiments.

The experiment results shown below were obtained using the test specimens fabricated as described below and various experiments.

In a laboratory, a steel with the chemical composition (mass %) shown in Table 1 was melted and cast in a high-frequency induction-heating vacuum-melting furnace having a steel capacity of 300 kg to produce a steel ingot with a weight of 300 kg. Thereafter, this steel ingot was reheated in an electric furnace with an atmosphere to 1180° C. and was then held in the furnace for 60 minutes, before being hot rolled in hot-rolling experiment equipment to produce a steel-plate test specimen with a thickness of 30 mm. The hot rolling was completed at a temperature of 900° C. or higher, and was then left to cool. The resulting steel-plate test specimen was then tempered at 770° C. for two hours. At this stage, optical microscopy, transmission electron microscopy (TEM), scanning electron microscopy (SEM) and electrolytic-extraction residue quantitative analysis were used to verify that the specimen had a lath martensite microstructure and carbides mainly composed of $M_{23}C_6$-type carbides had mainly precipitated. The types of the precipitates were checked using energy-dispersion X-ray analysis (EDX) appended to the TEM equipment and the energy values of reflection peaks from X-ray diffraction for electrolytic-extraction residues (qualitative analysis).

TABLE 1

| Chemical components (in mass %, balance Fe and impurities) | | | | | | | | | | | | |
|---|---|---|---|---|---|---|---|---|---|---|---|---|
| C | Si | Mn | Cr | Mo | W | Nb | V | N | Ni | Cu | Al | B |
| 0.09 | 0.31 | 0.56 | 8.82 | 0.99 | 1.61 | 0.06 | 0.22 | 0.0461 | 0.11 | 0.06 | 0.016 | 0.0014 |

Here, M in "$M_{23}C_6$-type carbides" means Cr, Fe, Mo and/or W in 70 atom % or more in total.

The coverage of grain boundaries with $M_{23}C_6$-type carbides was determined by the length occupancy of precipitates on large-angle grain boundaries based on a SEM observation image with a magnifying power of 10,000 and a TEM observation image of thin film. The nature of grain boundaries (difference in angle between the direction of adjacent crystals and the normal direction) was measured by an electron-beam backscatter analysis device (EBSD) and a grain boundary with an angle relative to an adjacent crystal grain of 15° or larger was determined to be a "large-angle grain boundary". Large-angle grain boundary as used herein means "prior γ grain boundary", "packet grain boundary" or "a major portion of a block grain boundary", which are crystallographic names of martensite or bainite, and is a crystal grain boundary that is effective as precipitation nuclei for precipitates. For the occupancy of precipitates on such large-angle grain boundaries, measured values were used assuming that the result of a two-dimensional observation is generally equal to the area occupancy on the three-dimensional surface of a grain boundary (border). These values may be converted to three-dimensional values using a simple equation determined by calculation analysis; however, the inventors decided that it would not be necessary to calculate scientifically precise values, and pursued convenience by using observation results as they were obtained.

Figure 2:
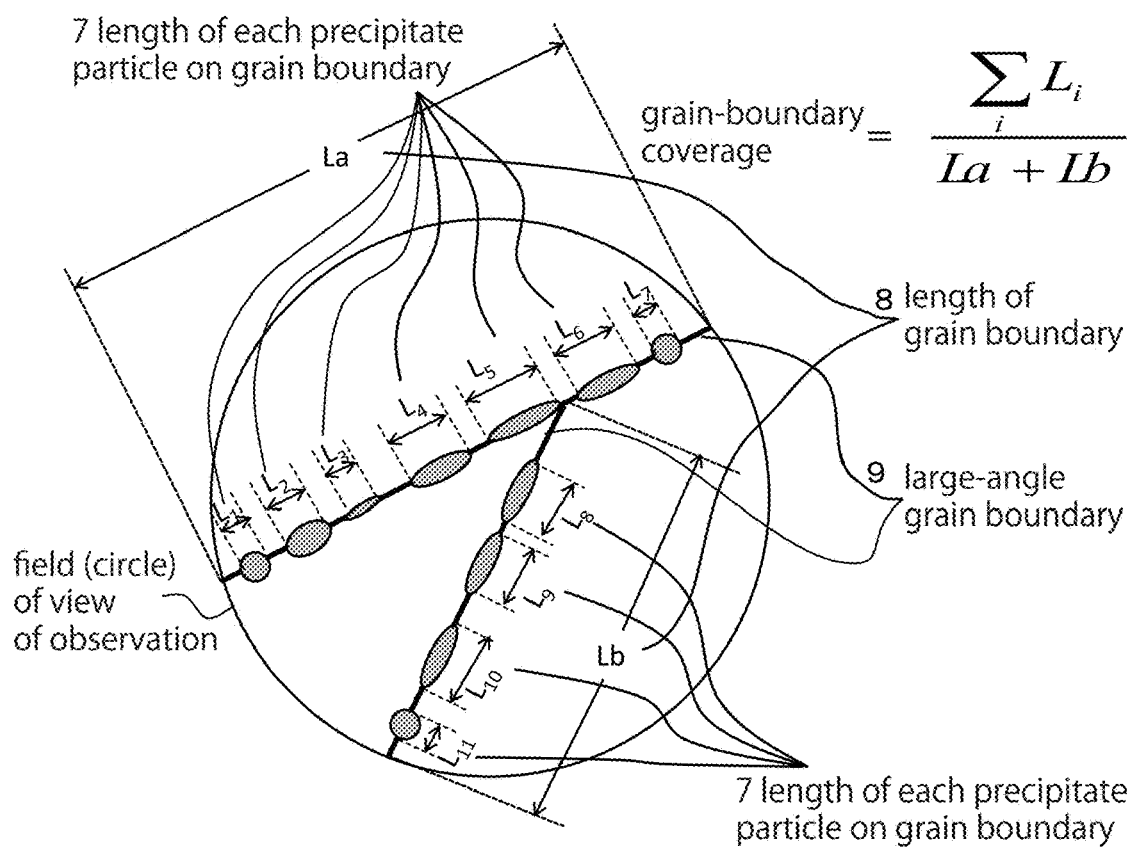
FIG. 2 is a schematic view of the large-angle grain boundaries being covered, illustrating a microstructure model of the weld heat-affected zone and the concept of the coverage of grain boundaries with precipitates, as well as a measurement method.

FIG. 2 is a conceptual view of the coverage of grain boundaries with carbides of a microstructure, including large-angle grain boundaries 9 (two are shown in the figure), for illustrating a microstructure model of an HAZ and a method of measuring the coverage of grain boundaries with precipitates. $L_1$ to $L_{10}$ in FIG. 2 each separately indicate the occupancy length 7 of an $M_{23}C_6$-type carbide particle on a grain boundary, while La and Lb each indicate a large-angle grain-boundary length 8.

As shown in FIG. 2, "grain-boundary coverage" is the total precipitate length along the large-angle grain boundaries 9 (total of $L_1$ to $L_{10}$ in FIG. 2) divided by the total length of the large-angle grain boundaries (La+Lb), and is 100% for complete coverage and 0% for no coverage. Here, the length along which carbides cover grain boundaries is the occupancy length, and is not necessarily the size of precipitates or the length of elliptical precipitates on grain boundaries.

To determine "grain-boundary coverage", first, an observation is conducted using electron microscopy with a magnifying power of 10,000, and particles that have precipitated on large-angle grain boundaries are identified as $M_{23}C_6$-type carbides by transmission electron-beam diffraction pattern analysis by EDX or TEM analysis with, again, a magnifying power of 10,000. Measurement using a backscattered electron image from EDX is also effective to increase speed. Subsequently, the length along which large-angle grain boundaries are covered with such particles is measured in a field of view of electron microscopy. Such measurements are conducted by obtaining at least 5 fields of view for one sample and 5 or more test specimens for one steel, and directly observing a total of 25 or more fields of view or analyzing pictures from electron microscopy for calculation. Actual calculation is conducted by (total length of large-angle grain boundaries occupied by particles)/(total large-angle grain-boundary length).

The average inter-particle-surface distance of precipitates on the large-angle grain boundaries may be calculated in a manner similar to that shown in FIG. 2, that is, by subtracting the coverage of precipitates obtained by the above-mentioned observation by microscopy from 1 and multiplying the result by the large-angle grain boundary length, and dividing the result by the number of the precipitate particles.

However, this distance is not an exact value, and is an approximation using the formula below, (2), supposing that the precipitates are in a square-shaped distribution on grain-boundary surfaces. This corrects the difference between the actual average particle size and the measurement depending on which position in the right ellipsoid is cut to produce a surface to be observed by electron microscopy (the difference is particularly significant for low precipitate densities) and is an approximation equation using calculation analysis, and has several types based on different distribution assumptions. The present invention used a model that assumed "square-shaped distribution on grain-boundary surfaces", which enabled the clearest recognition of the correspondence to creep strength. This is a unique experiment formula of the present invention, with corrections for experimental adjustments.

$$\lambda\text{ave} = 1.3[ls]\text{ave} - [ds]\text{ave} \quad (2).$$

Here, [ls]ave is the average inter-particle-center distance (nm) and [ds]ave is the average diameter (nm) of particles (imaginary average diameter of deemed particles with sizes of portions occupying grain boundaries). λave is the average inter-particle-surface distance (nm). The average inter-particle-center distance can be calculated by measuring the number of precipitate particles on grain boundaries and dividing it by the grain-boundary length.

To fabricate a welded joint, the steel-plate test specimen with a thickness of 30 mm that has been prepared, with a width of 200 mm, was machined to provide a weld edge on one of the sides of the steel-plate test specimen arranged in the width direction, the angle of one edge being 22.5° and a pair of edges forming a V-edge with 45°, to fabricate a test specimen. Two such test specimens were made to butt each other and were welded. The root for butting was 1 mm and the amount of heat input was about 1 kJ/mm, and the welded joint was formed at a weld speed of about 10 cm/minute with a heap-up of 30 to 35 passes. A plurality of welded joints each with a total length of 400 mm were prepared and their joint characteristics were evaluated, and the microstructure of the HAZ was observed and analyzed. Creep tests evaluated creep test specimens each with a parallel-portion diameter of 6 mm, a parallel-portion length of 30 mm and a total length of 70 to 86 mm. Each test specimen was extracted from a welded-joint test material by working in a direction perpendicular to the weld line and perpendicular to the plate-thickness direction such that the HAZ was located approximately in the middle of the inter-evaluation-point distance. The weld metal used was the Alloy 625 Ni-based alloy described in Table 2, which is a commercial Ni-based alloy, and an overmatch joint was used so as to prevent rupture from the weld metal, and other measures were taken to ensure that the property evaluation of the HAZ was properly performed.

TABLE 2

| Chemical components (in mass %, balance Fe and impurities) | | | | | | | | | | | | |
|---|---|---|---|---|---|---|---|---|---|---|---|---|
| C | Si | Mn | Cr | Mo | W | Nb | V | N | Ni | Cu | Al | B |
| 0.10 | 0.03 | 0.004 | 21.83 | 8.2 | — | 3.05 | — | 0.0066 | 67.8 | — | 0.29 | 0.002 |

— indicates that the element is not added.

(Pre-Weld Heat Treatment)

As discussed above, Type IV damage occurs as heat from welding is conveyed such that carbides are heated for a short period of time to a temperature directly above the $Ac_3$ point and only peripheral portions of carbide particles are dissolved and, at the same time, fine carbides (with essential particle sizes not more than 100 nm) are completely dissolved to supply the base material with carbon; the subsequent post-weld heat treatment causes this carbon and carbide-forming transition elements to precipitate again on the retained undissolved carbides to coarsen carbides. To prevent this, the present invention performs heat treatment to prevent Type IV damage before welding. Specifically, directly before welding, carbides that have precipitated in portions that are to form the weld heat-affected zone of the welded joint (portions corresponding to the HAZ) are heated to a temperature not lower than the $Ac_3$ point and is held at this temperature for 2 minutes or longer to cause complete re-solution, thereby preventing the coarsening itself of carbides caused by weld heat through the undissolved carbides.

This pre-weld heat treatment is characterized in that the edge is heated to temperatures of 1050 to 1200° and the portions that will represent the HAZ after welding are held at a target temperature for 2 minutes or longer regardless of the position along the plate thickness. If heating occurs from the outer surface, the holding time is theoretically a function of the plate thickness; however, this is difficult to formulate since the welded portions that are to be joined are not necessarily flat plates. In view of this, thermocouples may be embedded in advance in portions of steel plates of the same shape (with a chemical composition in the ranges of the present invention) that correspond to the outer fringe of the HAZ, and a temperature pattern may be set in the heating equipment such that the entire member is heated such that those portions are at a target temperature for 2 minutes or longer.

The heat treatment for preventing Type IV damage performed directly before welding will be hereinafter referred to as "pre-weld heat treatment".

Figure 3:
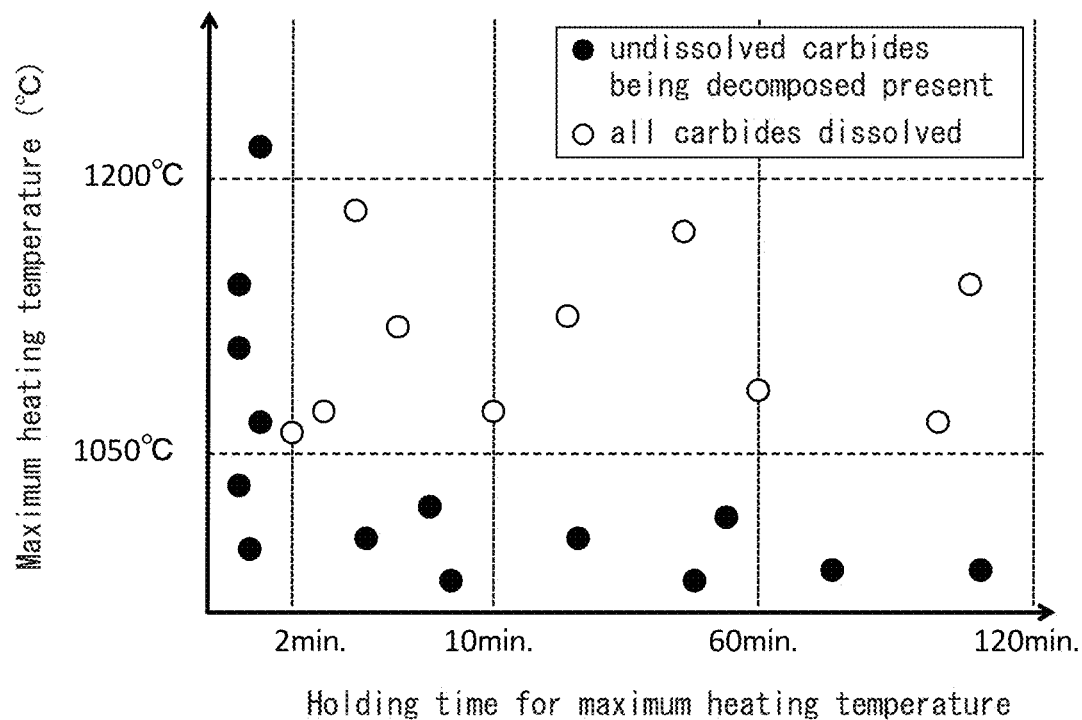
FIG. 3 is a graph showing the relationship between conditions of the pre-weld heat treatment and the state of presence of carbides.

FIG. 3 shows how the holding time at the maximum heating temperature and the temperature in the pre-weld heat treatment affect the carbide state. These tests were conducted by preparing a plurality of pieces with a square of 50×50 mm and a thickness of 10 mm cut out from steel-plate test specimens, performing heat treatment at various temperatures for various periods of time, then cutting the pieces to produce cross sections and observing the microstructure by transmission electron microscopy to determine whether there were carbide precipitates. In the graph, "●" represents an example where, in the test specimen that was left to cool after heat treatment, undissolved $M_{23}C_6$-type carbides that was in the process of decomposition and remained were found, and "○" represents an example where all carbides dissolved and no carbides were found. If small amounts of undissolved carbides remain, these carbides reduce the creep strength of the weld heat-affected zone; as such, a range including only results with ○ in the graph is preferred.

FIG. 3 suggests that, if the holding time is shorter than 2 minutes, undissolved carbides may remain in portions of the microstructure or in the entire microstructure regardless of heating temperature and may coarsen in the subsequent post-weld heat treatment. On the other hand, if the specimen was reheated to a temperature of 1050 to 1200° C., no undissolved carbides remained at all and complete solid solution occurred if the holding time was 2 minutes or longer, regardless of heating temperature.

On the other hand, if the heating temperature was lower than 1050° C., undissolved carbides remained in portions of the microstructure or in the entire microstructure. In the steel of Table 1, the $Ac_3$ point may reach 1000° C. at the maximum because of a rise of the transformation point, which is observed during rapid heating (50° C./s or higher), as in the HAZ. This was verified by using a test device for measuring coefficient of thermal expansion to reproduce rapid heating and conducting a separate thermal cycle reproduction test. Thus, heating at 1000° C. or lower essentially leads to a condition of dual-phase heating, where the state of carbides in the portions in which the transformation point is not exceeded is represented by a somewhat higher coarsening than at room temperature but exhibits no decomposition/dissolution. On the other hand, in the portions where partial transformation to γ phase has occurred, the temperature slightly exceeds the $Ac_3$ point, and carbides are thought to remain undissolved. That is, during rapid heating, where partial transformation to γ phase at high temperature occurs, some of the microstructure retains in completely dissolved (undissolved) carbides unless heated to temperatures not lower than 1050° C., and these incompletely dissolved carbides can easily coarsen during the subsequent post-weld heat treatment.

This shows that the temperature of the pre-weld heat treatment required to completely prevent Type IV damage according to the present invention is not lower than 1050° C., and the associated holding time is not shorter than 2 minutes. The maximum heating temperature should be 1200° C. because, if the pre-weld heat treatment is performed at a temperature not lower than 1200° C., even for a short period of time, γ grains after the α-to-γ transformation coarsen in size, potentially reducing the toughness of the steel.

According to the present invention, the above-discussed pre-weld heat treatment is only performed on the edge and its surrounding portions. Specifically, the region located between the surface of the edge (hereinafter referred to as "edge surface") and a position distant from the edge surface by a predetermined depth (hereinafter referred to as "pre-weld heat treatment depth") is 1050 to 1200° C.

Figure 4:
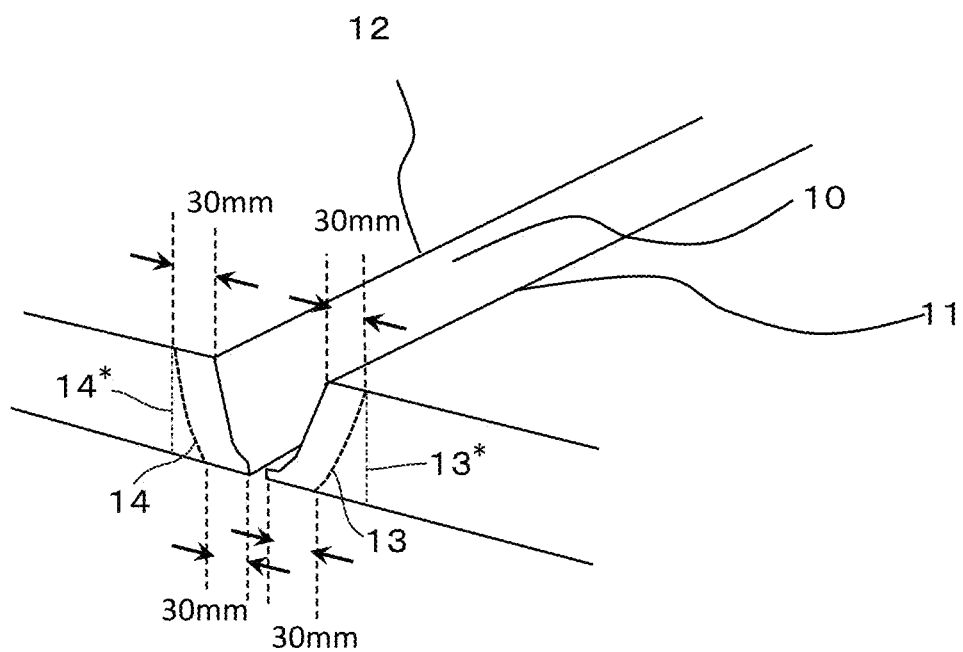
FIG. 4 shows a pre-weld butt condition of the welded joint and the names of various portions and the ranges to which the pre-weld heat treatment is applied.

To decide the pre-weld heat treatment depth, the melting of the base material caused by welding and the width of the HAZ that spreads depending on the weld heat input need to be considered. FIG. 4 schematically shows the weld edges of steel plates butting each other to form a V edge, and schematically shows a cross section of the welded portions showing the dimension, in the depth direction, of the portion of each steel plate that is subjected to the pre-weld heat treatment, beginning at the edge surface 10. Type IV damage occurs in the outer fringe of the HAZ. Thus, a temperature of 1050° C. or higher must be held for 2 minutes or longer, which is suitable for the pre-weld heat treatment, into a position deeper than the portions in which the outer fringe of the HAZ is expected to be positioned.

A point to be noted here is that, during welding, there are necessarily portions of the base material that are melted. The original edge surface recedes inward in the base material and forms a fusion line that separates the weld metal (weld metal that has solidified from the molten condition or mixture of weld metal and base material) and the HAZ. This border line is also referred to as bond, from which the HAZ is produced toward the interior of the base material. High-temperature pressure containers or power-generation piping equipment to which the present invention is to be applied have high strengths and thus high residual stresses retained in the joint portion; thus, concerns include weld cracking and reheating cracking during the post-weld heat treatment; in view of this, welding with a relatively small heat input is mostly used. In such cases, the transformation point of the base material is higher than that of carbon steel, and thus the width of the HAZ is not very large. For a plate thickness of about 50 mm, the width of the HAZ is not more than 5 mm, and even for a plate with a very large thickness of over 100 mm, a high heat input welding that may result in a HAZ width of over 10 mm is not common. In practice, the weld heat input is 5 kJ/mm, and a higher heat input for welding is not used. It was verified by testing 10 test weld joints that the maximum HAZ width in this case is 5 mm. That is, Type IV damage can be prevented if the pre-weld heat treatment holds the joint at a temperature of 1050° C. or higher into a depth of at least 5 mm for a required period of time.

On the other hand, the measurements using the test weld-joint tests showed that the amount of melting of the base material due to the weld metal is similarly up to 5 mm. This amount of melting depends on the type of steel, and these result values are specific to the steel types associated with the present invention.

In view of all this, the pre-weld heat treatment is suitably performed into a total depth up to 10 mm from the edge surface at 1050 to 1200° C. for 2 minutes or longer.

Another point to be noted is that, after the last weld pass, i.e. after the weld pass level reaches the steel surface, so-called "cosmetic heaping" may be performed, in which a small thickness of weld metal is positioned on the end portions of the weld metal to eliminate shape irregularities of these portions. A cosmetic heap is also referred to as "umbrella", referring to its cross-sectional shape. The position of a bond produced by the melting of the base material of weld metal may have insufficient fusion, or the supply of weld metal may be insufficient, which may result in a small groove; an umbrella may be provided, for example, to prevent stresses from being concentrated on such a groove or the border between the heaped weld metal and base-material surface, which would represent an initiation point for a fracture. Particularly, in the steel type associated with the present invention, which is mainly composed of martensite, it is common to form a large umbrella to prevent stress concentration. The weld metal width at the outer layer is such that the HAZ may reach 30 mm from the contact line between the edge surface before welding and the surface of the steel outer layer, when all the passes including the last weld pass for preventing failure or stress concentration are considered.

When all these points are considered, the pre-weld heat treatment depth needs to be 30 mm or more. To perform such a deep heat treatment, particularly when heating occurs from the outer surface, the following measures need to be taken: For example, to achieve this by high-frequency induction heating, it is effective to reduce frequency to 3 kHz or lower, and as low as possible, to increase the depth of penetration of induction current. In the case of direct electrical heating, it is effective to optimize, by experiment, the contact positions for the electrodes for electrical heating. In the case of furnace heating, it is effective to increase the capacity of the furnace and heat the edge from all directions, thereby increasing the energy density for increasing the temperature at the depth of 30 mm. In any of these methods, an appropriate method for achieving a pre-weld heat treatment depth of 30 mm may be decided on and may be used.

That is, the essential requirement is to hold the temperature of the region beginning at the edge surface and ending at each of the borderlines 13 and 14, which are always distant from the edge surfaces by 30 mm or more, at 1050 to 1200° C. for 2 minutes or longer.

An edge rarely has a vertical weld surface and practically is a V edge, X edge or K edge. Thus, to ensure that the HAZ is covered with a region that has been subjected to the pre-weld heat treatment, it is preferable to perform the pre-weld heat treatment into the lines 13* and 14*, each of which is at the depth position of 30 mm from that edge position on the base-material outer layer (including both the front and back) which may be most distant from the edge center. This will provide a thoroughgoing Type-IV-damage prevention process even when a deep melt portion is produced in a central portion along the plate thickness due to weld passes or gouging. At least, it is preferable to hold the entire region defined by 13* and 14* in the range of 1050 to 1200° C. for two minutes or longer.

That is, it is preferable to hold the region located between the surface of the edge and the position distant by the pre-weld heat treatment depth from the position on the surface of the edge that is most distant from the very end of the edge, at a temperature of 1050 to 1200° C. for 2 minutes or longer.

On the other hand, the steel becomes γ phase at these temperatures, and thus holding it for a certain period of time or longer causes γ particles to coarsen in size. Grains coarsened in size increase hardenability and increase creep strength; thus, there is no problem in terms of high-temperature properties. However, tests in which this was actually performed revealed that, after heating for longer than 30 minutes, the crystals coarsened such that the grain size exceeded about 200 μm, reducing the toughness of the joint.

Figure 5:
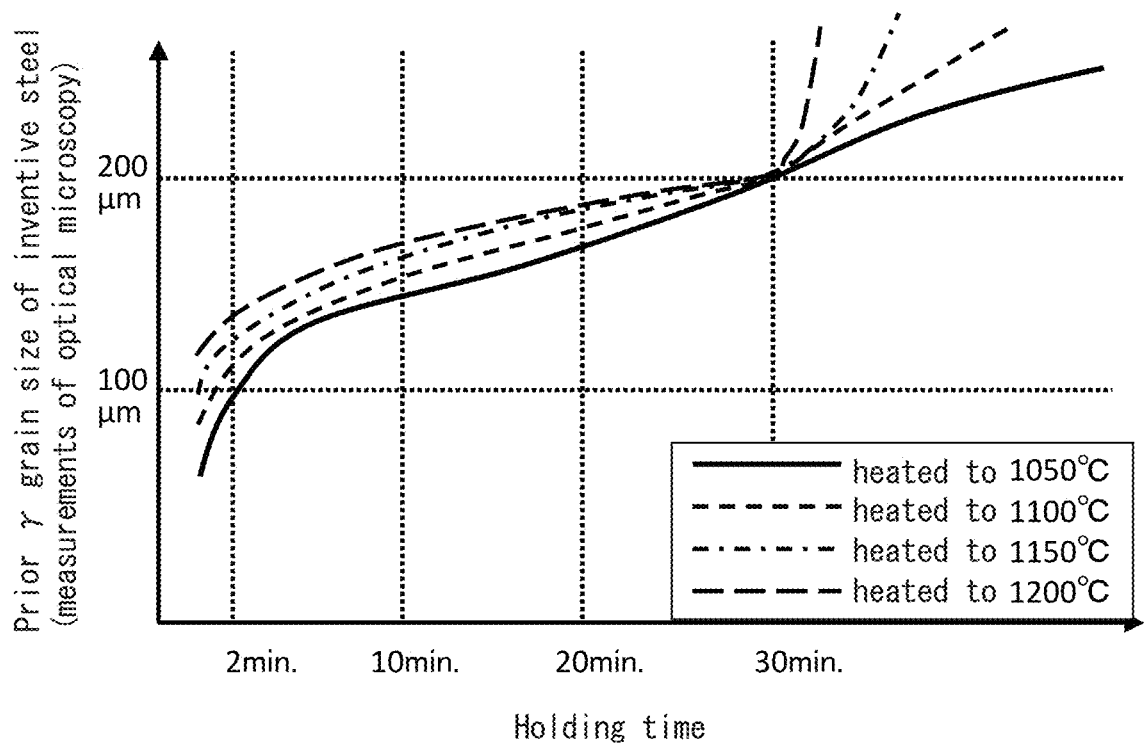
FIG. 5 is a graph showing the relationship between the tendency of coarsening of priory grains of the steel associated with the present invention, holding temperature and time.

FIG. 5 shows the relationship between holding time and prior γ grain size found when the inventive steel was heated to and held at temperatures in the range of 1050 to 1200° C. There are no major differences in particle growth rate until 30 minutes. However, when the holding time exceeds 30 minutes, the prior γ particle size is clearly not smaller than 200 μm. This phenomenon can be explained by assuming that high-temperature stable particles, which work to prevent grain growth in this temperature range, such as precipitate particles of NbC, TiN and $Al_2O_3$, for example, are present in a certain density and, in the time range in which their pinning effect is effective, the grain size essentially depends on the distance between particles, and the time at which the thermal activation process becomes significant and this pinning effect is removed is 30 minutes.

Figure 6:
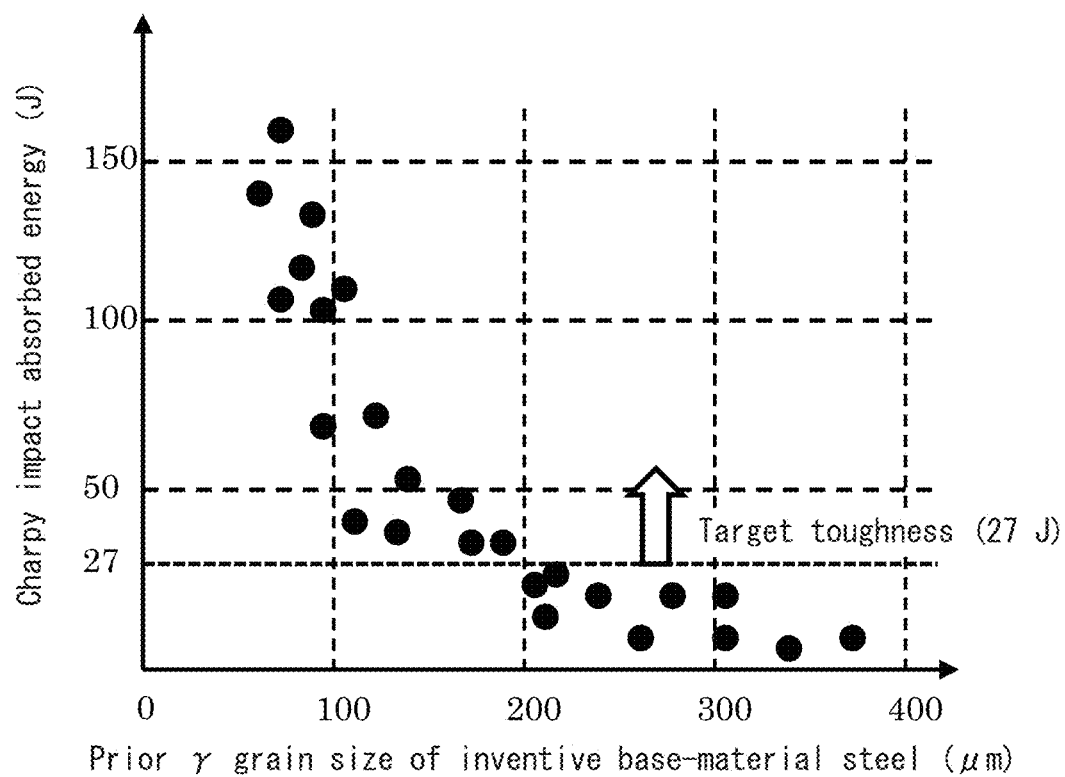
FIG. 6 shows the relationship between the prior γ grain size of the steel associated with the present invention and the Charpy-impact absorbed energy.

FIG. 6 shows the relationship between the prior γ particle size of the inventive steel and 2 mm V-notch Charpy impact test results. It shows that, if the prior γ particle size is not smaller than 200 μm, the Charpy impact absorbed energy value at 0° C. of 27 J, which is generally required during machining or welding of a pressure container, is not achieved. That is, FIGS. 5 and 6 show that the holding time of the pre-weld heat treatment must be 30 minutes or shorter in order to provide a joint with a target toughness for the present invention.

According to the present invention, the maximum pre-weld heat treatment depth is 100 mm. The reasons therefor will be discussed in "Features of Partial Pre-weld Heat Treatment" below.

Thus, in the pre-weld heat treatment of the present invention, the region located between the surface of the edge and the position distant from the surface of the edge by a pre-weld heat treatment depth of 30 to 100 mm is heated to a temperature of 1050 to 1200° C., and is held at that temperature for 2 to 30 minutes. The pre-weld heat treatment may be divided into two or more runs; residual heat from the first run may be used to keep that region hot for a total of 2 to 30 minutes. For the cooling after the heat treatment, the joint may be left to cool, for example.

(Post-Weld Heat Treatment Conditions and State of Presence of Precipitates)

Now, the post-weld heat treatment, which forms a part of the method of manufacturing a weld structure of a ferritic heat-resistant steel according to the present invention and the state of precipitates in the resulting microstructure will be described.

The post-weld heat treatment of the present invention involves, after the welding of the edge, heating the portion beginning with the edge surface and ending with a position in the range between the pre-weld heat treatment depth and 100 mm toward the base material at a temperature of 720 to 780° C. (hereinafter referred to as "post-weld heat treatment temperature"), and holding the portion at that temperature for a period of time of 30 minutes or longer and satisfying Formula (1).

Typically, the post-weld heat treatment is applied at a temperature of (transformation point of base material−20) ° C. or longer for a period of time dependent on the plate thickness. However, to achieve the same creep rupture strength as the base material, the precipitation state of $M_{23}C_6$-type carbides needs to be controlled to be substantially the same as that of the base material. At the same time, the post-weld heat treatment has the effect of essentially tempering martensite of high hardness produced as the weld metal is quenched, and is effective in preventing brittle fracture of the weld metal or brittle fracture of the bond.

According to the present invention, the base material is heated to the γ range as the pre-weld heat treatment; as such, the heated region of the base material is also as-quenched martensite, which has a high hardness. Thus, quench cracking, brittle fracture or toughness decrease need to be prevented. The post-weld heat treatment is a necessary heat treatment to achieve this. That is, according to the present invention, the post-weld heat treatment, which is typically performed to soften the weld metal and bond of the weld joint and sometimes a high-hardness microstructure in the HAZ, is performed to temper also the portions of the base material that was heated to the γ range in the pre-weld heat treatment. As such, the heated region during the post-weld heat treatment in the depth direction at that temperature (hereinafter referred to as "post-weld heat treatment depth") needs to be not smaller than the pre-weld heat treatment depth.

Generally, co-metal-based weld metal, to which the present invention is directed, is designed presupposing that the temperature of the pre-weld heat treatment is not higher than the tempering temperature of the base material minus 20° C. That is, the alloy of weld metal is designed to achieve a high-temperature strength and a creep strength that are equal to or larger than those of the base material when tempered at a temperature lower than that for the base material. If tempering occurs at high temperature, microstructure recovery proceeds, which leads to softening, and thus high-temperature strength decreases and creep strength also tends to decrease. As such, in the post-weld heat treatment, the state of presence of precipitates, which represent a creep-strengthening factor, needs to be precisely controlled such that the creep strength is equal to or higher than that of the base material, while maintaining high-temperature strength. That is, the creep strength of the joint is not equal to or larger than that of the base material if the post-weld heat treatment temperature is too high, which would cause coarsening of precipitates, or if the post-weld heat treatment temperature is too low, which would cause insufficient precipitation.

The present invention solves this problem by controlling the state of presence of precipitates, particularly precipitates on grain boundaries that consistently support the creep strength of ferritic heat-resistant steel for a prolonged period of time. As discussed above, type IV damage is caused by a reduction in the precipitation density of precipitates on grain boundaries, i.e. grain-boundary occupancy. This suggests that, in the base material and weld metal, the grain-boundary occupancy decreases for different reasons to reduce creep strength. To improve the creep rupture strength of the weld joint, the present inventors did research on the precipitation state of $M_{23}C_6$-type carbides in a HAZ. From this research, they found it necessary that the average grain size of $M_{23}C_6$-type carbides is not larger than 300 nm, the coverage of large-angle grain boundaries with these $M_{23}C_6$-type carbides (hereinafter referred to as "grain-boundary coverage") is not smaller than 40%, and the average distance between particle surfaces of $M_{23}C_6$-type carbides that have precipitated on large-angle grain boundaries (hereinafter referred to as "inter-particle distance") is not larger than 200 nm in the HAZ after the post-weld heat treatment.

An essential requirement of the present invention is to add a post-weld heat treatment in which the structure is held in the temperature range of 720 to 790° C. for 30 minutes or longer. This provides the above-discussed desired state of precipitates in portions including the HAZ and joint.

However, the growth of precipitates is a function of temperature and time, and the higher the temperature within the precipitation temperature range and the longer the time, the quicker the precipitation and growth become. In view of this, the post-weld heat treatment conditions of the inventive steel are further limited by introducing a parameter that considers temperature and time to be equivalent in terms of diffusion. Based on experiment results, within the range of the post-weld heat treatment of the present invention, the following formula, (1), is effective in preventing precipitates from coarsening to an unnecessary degree. In formula (1), T is the temperature (° C.), t is the holding time (hour), and Log is the common logarithm.

$$(\text{Log}(t)+12)\cdot(T+273)<13810 \tag{1}$$

Figure 7:
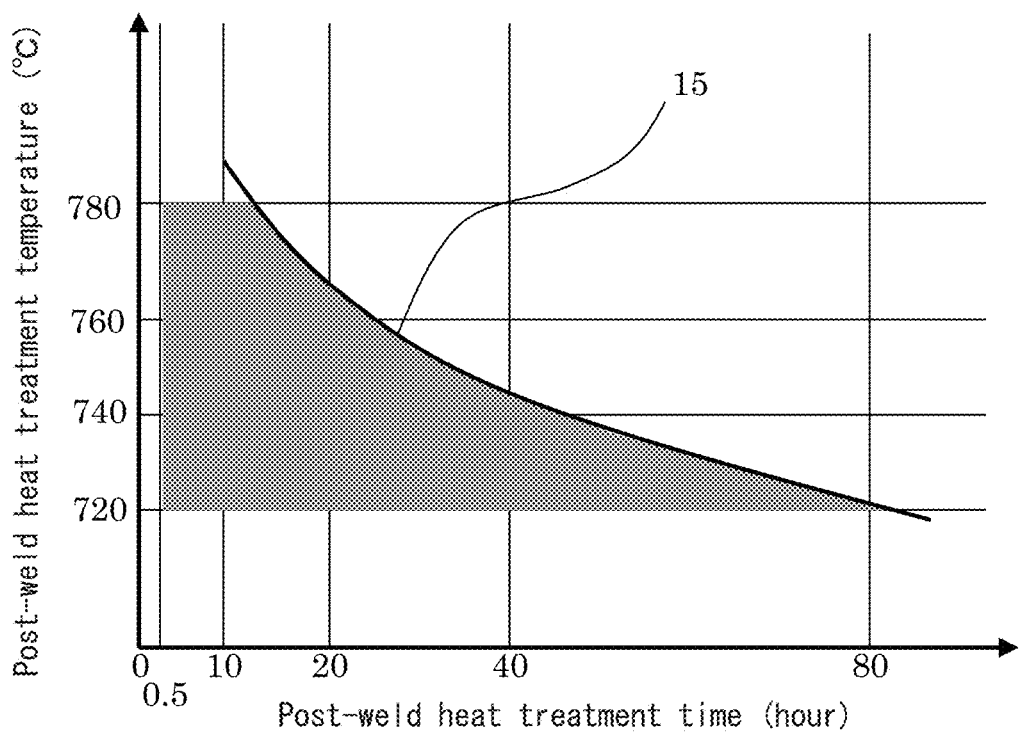
FIG. 7 is a graph showing post-weld heat treatment conditions.

To illustrate the condition range of the post-weld heat treatment, FIG. 7 represents formula (1) on a relationship graph between the temperature and time of the post-weld heat treatment to show the range of temperature and time that is effective according to the present invention. A post-weld heat treatment for 30 minutes or longer is necessary; in reality, it is necessary to perform it within a finite period of time since a post-weld heat treatment for an extremely long period of time causes coarsening of precipitates. Formula (1) is a special precipitate growth estimation formula of the present invention that has been obtained by assuming a body diffusion control growth law of precipitates and deforming a Larson-Miller formula that assumes a constant permeability of time and temperature during diffusion of matter. The constants in formula (1) have been decided by observing the state of precipitates in steel held at a given temperature and time condition by transmission electron microscopy, and statistically analyzing the result.

Creep tests at 600° C. and 650° C. for up to 10,000 hours verified that, outside the hatched range of FIG. 7, the average grain size of precipitates exceeds 300 nm or the inter-particle distance of precipitates exceeds 200 nm or both of these situations occur at the same time such that the creep strength of the weld joint decreases.

Figure 8:
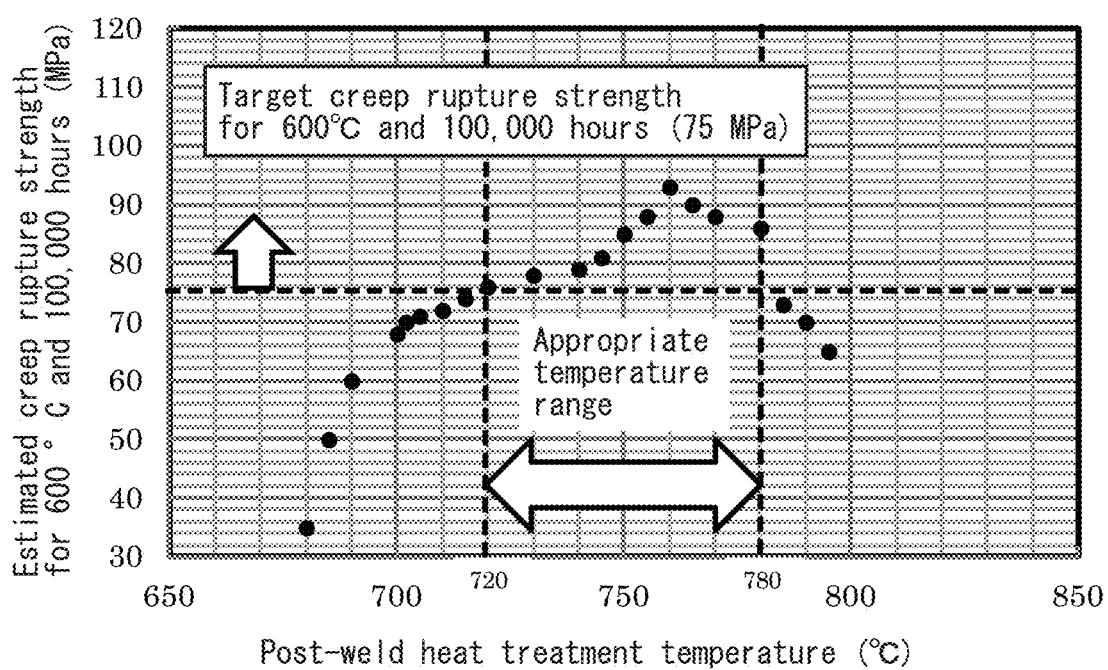
FIG. 8 shows the relationship between post-weld heat treatment time and the estimated creep rupture strength for 600° C. and 100,000 hours.

FIG. 8 shows the relationship between post-weld heat treatment temperature and the estimated creep rupture strength at 600° C. and after 100,000 hours (creep rupture strength estimated by performing creep rupture tests for 10,000 hours or longer at the temperatures of 600° C., 650° C. and 700° C., and rearranging the results by the temperature-time parameter method).

Figure 9:
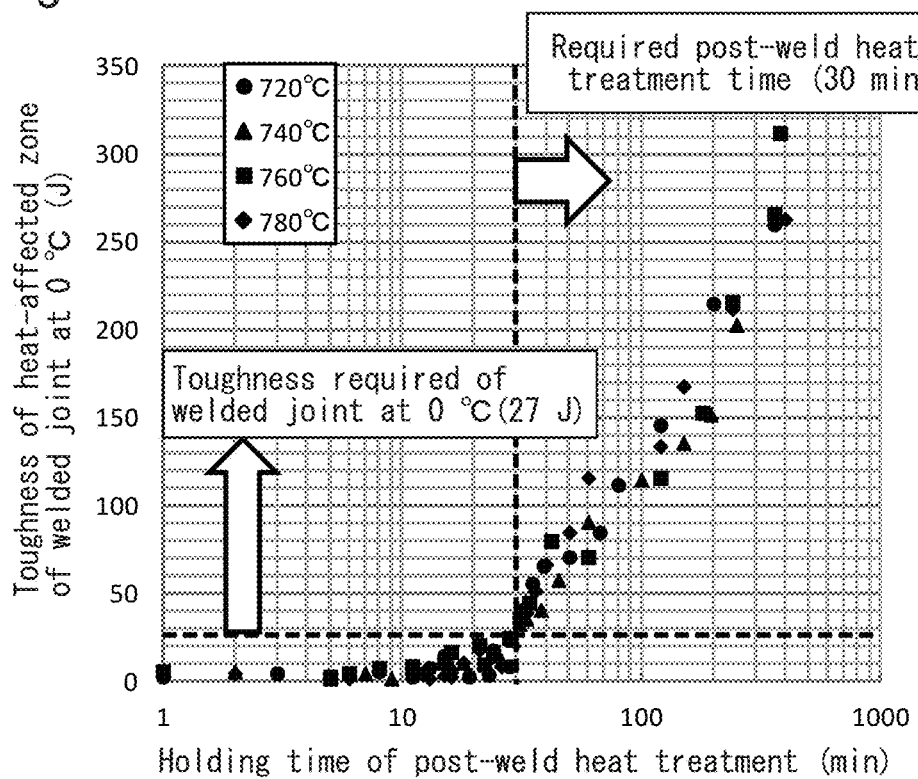
FIG. 9 is a graph showing the relationship between the toughness of the welded joint and the holding time of the post-weld heat treatment.

It can be seen that, when the post-weld heat treatment temperature is lower than 720° C. or higher than 780° C., the creep rupture strength decreases and does not exceed 75 MPa for 600° C., which is the target value of the present invention. Further, FIG. 9 shows the relationship between post-weld heat treatment time and Charpy impact absorbed energy for 0° C., obtained when the post-weld heat treatment was performed at various temperatures in the range of 720 to 780° C. It can be seen that the necessary toughness cannot be obtained unless the post-weld heat treatment is performed for 30 minutes or longer, regardless of temperature. The portion of the weld joint where the toughness can most easily decrease is the bond, in which the crystal grain size can easily increase; in view of this, in the following description, the toughness of the weld joint is represented by the Charpy absorbed energy measured on an impact test specimen with a notch of 2 mm at the bond. This does not apply when the toughness of other portions is discussed.

Figure 10:
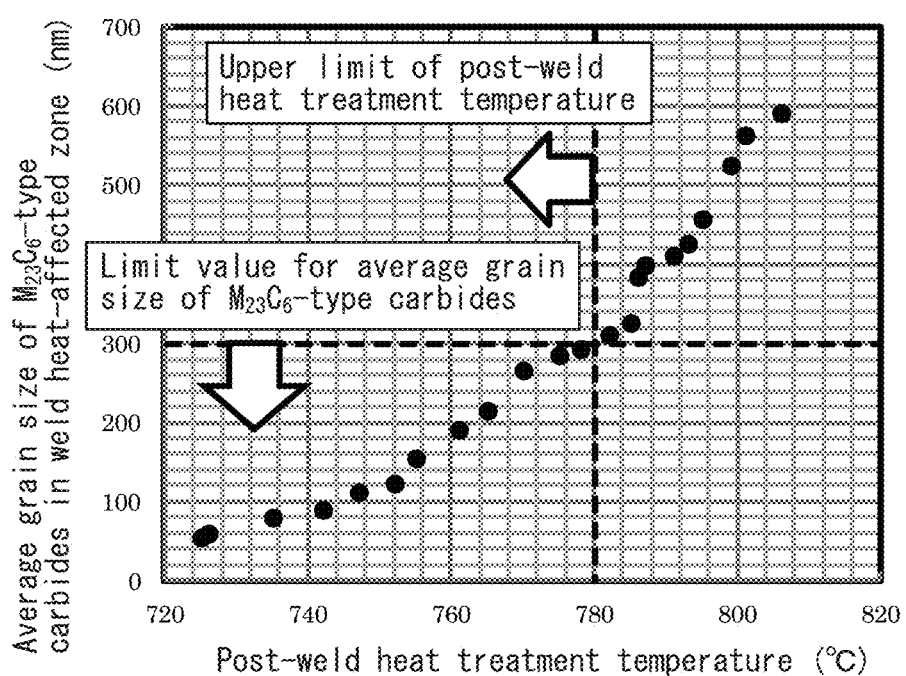
FIG. 10 is a graph showing the relationship between the post-weld heat treatment temperature and the average grain size of $M_{23}C_6$-type carbides.

FIG. 10 is a graph showing the relationship between the average grain size of $M_{23}C_6$-type carbides in the HAZ (average value of the diameters of circles that correspond to particles) and the post-weld heat treatment temperature. The experiments were made where the holding time at the post-weld heat treatment temperature was up to 10 hours. In these experiments, changes in the holding time hardly affected the average grain size of $M_{23}C_6$-type carbides regardless of temperature, and the grain size was effectively a function of temperature.

FIG. 10 clearly shows that, if the post-weld heat treatment temperature exceeds 780° C., $M_{23}C_6$-type carbides coarsen such that its average grain size exceeds 300 nm.

Figure 11:
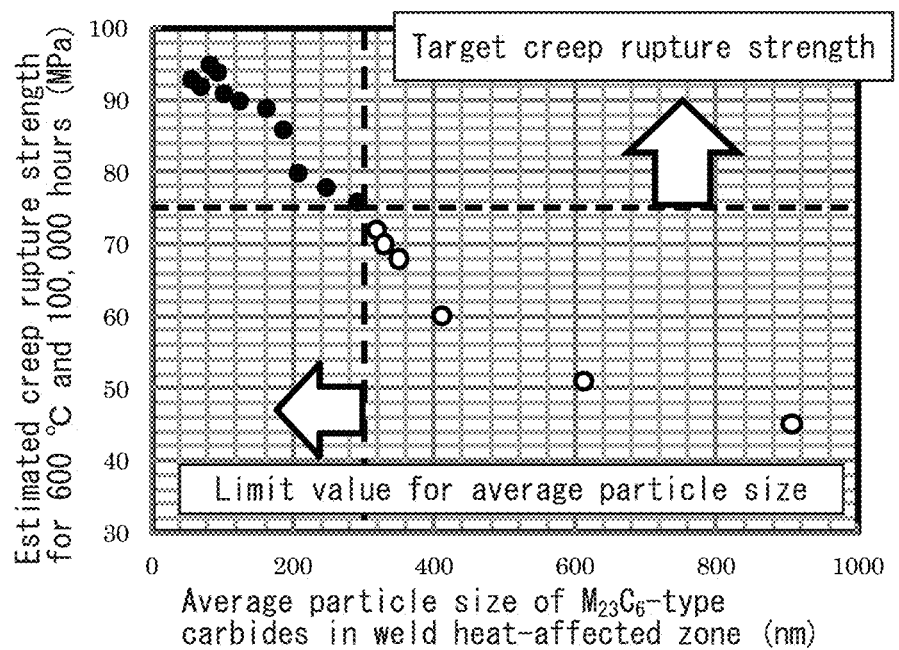
FIG. 11 is a graph illustrating the relationship between the average grain size of $M_{23}C_6$-type carbides and the estimated creep rupture strength for 600° C.

FIG. 11 shows the relationship between the average grain size of $M_{23}C_6$-type carbides and the estimated creep rupture strength for 600° C. and 100,000 hours. It can be seen that, if the average grain size exceeds 300 nm, Type IV damage occurs such that the estimated creep rupture strength does not reach the target value of 75 MPa. In the graph, ● represents an example with a normal creep rupture with ductility, and, separately, ○ represents an example with a low-ductility fracture due to Type IV damage where the result of an observation of the microstructure by electron microscopy enabled clearly identifying such damage.

Figure 12:
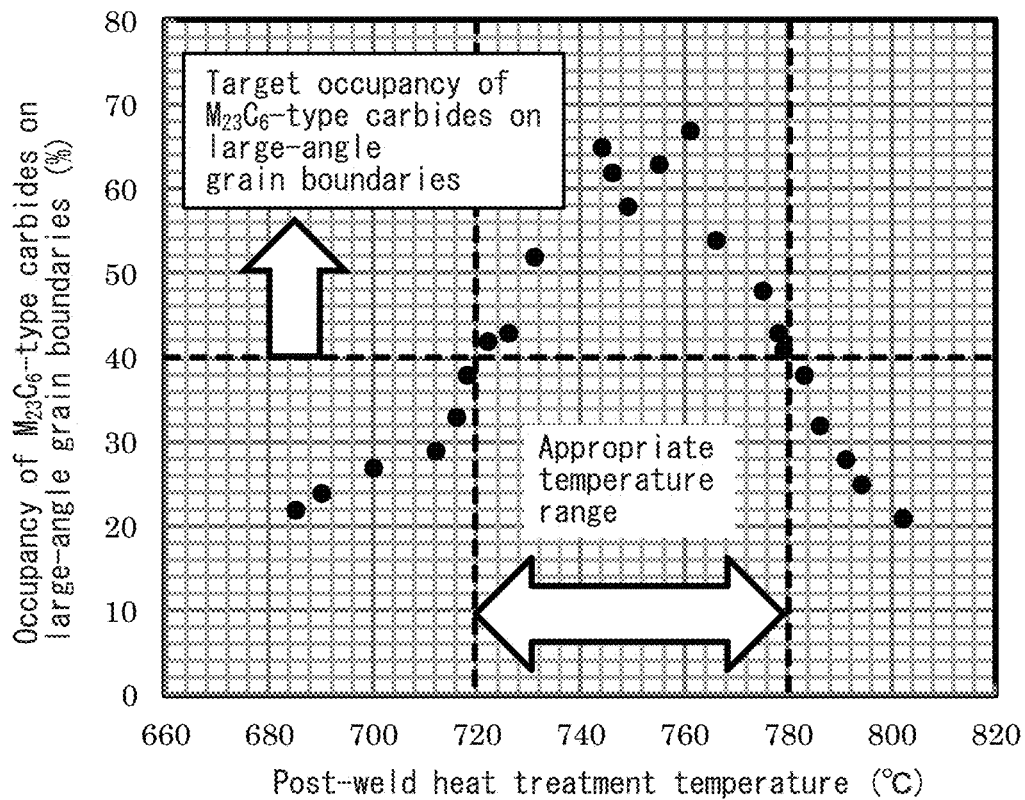
FIG. 12 is a graph showing the relationship between the post-weld heat treatment temperature and the coverage of large-angle grain boundaries with $M_{23}C_6$-type carbides.

FIG. 12 shows the relationship between the post-weld heat treatment temperature and the occupancy of large-angle grain boundaries of the HAZ with $M_{23}C_6$-type carbides (grain-boundary coverage). These tests were also conducted with holding times of 30 minutes to 10 hours; however, the graph does not show data groups separated depending on time because time dependency of precipitate size was not significant and, as a result, there were no significant differences in grain-boundary coverage. Temperature significantly affected grain-boundary coverage.

As shown in FIG. 10, precipitates coarsen when the post-weld heat treatment temperature exceeds 780° C. On the other hand, after the post-weld heat treatment for 30 minutes, an amount of $M_{23}C_6$-type carbides at that temperature close to the thermodynamic equilibrium value (particularly, amount determined by C concentration) has already precipitated, and thus a higher post-weld heat treatment temperature increases the average grain size and, at the same time, causes Ostwald ripening and reduces the number of particles (small particles are dissolved and large particles grow to reduce interface energy, thereby stabilizing the microstructure). That is, an increase of the size of particles causes smaller particles to disappear, and thus reduces the grain-boundary coverage with $M_{23}C_6$-type carbides. On the other hand, at a temperature below 720° C., $M_{23}C_6$-type carbides do not precipitate sufficiently to reach the amount of thermodynamic equilibrium; thus, even though the particle size is small, the inter-particle distance is large, in which case, too, 40%, which is a sufficient grain-boundary coverage, is not reached. That is, if only the pre-weld heat treatment is properly performed, this achieves complete solid solution of carbides but achieves only a precipitate state in which the creep strength of the material cannot be achieved in a stable manner.

Figure 13:
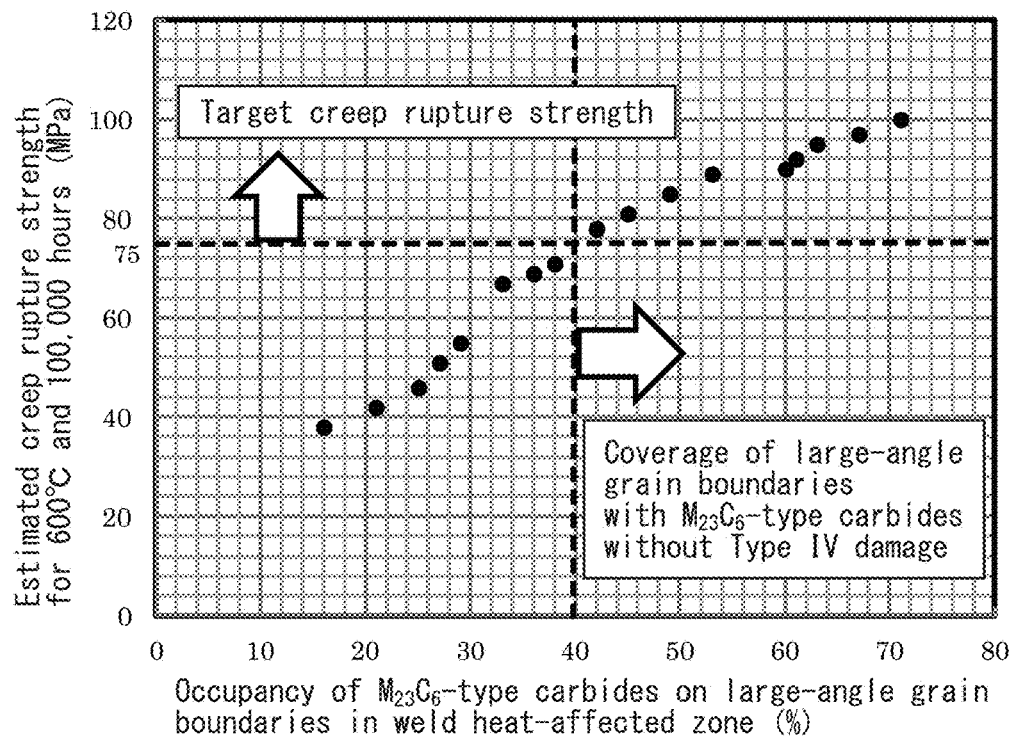
FIG. 13 is a graph showing the relationship between the coverage of large-angle grain boundaries with $M_{23}C_6$-type carbides and the estimated creep rupture strength for 600° C. and 100,000 hours.

Thus, experiments demonstrated that an appropriate pre-weld heat treatment and an appropriate post-weld heat treatment can achieve a grain-boundary coverage with $M_{23}C_6$-type carbides of 40% or more. Further, as shown in FIG. 13, a HAZ with a grain-boundary coverage with $M_{23}C_6$-type carbides of 40% or more provides an estimated creep rupture strength for 100,000 hours that is substantially equal to that of the base material, and causes no reduction in strength. Since there is no microstructure factor that would cause Type IV damage, complete prevention of this phenomenon is possible.

In the above-discussed experiments, the average grain size of precipitates (diameter of circles that correspond to particles) on large-angle grain boundaries was calculated in the following manner: first, a test specimen was subjected to the post-weld heat treatment and a microstructure cross section thereof was observed by SEM; subsequently, the grain-boundary microstructure forming ferrite was observed by EBSD in more detail. During this, grain boundaries for which the difference between the orientations of adjacent crystals was 15° or more and the angle between the orientations of adjacent crystals about the common rotational axis was a diffraction angle specific to block grain boundaries selected during martensite transformation, i.e. 54°, 60° and 16°, were drawn with EBSD-based SEM, and were treated as "block grain boundaries (large-angle grain boundaries)". A picture of precipitates of carbides precipitated on such large-angle grain boundaries (in the inventive steel, only $M_{23}C_6$-type carbides are precipitated upon completion of heat treatment) is taken by electron microscopy with a magnifying power of 10,000, and the diameter of particles on the cross section was determined based on this picture.

In such image pictures with a magnifying power of 10,000, five or more fields of view were observed for the heat-affected zone of one joint, and the cross-sectional areas of all these precipitate particles were measured; then, assuming that all of them were circular, backward calculation was performed from the areas to determine the diameters of the corresponding circles.

The maximum post-weld heat treatment depth was 100 mm. This is the same as the maximum pre-weld heat treatment depth. The post-weld heat treatment depth must not be smaller than the pre-weld heat treatment depth. The reason for this is obvious: this is necessary to achieve softening of high-density dislocation microstructure that has been quenched, which is the purpose of the post-weld heat treatment, and thus this treatment is applied to a depth equal to or larger than the pre-weld heat treatment. On the other hand, tempering a depth of the base material larger than 100 mm is identical with tempering the base material for a long time, particularly because the dislocations in martensite serve as an initial resistance during creep deformation; thus, such tempering reduces the high-temperature strength of the base material and, consequently, reduces the initial creep strength. In the steel associated with the present invention, performing the post-weld heat treatment on a range smaller than 100 mm does not soften the joint excessively and does not affect the high-temperature strength and initial creep strength; in view of this, the upper limit of the depth should be 100 mm.

(Features of Partial Pre-Weld Heat Treatment)

One feature of the present invention is to prevent incomplete solid solution of carbides in the HAZ by means of a pre-weld heat treatment.

Performing a pre-weld heat treatment on the entire material achieves the same effects as the present invention; however, performing a pre-weld heat treatment on an entire large pressure container is not practical from viewpoints of furnace capacity or heating capability and requires very high costs, and thus does not provide a realistic solution.

On the other hand, if a partial heat treatment is performed to enable complete solid solution of carbides in portions, as in the present invention, at least with some heating methods of the heat treatment equipment, the process is completed in a simple manner and in a short period of time if high-frequency heating equipment or electrical heating equipment, for example, is used, which significantly reduces costs and provides a realistic solution.

In all instances, a heat treatment by local heating has the problem of intermediate-temperature heating. That is, if only a target portion is heated to a target temperature, an intermediate-temperature region heated to a temperature range lower than the target temperature is present in adjacent portions. Thus, the possibility of there being portions in which the intended microstructure or effect is not achieved and the possibility of lower-temperature portions experiencing special microstructure changes must always be considered. However, it was verified by experiment that the present invention does not entail these problems.

If the pre-weld heat treatment is performed at 1050 to 1200° C., adjacent portions are reheated to a temperature range up to 1050° C., and there are portions that are heated to temperatures directly above the $Ac_3$ point that cause Type IV damage. In these portions, carbides may also coarsen due to incomplete solid solution.

However, Type IV damage is caused as a portion is exposed to a temperature directly above the α-to-γ transformation point for a short period of time and is transformed to γ phase to cause some carbides to be dissolved in the matrix in a short time and, before they are completely dissolved, they are cooled to produce undissolved carbides. Undissolved carbides are coarsened by the subsequent post-weld heat treatment. Further, since the positions of grain boundaries of recrystallized γ grains that are produced during this process are different from the positions of prior γ grain boundaries, coarsening of incompletely dissolved carbides occurs at positions that are completely different from those of the newly produced prior γ grain boundaries. Thus, the precipitation density on grain boundaries decreases such that a series of carbide precipitate particles for a long time is not achieved, resulting in relatively random coarse carbides, which leads to a relatively high mobility of dislocations.

The holding time for the portions heated to a temperature directly above the transformation point when heating occurs once, or the total holding time when heating occurs a plurality of times, is at most about 10 seconds. Thus, undissolved (incompletely dissolved) carbides remain, leading to coarsening during reprecipitation, and carbides that precipitated on the original prior γ grain boundaries cannot precipitate on the new prior γ grain boundaries that have been created by re-transformation in the weld heat-affected portion, and are left in grains.

In view of these phenomena, conversely, applying a sufficient holding time prevents production of undissolved carbides that would cause Type IV damage, i.e. incomplete solid solution of carbides even when the temperature is directly above the transformation point. This was proven by the present inventors by experiment. They found out by experiment that the time required for solid solution of carbides at a temperature directly above the transformation point is about 2 minutes, a conclusion obtained by heating test specimens to a temperature directly above the transformation point for different holding times, observing them in microstructure pictures by TEM and treating the time at which most $M_{23}C_6$-type carbides disappear in the field of view as the required time. That is, if heating occurs directly above the $Ac_3$ point for 2 minutes or longer for the pre-weld heat treatment for preventing incomplete solid solution of carbides in the weld heat-affected zone, carbides are completely dissolved in these portions and no Type IV damage occurs.

On the other hand, since the steel is heated from the edge surface, the heat-affected width expands from the edge surface to the interior of the steel over time such that the portion exposed to a temperature directly above the transformation point successively moves into the interior of the steel, which always leaves the possibility of there being portions that are heated for a short period of time.

Thus, if simply partial heating is applied to the edge surface, this movement of the heat-affected zone must be considered. If the heat-affected zone constantly moves toward the interior of the steel, the pre-weld heat treatment may create a new microstructure that may cause Type IV damage on the heating frontier.

Figure 14:
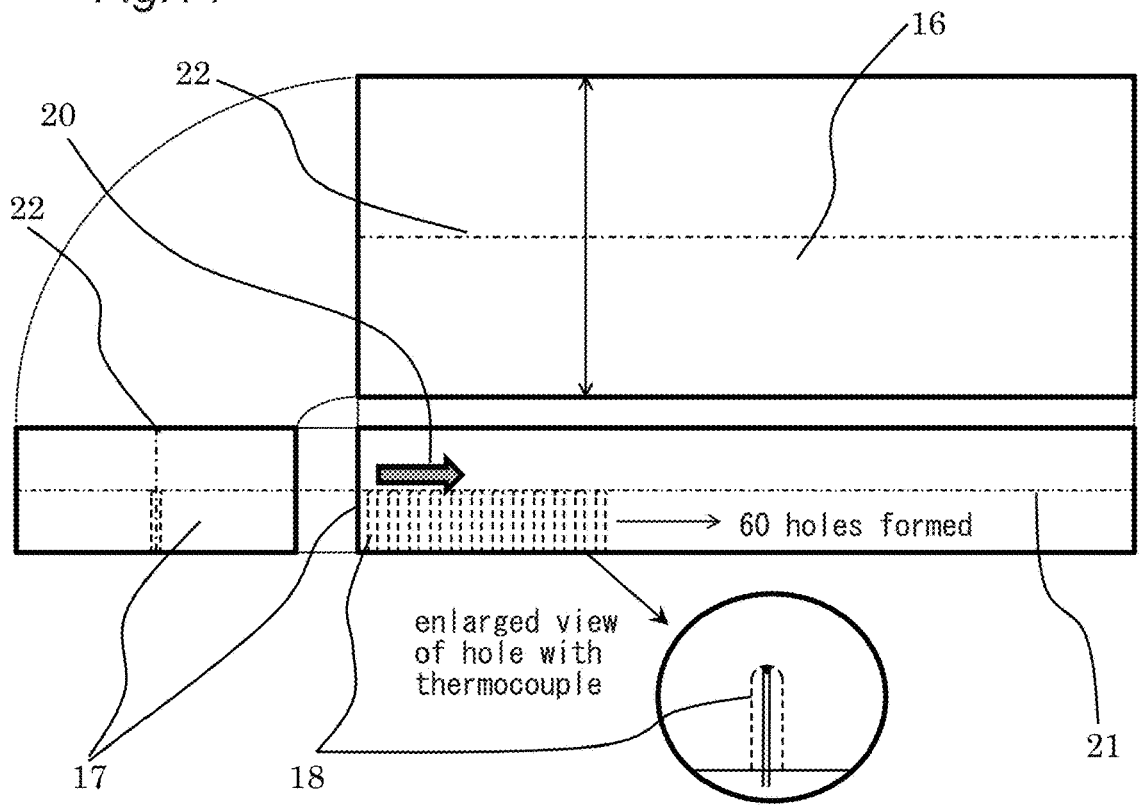
FIG. 14 is a schematic view (trihedral figure) of a steel-plate test specimen for measurement of temperature propagation in a thickness of 30 mm.

In view of this, the inventors did research to determine the movement behavior of the position of the portion where the temperature reaches the transformation point for α-to-γ transformation, using a steel plate with a thickness of 30 mm. FIG. 14 shows a schematic view of a test specimen used to measure how temperature propagates. First, holes with a pitch of 1 mm were formed on the surface of the steel plate beginning at the heated end surface 17 of the steel plate, each hole being 0.5 mm long and reaching the middle along the plate thickness of the steel plate, and a thermocouple was joined to the bottom of each hole. Then, the holes created for temperature measurement are filled with $Al_2O_3$ powder to prevent dissipation of heat from the holes for measurement. Then, the end is heated by high-frequency induction-heating equipment such that the outer-layer surface constantly remains at 1050° C., and the propagation behavior of temperature was examined using the thermocouples.

Figure 15:
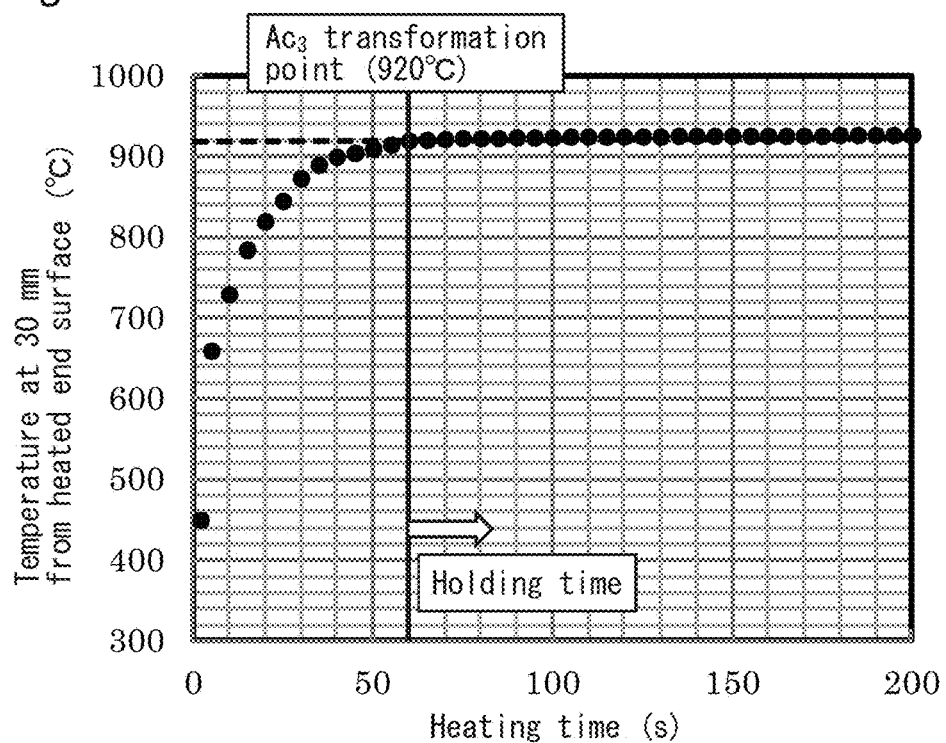
FIG. 15 is a graph showing the relationship between the temperature at 30 mm along the depth direction when the weld edge surface is heated to 1050° C., and the elapsed time.

In the test specimen 16 shown in FIG. 14, the holes 18 reaching the middle 21 along the plate thickness in which the temperature-measurement thermocouples 19 are to be positioned are arranged, beginning at the heated end surface 17, along the length 20 of the plate right at the middle 22 along the positional width. FIG. 15 shows how temperature changes with time at the distance of 30 mm from the heated end surface 17. The horizontal axis of FIG. 15 indicates heating time, i.e. the elapsed time from the time point at which temperature increase begins, and is different from holding time (i.e. elapsed time from the time point at which the target portion reached the set temperature). It is shown that, when the specimen is heated to 1050° C., the temperature at the position of 30 mm as a result of the heating by heat transfer from the heated end surface becomes substantially constant at about 60 seconds and, thereafter, the temperature gradually increases above 920° C., which is the $Ac_3$ transformation point of the steel of Table 1, although the increase is so small that almost no changes are recognizable.

This suggests that, if heat is supplied by heat transfer from only one end surface of the steel plate, the temperature gradient determined by the coefficient of heat transfer of the material is generally fixed after 60 seconds and, if the steel is sufficiently long with respect to heat input, the temperature distribution becomes similar to the one consistent with the temperature curve that assumes 0° C. in the infinite direction. That is, in portions distant by 30 mm or more, the maximum heating temperature gradually decreases from around 920° C. and the temperature does not increase from that level.

Since portions exposed to temperatures not higher than the $Ac_1$ point in a certain temperature gradient for two minutes or longer are not heated to temperatures not lower than the $Ac_1$ point, decomposition/solution of carbides for a short period of time does not occur, and thus undissolved carbides do not remain, that is, incomplete solid solution, which is partial solid solution of carbides, does not occur at all, leaving no possibility of Type IV damage occurring, even though softening due to a reduction of the dislocation density in the matrix may occur. In the portions that are retained at an intermediate temperature between the $Ac_1$ point and $Ac_3$ point, the microstructure simply becomes dual-phase, where the proportion is changing as a function of the maximum heating temperature; in the portions that have become γ phase, decomposition/solution of carbides occurs, and, if there is no change in the temperature distribution, complete decomposition/solution of carbides in the γ phase occurs and incomplete solid solution is not observed. That is, even in a temperature range where two phases coexist, there is no microstructure with incomplete solid solution of carbides, which would cause Type IV damage.

Figure 16:
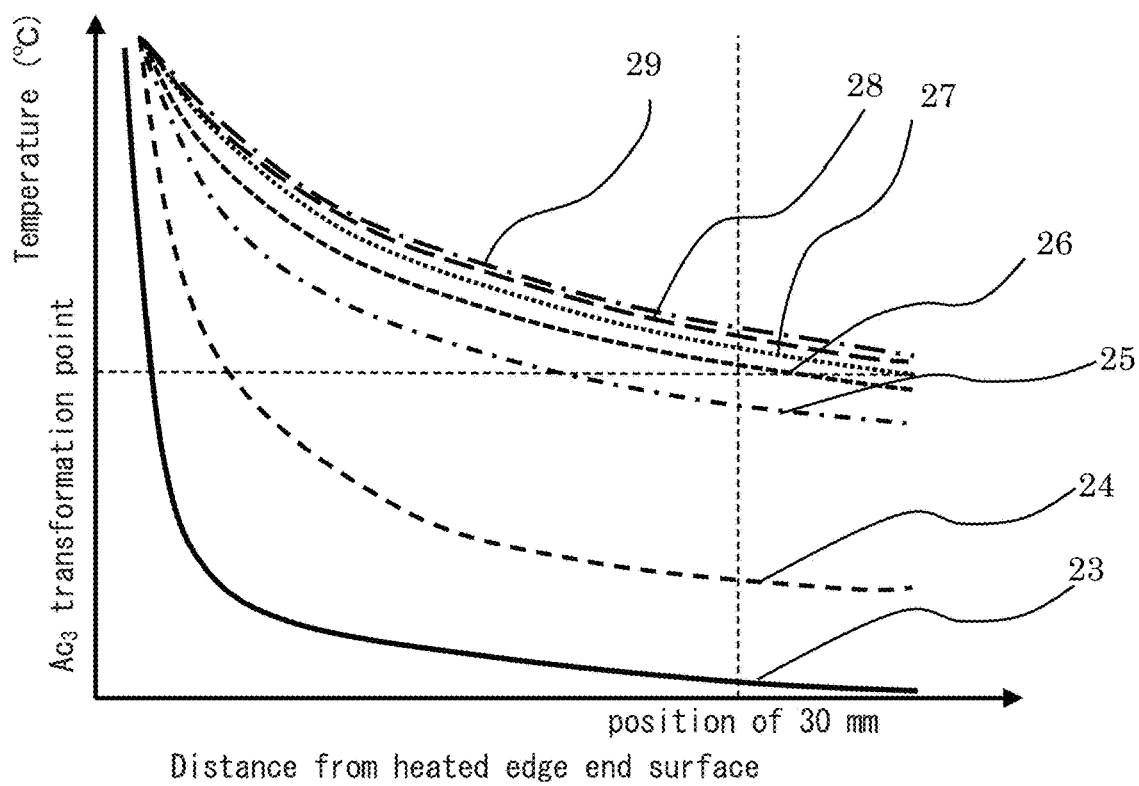
FIG. 16 is a graph showing how the temperature distribution along the depth direction changes depending on time when the weld edge surface is heated to 1050° C.

To verify these phenomena, the steel-plate test specimen shown in FIG. 14 was heated beginning with the edge end surface, and the temperatures indicated by the thermocouples at various positions were recorded when the specimen was held for the seven different periods of time of 10 seconds (23), 30 seconds (24), 60 seconds (25), 120 seconds (26), 300 seconds (27), 600 seconds (28), and 1200 seconds (29), and these temperatures were treated as indicating the temperature distribution at positions along the depth direction beginning with the edge surface to determine how temperature varied. The results are shown in FIG. 16. FIG. 16 also shows the position of 30 mm from the edge surface and the $Ac_3$ transformation point temperature.

The temperature distributions for 120 seconds and longer are not very different, because the heat release in the depth direction and the heat input from the edge surface, as represented as values per unit area, are generally balanced at 120 seconds and longer, resulting in no variation in this time range.

This verifies that, essentially, Type IV damage does not occur in the steel components presented by the present invention when the edge end surface is heated to a temperature of 1050 to 1200° C. and the region from the surface to the depth of 30 mm is held at this temperature for 2 minutes or longer, even considering changes in the widths of the melting of the base material and the HAZ during welding. Even when the temperature of the heated edge surface was 1200° C., the same effect was obtained in a broader heated region, which means even higher effectiveness.

This constant temperature distribution is obtained only when the volume of the steel is sufficiently large and the distance of diffusion of heat from the heated end surface is considered sufficiently large. If not only the edge surface, but also a larger region including other surfaces, or the entire steel is heated, the temperature distribution of the steel is not constant; instead, the portion at a temperature near the α-to-γ transformation point constantly moves such that continuous heating of a certain location to the same temperature for 60 seconds or longer, as discussed above, is not necessarily guaranteed. To ensure such a constant temperature distribution, the surface area being heated is preferably 50% or smaller of the entire member being heated to apply a constant temperature distribution to the base material, which works as a heat sink. This minimizes the inability to hold a constant temperature distribution caused by heating positions distant from the edge.

Further, since the steel practically has a finite size, even when only the edge surface is subjected to the pre-weld heat treatment, an ideal model environment with 0° C. in the infinite direction cannot be maintained such that heat transfer causes heat to be reflected from a side of the steel or the end surface opposite to the edge, resulting in a temperature distribution that is not constant. That is, FIG. 15 is not reproduced. To achieve constant temperature distribution, the length of the base material (dimension in the direction perpendicular to the end surface being heated) is preferably three times or more the pre-weld heat treatment depth.

Even if a sufficient region that serves as a heat sink is provided, it is possible that a constant temperature distribution cannot be maintained after continuous heating for a prolonged period of time due to a finite size. To ensure that the temperature distribution is constant, the upper limit of holding time should be 30 minutes. More preferably, the upper limit of heating time is 25 minutes, and still more preferably 20 minutes. Yet more preferably, the holding time is less than 10 minutes, and still more preferably not more than 8 minutes.

This constant heat transfer can be calculated three-dimensionally by one-dimensional difference calculus or FEM analysis by assuming the volume of a heat sink. This is preferable since it ensures that the present invention is effective, and also increases the effect of the present invention.

A technique using such a constant temperature distribution to prevent Type IV damage has no precedent. In the context of high-B steel, chemical components that do not produce a fine-grain region are used to prevent Type IV damage derived from local heat treatment, which means that there is no necessity of ensuring a constant temperature distribution, neither is there a necessity of using such a constant temperature distribution. Further, in such cases, 80 ppm or more B needs to be added, and a microstructure memory effect is used that uses retained γ present on lath boundaries, which are significant in B-added steel; on the other hand, a small amount of retained γ may remain in the base material or portions subjected to the pre-weld heat treatment such that toughness tends to decrease (see JP 2016-14178 A and JP 2016-130339 A). According to the present invention, the upper limit of added B is 50 ppm, which means a different steel type, and the memory effect using retained γ is not used. Therefore, as verified by the present inventors by separate experiments, in the microstructure, a fine-grain region is produced on the outer fringe of the HAZ, but the crystal grain size does not affect the creep properties of a ferritic heat-resistant steel at all. Thus, the present invention has a different HAZ microstructure and only controls the condition of precipitated carbides, and thus is a different technique.

Since the present invention eliminates the possibility of the presence of retained γ, the present invention advantageously has a better toughness than techniques that add 80 ppm or more B.

For the welded structure of the ferritic heat-resistant steel according to the present invention, the width or length on which the pre-weld heat treatment is performed is preferably 50% or less of the width or length of the structure (as discussed above, when the constant temperature distribution is also considered, they are more preferably ⅓ or less). The portions on which the pre-weld heat treatment has been performed can be identified in the following manner.

If the "width or length on which the post-weld heat treatment has been performed" is smaller than the "width or length on which the pre-weld heat treatment has been performed", the resulting structure includes regions where no $M_{23}C_6$-type carbides have precipitated. Thus, if regions without precipitated $M_{23}C_6$-type carbides are present, these regions enable determining whether the pre-weld heat treatment has been performed on a given portion.

On the other hand, if the portions on which the pre-weld heat treatment has not been performed are subjected to the post-weld heat treatment, it is not possible to increase the grain-boundary coverage with $M_{23}C_6$-type carbides to 40% or higher. Thus, if the "width or length on which the post-weld heat treatment has been performed" is larger than the "width or length on which the pre-weld heat treatment has been performed", whether or not the pre-weld heat treatment has been performed can be determined based on whether or not the grain-boundary coverage with $M_{23}C_6$-type carbides is not lower than 40%.

The presence/absence of $M_{23}C_6$-type carbides and the grain-boundary coverage with $M_{23}C_6$-type carbides can be determined by an observation by electron microscopy or a transmission electron-beam diffraction pattern analysis by TEM analysis, as discussed above.

Further, the portions on which the post-weld heat treatment has been performed can be identified by determining whether there is a lath structure of martensite. That is, the portions on which the pre-weld heat treatment has been performed and nearby portions are quenched beginning at a temperature lower than that for the base material, which means lower hardenability. Thus, in the portions on which the pre-weld heat treatment has been performed and nearby portions, lath development is so weak that performing the post-weld heat treatment on these portions causes the lath structure to disappear. Whether there is a lath structure can be easily determined by TEM or EBSD.

Figure 17:
FIG. 17 is an image of electron microscopy of a microstructure having a lath structure.
Figure 18:
FIG. 18 is an image of electron microscopy of a microstructure where a lath structure has disappeared.

FIG. 17 is an image of electron microscopy of a microstructure having a lath structure. FIG. 18 is an image of electron microscopy of a microstructure where a lath structure has disappeared. In FIG. 17, the microstructure has been subjected to the same heat history as the HAZ, and lath borders can been seen that extend parallel from the top left to the bottom right in the picture. In FIG. 18, performing the post-weld heat treatment on the microstructure of FIG. 17 has caused lath borders to disappear and to change to a microstructure called subgrains, which provide generally isotropic grains.

In the welded structure of the ferritic heat-resistant steel according to the present embodiment, the post-weld heat treatment is only performed on a portion of the structure. Thus, the welded structure of the ferritic heat-resistant steel according to the present embodiment includes a portion having a lath structure and a portion having no lath structure. According to the present embodiment, costs can be reduced and on-site operability can be increased over cases where the post-weld heat treatment is performed on the entire structure. Further, softening of the microstructure can be reduced compared with cases where the post-weld heat treatment is performed on the entire structure, thereby improving high-temperature strength and initial creep strength.

The chemical components of the heat-resistant steel of the present invention will now be described. "%" in the content of each element means "mass %".

C: 0.05 to 0.12%

C increases hardenability, and can form carbide $M_{23}C_6$, which is an important precipitation in the present invention. According to the present invention, 0.05% or more C is added to form martensite, which is necessary to improve creep rupture strength. To increase precipitation strengthening property, it is preferable to add 0.07% or more C. On the other hand, if the amount of C is too large, this produces coarse precipitates, which reduces grain-boundary coverage; in view of this, the amount of C should be not larger than 0.12%. Further, if the amount of C is large, coarsening of carbides produced on grain boundaries can be accelerated, which may reduce creep rupture strength; in view of this, the amount of C is more preferably not larger than 0.10%.

Si: 0.02 to 0.45%

Si is a deoxidizing element, and 0.02% or more Si should be added. To increase the effect of deoxidization, it is preferable to add 0.10% or more Si. Further, Si is effective to improve oxidation resistance, and it is more preferable to add 0.20% or more Si. On the other hand, if more than 0.45% Si is added, oxides including Si provide initiation points of brittle fracture, which may impair the toughness. Further, an excessive amount of Si added may replace Mo or W that has been dissolved and facilitate precipitation of $Fe_2Mo$ or $Fe_2W$, which may reduce creep rupture strength; in view of this, the amount of Si should be not larger than 0.45%. To increase toughness, the amount of Si is preferably not larger than 0.40%, and more preferably not larger than 0.35%.

Mn: 0.40 to 0.80%

Mn is a deoxidizer, and 0.40% or more Mn is added according to the present invention. Insufficient deoxidization may reduce toughness; in view of this, it is preferable to add 0.45% or more Mn. On the other hand, Mn is an austenite-forming element, and increases the mobility of dislocations to accelerate local microstructure recovery; thus, adding an excessive amount deteriorates creep properties. According to the present invention, the amount of Mn is not larger than 0.80% to ensure creep strength. To further increase creep rupture strength, the amount of Mn is preferably not larger than 0.70%, and more preferably smaller than 0.60%.

Cr: 8.0 to 12.0%

Cr is an important element that increases the hardenability of steel and, in the form of carbides, causes precipitation strengthening of steel. To increase creep rupture strength at temperatures not lower than 500° C., it is necessary to provide a certain amount of $M_{23}C_6$-type carbides mainly composed of Cr to quickly increase grain-boundary coverage; in view of this, according to the present invention, 8.0% or more Cr is added. When steam oxidation resistance is considered, it is preferable to add 8.5% or more Cr. On the other hand, adding an excessive amount of Cr accelerates coarsening of $M_{23}C_6$-type carbides at the temperature of 650° C., which deteriorates creep properties; in view of this, the amount of Cr should be not larger than 12.0%. Preferably, the amount of Cr is not larger than 10.5%; more preferably, the amount added is not larger than 9.50%.

Mo: 0.30 to 1.30%

Mo forms an intermetallic compound in the form of $Fe_2Mo$, precipitating mainly on large-angle grain boundaries. Precipitation on large-angle grain boundaries occurs to fill gaps between $M_{23}C_6$-type carbide particles such that the distance between precipitate particles on grain boundaries (inter-particle distance) becomes even smaller; in a long-time creep environment, even after large-angle grain boundaries have migrated, a series of precipitate particles remain such that a high stress is needed to allow dislocations to make their way therebetween; thus, Mo contributes to improvement of creep strength. At least 0.30% Mo is added to improve grain-boundary coverage, and it is preferable to add 0.80% or more Mo. On the other hand, if an excessive amount of Mo is added, this accelerates coarsening of $Fe_2Mo$-type intermetallic compounds; in view of this, the amount of Mo is preferably not larger than 1.10%. To further improve the long-time creep strength, it is necessary and more preferable to strictly control the added amount to be not larger than 1.05%.

N: 0.003 to 0.080%

N forms nitrides, and is effective in improving initial creep strength by means of precipitation of VN. To produce this effect, to give the minimum amount, the N content should be 0.003% or higher. Further, Al that has entered from refractories, for example, may bond with N, which may prevent provision of a sufficient amount of N to form VN. In view of such circumstances, it is preferable to add 0.010% or more N. However, an amount of N above 0.080% may coarsen VN or promote precipitation such that the effect of improving creep strength for a long period of time may not be produced; in view of this, the upper limit should be 0.080%. Further, N, when illuminated with neutrons, may become radioactive and cause embrittlement of steel; in view of this, when the heat-resistant steel is used in nuclear power plants or the like, the amount of N is preferably not larger than 0.060%.

Nb: 0.005 to 0.10%

Nb precipitates in the form of NbC-type carbides within grains to contribute to precipitation strengthening. If Nb precipitates in a complex manner with VN, it can prevent the movement of dislocations more effectively. When 0.005% Nb is added, the effect is present. To allow the use of more stable NbC carbides to achieve high-temperature strength, for example, it is preferable to add 0.010% or more Nb. More preferably, the lower limit of the added amount of 0.020%. To prevent the reduction of creep strength caused by early coarsening, the upper limit of the added amount should be 0.10%. In petrochemical plants or other facilities where toughness is important, the added amount is preferably limited so as to be not larger than 0.08% to reduce promotion of brittle-crack propagation due to NbC. Further, when fine NbC is to be dispersed evenly to produce a large complex precipitation effect with VN, discussed above, the amount of Nb is more preferably not larger than 0.06%.

V: 0.005 to 0.50%

V bonds with N to form nitrides, and precipitates in the form of VN within grains to contribute to precipitation strengthening. When 0.005% V is added, precipitation of VN is observed at or higher than 600° C. and in 1000 hours or longer, contributing to improvement of creep strength. To produce the complex precipitation strengthening with NbC more effectively, it is preferable to add 0.010% or more V, and more preferably 0.015% or more V. The ferritic heat-resistant steel associated with the present invention is mainly strengthened by precipitation strengthening on large-angle grain boundaries, and the effect of in-grain strengthening is not large for longer hours; still, V is an effective strengthening element when even the slightest improvement of creep strength is to be effected. However, if more than 0.50% V is added, in a long-time creep environment, V may transform to a Z phase such as $(V, Nb)_2N$, which grows rapidly, which may reduce creep strength; in view of this, the upper limit of the added amount should be 0.50%. Further, VN, when coarsened, reduces toughness. Thus, when reduction of toughness is to be prevented, it is desirable to add not more than 0.40% V, if V is to be added at all. More preferably, the amount of V is not larger than 0.35%.

According to the present invention, the contents of Ni, Cu, Al and B that have entered from cold iron sources, such as scrap, or refractories in the form of impurities are limited to the ranges provided below.

Ni: Less than 0.20%

Ni is effective in improving toughness and stabilizing austenite; however, Ni increases the mobility of dislocations and significantly reduces creep rupture strength; in view of this, the present invention limits its content. According to the present invention, to reduce the reduction in the creep rupture strength for a long time, the amount of Ni is limited so as to be below 0.20%. To increase creep properties, the Ni content is more preferably limited so as to be not higher than 0.15%, and still more preferably limited so as to be not higher than 0.10%.

Cu: Less than 0.20%

Cu is effective in stabilizing austenite; however, during manufacture using normalizing and tempering, as in the present invention, Cu precipitates independently in the steel in the form of ε-Cu (metallic Cu). When the steel is heated to 1100° C. or higher during hot working, only iron is oxidized such that, when Cu gathers on grain boundaries, local low-melting-point metal accumulation zones are formed, potentially causing grain-boundary peel cracking (hot shortness). Thus, in the context of the present invention, Cu contributes to stabilization of austenite; however, since its effect on hot workability is large, the amount of Cu should be limited so as to be smaller than 0.20%. To increase manufacturability, the Cu content is more preferably limited so as to be not higher than 0.15%, and more preferably limited so as to be not higher than 0.10%.

Al: Less than 0.025%

In the context of the present invention, Al bonds with N to precipitate in the form of AlN; however, AlN precipitates within grains as coarse and needle-shaped particles, and does not contribute to strengthening. When its nature as coarse particles is considered, the amount of Al should be limited so as to be smaller than 0.025% to provide toughness. On the other hand, Al is effective as a deoxidizer and works to reduce the oxygen concentration in the steel; however, in the context of the present invention, which is directed to steel to which V is added, Al prevents precipitation of VN and may reduce improvement of creep strengthening; in view of this, the amount of Al is more preferably limited so as to be not larger than 0.020%. In pressure containers for environments with stricter toughness requirements, it is yet more preferably not larger than 0.015%.

B: Less than 0.005%

Typically, when the steel associated with the present invention is produced in the same steel-making process after production of a B-containing steel, B may enter the steel mainly from refractories. B itself increases the hardenability of steel; however, in a steel with a relatively high nitrogen concentration as in the present invention, B forms BN, which may deteriorate toughness; in view of this, the B content should be limited so as to be lower than 0.005%. Adding B may result in an excessively high hardenability of high-Cr steel, and promotes the production of retained γ, which is stable in room temperature, on lath boundaries and is concentrated in the retained γ to stabilize it such that the retained γ may not be easily decomposed even with high-temperature tempering. During an impact test of steel, retained γ experiences strain-induced transformation at stress-concentration sites at the tip of a crack and, though as fine particles, transforms to martensite and may cause embrittlement of these portions; in view of this, the amount of B is preferably not larger than 0.004%. In environments with stricter toughness requirements, it is more preferably not larger than 0.003%.

Further, according to the present invention, P, S and O are impurities, and thus their contents are limited as follows.

P: Less than 0.020%

P segregates on grain boundaries, promoting grain-boundary fracture and reducing toughness; in view of this, the P content should be limited so as to be lower than 0.020%.

S: Less than 0.010%

S bonds with Mn to form coarse MnS; to prevent the resulting reduction of toughness, the S content should be limited so as to be lower than 0.010%

O: Lower than 0.010%

O forms clusters of oxides, which represent initiation points of brittle fracture, reducing toughness; in view of this, the O content should be limited so as to be lower than 0.010%.

Ti: 0 to 0.15%

Zr: 0 to 0.15%

According to the present invention, to cause TiN and ZrN, which are nitrides working as a barrier to the movement of dislocations to improve creep strength, to precipitate within and on grains as necessary, one or both of Ti and Zr may be added independently or as a combination. In the case of grain-boundary precipitation, they contribute to improvement of grain-boundary coverage to effect the creep-strength improvement; in the case of precipitation within grains, they act to resist the movement of direct dislocations to reduce the apparent mobility of dislocations. To ensure that these effects are produced, it is preferable to add these elements in 0.005% or more; adding them in more than 0.15% may form clusters of oxides because of their high deoxidization power, thus potentially reducing toughness. In view of this, the upper limit of the added amount of each of these elements is limited to 0.15%. In pressure containers where toughness is important, it is preferable to add them in 0.10% or less. More preferably, the amount is not larger than 0.08%.

W: 0 to 2.0%

Re: 0 to 3.5%

Similarly, adding W and Re, which have similar effects to Mo, is possible and preferable in the present invention. In steel, W mainly precipitates on grain boundaries as $Fe_2W$-type Laves phase, contributing to improvement of grain-boundary coverage. Precipitation occurs late: even at a high temperature of 600° C., precipitation only begins after 50 hours or later; thus, W does not affect Type IV damage. W mainly precipitates on grain boundaries and have large atomic weights, and thus its effects appear when it is added in 1.5% or more. On the other hand, if 2.0% or more W is added, it precipitates in the form of $\chi$ phase, which reduces hot workability; especially when it precipitates in segregation positions during hot working, it may cause hot cracking; in view of this, the amount added is limited so as to be up to 2.0%. In pressure containers with strict toughness requirements, it is more preferably limited so as to be not higher than 1.90%. Similarly, Re forms Laves phase. In such cases, due to high affinity with Cr, Re usually takes the form of $CR_2Re$. If 0.5% Re is added, it begins to precipitate early, and adding up to 3.5% Re increases the improvement of grain-boundary coverage. However, when Re precipitates on grain boundaries, its precipitate size itself is large, and precipitation is half-harmonized, leading to a significant reduction of toughness; in view of this, when applied to pressure containers that specify strict toughness requirements, the amount of Re is preferably not larger than 3.0%, and, since Re is an expensive element, the amount of Re added is preferably not larger than 2.0% to minimize costs.

Further, according to the present invention, to control the status of inclusions such as oxides or sulfides, it is preferable to add one or more of Ca, Mg, Y, Ce and La.

Ca, Mg: 0 to 0.0050%

Y, Ce, La: 0 to 0.0500%

Ca, Mg, Y, Ce and Le are elements used to control the status of sulfides; to reduce the reduction of hot workability or toughness due to MnS, it is preferable to add one or more of them. Particularly, to prevent production of MnS extending in the roll direction in central portions along the plate thickness, it is preferable to add Ca and Mg in 0.0003% or more and Y, Ce and La in 0.010% or more. On the other hand, Ca, Mg, Y, Ce and La are powerful deoxidizing elements, and adding excessive amounts leads to production of clusters of oxides, potentially reducing toughness. In view of this, the amounts of Ca and Mg each should be not larger than 0.0050%, and the amounts of Y, Ce and La each should be not larger than 0.0500%. To increase toughness, preferably, each of the amounts of Ca and Mg is not larger than 0.0040% and each of the amounts of Y, Ce and La is not larger than 0.0300%; more preferably, each of the amounts of Y, Ce and La is not larger than 0.0200%

In the present embodiment described above and other embodiments, essentially, the balance is made of Fe, and small amounts of elements that do not impair the effects of the present invention, such as unavoidable impurities, may be present.

Now, a method of hot working in the method of manufacturing the welded structure of the ferritic heat-resistant steel of the present invention will be described.

Specifically, a billet having the above-described chemical composition is heated to a temperature between the $Ac_3$ point and 1200° C. to perform hot rolling to produce a steel plate with a plate thickness of 5 mm or larger, for example. Thereafter, under the above-described conditions, edge machining, the pre-weld heat treatment, welding and the post-weld heat treatment are performed to produce the welded structure of the ferritic heat-resistant steel of the present invention. In the case of a steel pipe, too, a billet is heated to a temperature between the $Ac_3$ point and 1200° C. and is subjected to hot forging or hot extrusion or hot forming/rolling (seamless rolling) to produce a tubular formed product. Ends of such steel pipes are made to butt each other and are subjected to the pre-weld heat treatment of the present invention to produce a welded joint without causing Type IV damage, thus forming a welded structure of a ferritic heat-resistant steel. In a similar manner, steel plates may be used to produce a pressure container.

While the welded structure of the ferritic heat-resistant steel according to the present embodiment and the method of manufacturing the same have been described, the edge of the present invention is not limited to any particular shape to sufficiently produce the effect of the present invention. That is, other than a V edge as described in the present embodiment, an X edge, an I edge, or a K edge may be selected appropriately depending on the use and size.

Further, as to the weld method, the "pre-weld heat treatment" of the present invention is effective when arc welding, inert-gas atmosphere arc welding, electron-beam welding, laser welding, resistance welding, friction-diffusion welding, spot welding, liquid-phase diffusion welding, or any other welding or joining method that involves a weld heat-affected zone and may develop Type IV damage is selected or two or more of them are combined as appropriate, thereby prevent Type IV damage in a reliable manner.

EXAMPLES

The present invention will now be described in more detail with reference to examples. The conditions of the examples described below are exemplary conditions adopted to verify the possibility of carrying out the present invention and its effects, and the present invention is not limited to these exemplary conditions. Further, in connection with the present invention, various conditions may be adopted without departing from the spirit of the present invention as long they achieve the objectives of the present invention.

The steels having the chemical compositions shown in Tables 3 and 4 were melted by an electric furnace or melted and cast by a manufacturing process having a consistent pig-iron/steel step in scales of 50 kg to 150 t to produce ingots or cast slabs. Subsequently, these ingots or slabs were hot worked by subjecting them to hot rolling or hot forging to produce steel pipes or steel plates with the desired shape. Thereafter, they were normalized in the temperature range of 1000 to 1180° C. to form martensite in the steel; then, they were tempered in the temperature range of 740 to 790° C. for one hour or longer to produce a microstructure with a single phase of "tempered martensite" and, at the same time, the material was softened before the steel pipes or steel plates were subjected to a hot working or cold working process in which they were reheated to a temperature equal to or lower than the tempering temperature, thereby producing the desired final shape. Table 6 shows final shapes of the resulting structures ("steel pipe" or "steel plate for pressure container").

TABLE 3

TABLE 3 (to be continued in TABLE 4)

Chemical components (in mass %, balance Fe and impurities)

| Steel No. | C | Si | Mn | Cr | P | S | Mo | Nb | V | N | W | Re | Ti |
|---|---|---|---|---|---|---|---|---|---|---|---|---|---|
| 1 | 0.064 | 0.40 | 0.41 | 10.89 | 0.0103 | 0.0064 | 0.76 | 0.024 | 0.140 | 0.0125 | | | |
| 2 | 0.053 | 0.06 | 0.48 | 11.51 | 0.0099 | 0.0025 | 1.13 | 0.043 | 0.470 | 0.0411 | | | |
| 3 | 0.070 | 0.18 | 0.46 | 8.81 | 0.0120 | 0.0037 | 1.16 | 0.068 | 0.111 | 0.0109 | | | |
| 4 | 0.087 | 0.16 | 0.49 | 10.19 | 0.0042 | 0.0001 | 1.11 | 0.085 | 0.035 | 0.0738 | | | |
| 5 | 0.053 | 0.09 | 0.72 | 11.78 | 0.0104 | 0.0036 | 1.19 | 0.005 | 0.017 | 0.0454 | | | |
| 6 | 0.066 | 0.27 | 0.61 | 8.36 | 0.0084 | 0.0032 | 1.05 | 0.083 | 0.434 | 0.0581 | | | |
| 7 | 0.104 | 0.22 | 0.50 | 11.26 | 0.0085 | 0.0054 | 0.99 | 0.014 | 0.184 | 0.0084 | | | |
| 8 | 0.111 | 0.41 | 0.63 | 8.68 | 0.0060 | 0.0008 | 1.13 | 0.095 | 0.489 | 0.0251 | | | |
| 9 | 0.104 | 0.11 | 0.46 | 9.14 | 0.0050 | 0.0021 | 0.50 | 0.042 | 0.132 | 0.0266 | | | |
| 10 | 0.103 | 0.37 | 0.73 | 10.02 | 0.0114 | 0.0025 | 1.10 | 0.085 | 0.158 | 0.0566 | | | |
| 11 | 0.094 | 0.38 | 0.44 | 11.00 | 0.0100 | 0.0065 | 1.09 | 0.040 | 0.454 | 0.0177 | | | |
| 12 | 0.062 | 0.14 | 0.49 | 10.10 | 0.0058 | 0.0057 | 1.07 | 0.055 | 0.123 | 0.0240 | | | |
| 13 | 0.088 | 0.18 | 0.60 | 8.99 | 0.0028 | 0.0052 | 0.72 | 0.055 | 0.220 | 0.0211 | | 2.18 | |
| 14 | 0.082 | 0.28 | 0.46 | 8.33 | 0.0106 | 0.0004 | 1.19 | 0.074 | 0.231 | 0.0174 | 1.72 | | |
| 15 | 0.088 | 0.31 | 0.41 | 10.11 | 0.0088 | 0.0023 | 0.80 | 0.012 | 0.072 | 0.0728 | 1.60 | 0.87 | |
| 16 | 0.098 | 0.07 | 0.74 | 8.76 | 0.0116 | 0.0020 | 0.39 | 0.057 | 0.310 | 0.0572 | | | 0.120 |
| 17 | 0.107 | 0.22 | 0.61 | 11.45 | 0.0018 | 0.0009 | 0.92 | 0.017 | 0.161 | 0.0231 | | | |
| 18 | 0.085 | 0.30 | 0.63 | 8.13 | 0.0020 | 0.0051 | 0.33 | 0.080 | 0.148 | 0.0482 | | | 0.024 |
| 19 | 0.055 | 0.06 | 0.48 | 9.87 | 0.0011 | 0.0020 | 1.12 | 0.094 | 0.394 | 0.0760 | 1.51 | | 0.042 |
| 20 | 0.063 | 0.40 | 0.57 | 9.99 | 0.0069 | 0.0054 | 0.90 | 0.046 | 0.314 | 0.0099 | | 1.45 | |
| 21 | 0.077 | 0.19 | 0.70 | 8.98 | 0.0038 | 0.0021 | 0.69 | 0.050 | 0.208 | 0.0381 | 1.70 | 0.81 | 0.045 |
| 22 | 0.052 | 0.26 | 0.64 | 11.27 | 0.0065 | 0.0021 | 0.70 | 0.011 | 0.322 | 0.0333 | 1.60 | 1.16 | |
| 23 | 0.054 | 0.15 | 0.59 | 8.66 | 0.0044 | 0.0012 | 1.06 | 0.085 | 0.019 | 0.0256 | 1.52 | | 0.118 |
| 24 | 0.058 | 0.35 | 0.45 | 8.38 | 0.0036 | 0.0026 | 1.18 | 0.052 | 0.112 | 0.0386 | | 0.86 | |
| 25 | 0.069 | 0.30 | 0.71 | 10.36 | 0.0115 | 0.0033 | 0.67 | 0.006 | 0.351 | 0.0472 | 1.75 | 0.91 | |
| 26 | 0.080 | 0.02 | 0.69 | 10.61 | 0.0074 | 0.0044 | 1.24 | 0.069 | 0.437 | 0.0206 | 1.82 | | 0.113 |
| 27 | 0.096 | 0.17 | 0.50 | 11.49 | 0.0090 | 0.0055 | 1.14 | 0.012 | 0.389 | 0.0045 | | | |
| 28 | 0.074 | 0.05 | 0.58 | 9.14 | 0.0112 | 0.0028 | 1.08 | 0.034 | 0.218 | 0.0688 | | | |
| 29 | 0.079 | 0.41 | 0.44 | 8.59 | 0.0089 | 0.0038 | 1.20 | 0.092 | 0.248 | 0.0641 | 1.56 | 1.83 | |
| 30 | 0.060 | 0.19 | 0.47 | 9.90 | 0.0036 | 0.0057 | 0.71 | 0.035 | 0.174 | 0.0219 | 1.73 | 2.55 | |
| 31 | 0.090 | 0.25 | 0.50 | 11.05 | 0.0063 | 0.0035 | 0.32 | 0.093 | 0.401 | 0.0502 | 1.87 | | |
| 32 | 0.085 | 0.09 | 0.60 | 8.97 | 0.0096 | 0.0034 | 0.55 | 0.046 | 0.208 | 0.0308 | | | 0.056 |
| 33 | 0.090 | 0.18 | 0.50 | 11.41 | 0.0095 | 0.0055 | 0.66 | 0.067 | 0.191 | 0.0336 | | | 0.072 |
| 34 | 0.059 | 0.37 | 0.52 | 8.23 | 0.0075 | 0.0014 | 0.47 | 0.045 | 0.188 | 0.0481 | 1.78 | 0.57 | |
| 35 | 0.070 | 0.16 | 0.67 | 11.72 | 0.0110 | 0.0055 | 1.18 | 0.030 | 0.146 | 0.0673 | | 2.20 | |
| 36 | 0.068 | 0.28 | 0.63 | 8.11 | 0.0069 | 0.0054 | 0.37 | 0.067 | 0.007 | 0.0327 | 1.93 | 1.49 | 0.049 |
| 37 | 0.065 | 0.31 | 0.45 | 11.23 | 0.0009 | 0.0059 | 0.39 | 0.046 | 0.070 | 0.0080 | 1.55 | | |
| 38 | 0.054 | 0.36 | 0.72 | 11.45 | 0.0065 | 0.0055 | 0.64 | 0.012 | 0.191 | 0.0184 | | | 0.093 |
| 39 | 0.053 | 0.11 | 0.57 | 11.12 | 0.0068 | 0.0016 | 0.64 | 0.046 | 0.211 | 0.0333 | 1.94 | | |
| 40 | 0.098 | 0.15 | 0.46 | 11.47 | 0.0102 | 0.0028 | 0.39 | 0.037 | 0.385 | 0.0372 | 1.76 | | 0.105 |
| 41 | 0.074 | 0.38 | 0.42 | 8.07 | 0.0113 | 0.0059 | 0.60 | 0.031 | 0.379 | 0.0041 | | 2.27 | 0.130 |
| 42 | 0.113 | 0.39 | 0.41 | 11.34 | 0.0008 | 0.0040 | 0.59 | 0.039 | 0.290 | 0.0410 | 1.55 | 1.47 | 0.008 |
| 43 | 0.115 | 0.21 | 0.70 | 8.95 | 0.0118 | 0.0057 | 0.46 | 0.078 | 0.389 | 0.0219 | 1.95 | | |
| 44 | 0.108 | 0.21 | 0.54 | 8.50 | 0.0072 | 0.0036 | 0.53 | 0.018 | 0.288 | 0.0575 | | | |
| 45 | 0.110 | 0.09 | 0.57 | 11.31 | 0.0004 | 0.0012 | 0.39 | 0.058 | 0.489 | 0.0662 | 1.84 | 2.89 | |
| 46 | 0.103 | 0.18 | 0.61 | 10.10 | 0.0106 | 0.0034 | 0.96 | 0.066 | 0.153 | 0.0360 | 1.80 | | 0.077 |
| 47 | 0.102 | 0.31 | 0.72 | 11.76 | 0.0023 | 0.0056 | 0.42 | 0.049 | 0.333 | 0.0306 | 1.82 | 1.69 | 0.109 |
| 48 | 0.064 | 0.30 | 0.72 | 9.89 | 0.0078 | 0.0013 | 0.85 | 0.039 | 0.369 | 0.0188 | 1.52 | | 0.119 |
| 49 | 0.086 | 0.07 | 0.62 | 8.28 | 0.0117 | 0.0004 | 0.90 | 0.079 | 0.342 | 0.0575 | | | 0.072 |
| 50 | 0.098 | 0.14 | 0.57 | 10.63 | 0.0008 | 0.0057 | 0.79 | 0.089 | 0.154 | 0.0288 | 1.54 | | |

TABLE 4

TABLE 4 (continued from TABLE 3)

Chemical components (in mass %, balance Fe and impurities)

| Steel No. | Zr | Ni | Cu | Ca | Mg | Y | Ce | La | Al | B | O |
|---|---|---|---|---|---|---|---|---|---|---|---|
| 1 | | 0.03 | 0.08 | | | | | | 0.007 | 0.0045 | 0.0073 |
| 2 | | 0.10 | 0.03 | | | | | | 0.018 | 0.0016 | 0.0080 |
| 3 | | 0.02 | 0.06 | | | | | | 0.007 | 0.0023 | 0.0019 |
| 4 | | 0.11 | 0.04 | | | | | | 0.015 | 0.0029 | 0.0093 |
| 5 | | 0.02 | 0.15 | | | | | | 0.008 | 0.0029 | 0.0072 |
| 6 | | 0.13 | 0.04 | | | | | | 0.018 | 0.0041 | 0.0074 |

TABLE 4-continued

TABLE 4 (continued from TABLE 3)

Chemical components (in mass %, balance Fe and impurities)

| Steel No. | Zr | Ni | Cu | Ca | Mg | Y | Ce | La | Al | B | O |
|---|---|---|---|---|---|---|---|---|---|---|---|
| 7 |  | 0.04 | 0.02 |  |  |  |  |  | 0.001 | 0.0044 | 0.0018 |
| 8 |  | 0.04 | 0.13 |  |  |  |  |  | 0.006 | 0.0002 | 0.0037 |
| 9 |  | 0.04 | 0.09 |  |  |  |  |  | 0.017 | 0.0024 | 0.0006 |
| 10 |  | 0.04 | 0.06 |  |  |  |  |  | 0.021 | 0.0031 | 0.0036 |
| 11 |  | 0.04 | 0.15 |  |  |  |  |  | 0.019 | 0.0039 | 0.0074 |
| 12 |  | 0.03 | 0.12 |  |  |  |  |  | 0.019 | 0.0015 | 0.0022 |
| 13 |  | 0.14 | 0.09 | 0.0021 |  |  |  |  | 0.015 | 0.0004 | 0.0070 |
| 14 |  | 0.09 | 0.11 |  | 0.0035 |  |  |  | 0.014 | 0.0007 | 0.0024 |
| 15 |  | 0.13 | 0.01 |  |  | 0.0230 |  |  | 0.005 | 0.0023 | 0.0057 |
| 16 |  | 0.01 | 0.03 |  |  |  | 0.0262 |  | 0.005 | 0.0046 | 0.0061 |
| 17 | 0.076 | 0.01 | 0.00 |  |  |  |  | 0.0364 | 0.002 | 0.0018 | 0.0037 |
| 18 | 0.017 | 0.14 | 0.13 | 0.0041 | 0.0033 |  |  |  | 0.020 | 0.0032 | 0.0062 |
| 19 |  | 0.02 | 0.07 |  | 0.0035 | 0.0157 |  |  | 0.017 | 0.0000 | 0.0020 |
| 20 | 0.025 | 0.12 | 0.01 |  | 0.0103 | 0.0246 |  |  | 0.004 | 0.0008 | 0.0060 |
| 21 |  | 0.15 | 0.03 |  |  |  | 0.0161 | 0.0419 | 0.013 | 0.0005 | 0.0067 |
| 22 | 0.030 | 0.10 | 0.15 | 0.0016 | 0.0009 | 0.0286 |  |  | 0.019 | 0.0045 | 0.0007 |
| 23 | 0.044 | 0.07 | 0.08 |  | 0.0012 | 0.0400 | 0.0102 |  | 0.012 | 0.0016 | 0.0098 |
| 24 | 0.082 | 0.15 | 0.02 |  |  | 0.0276 | 0.0205 | 0.0170 | 0.021 | 0.0017 | 0.0066 |
| 25 |  | 0.09 | 0.00 | 0.0018 | 0.0014 | 0.0124 | 0.0329 |  | 0.015 | 0.0034 | 0.0064 |
| 26 |  | 0.07 | 0.03 | 0.0044 | 0.0045 | 0.0327 |  | 0.0413 | 0.004 | 0.0007 | 0.0068 |
| 27 | 0.027 | 0.04 | 0.07 | 0.0042 | 0.0013 |  | 0.0196 | 0.0306 | 0.015 | 0.0036 | 0.0096 |
| 28 | 0.085 | 0.09 | 0.00 | 0.0010 |  | 0.0280 | 0.0431 | 0.0131 | 0.021 | 0.0005 | 0.0087 |
| 29 | 0.081 | 0.08 | 0.04 |  | 0.0022 | 0.0416 | 0.0191 | 0.0283 | 0.007 | 0.0044 | 0.0008 |
| 30 | 0.015 | 0.05 | 0.13 | 0.0031 | 0.0005 | 0.0428 | 0.0307 | 0.0203 | 0.014 | 0.0044 | 0.0035 |
| 31 | 0.105 | 0.08 | 0.02 |  |  |  |  |  | 0.006 | 0.0019 | 0.0098 |
| 32 |  | 0.11 | 0.13 | 0.0012 | 0.0020 |  |  |  | 0.010 | 0.0014 | 0.0054 |
| 33 |  | 0.11 | 0.12 | 0.0040 |  |  | 0.0261 | 0.0208 | 0.022 | 0.0021 | 0.0035 |
| 34 |  | 0.13 | 0.13 |  | 0.0038 |  |  |  | 0.013 | 0.0001 | 0.0025 |
| 35 |  | 0.12 | 0.10 | 0.0029 |  | 0.0224 |  |  | 0.018 | 0.0044 | 0.0061 |
| 36 |  | 0.02 | 0.04 |  | 0.0021 | 0.0394 | 0.0412 |  | 0.016 | 0.0027 | 0.0069 |
| 37 | 0.083 | 0.05 | 0.08 | 0.0021 |  |  |  |  | 0.012 | 0.0031 | 0.0095 |
| 38 |  | 0.09 | 0.14 | 0.0012 |  | 0.0046 |  | 0.0120 | 0.007 | 0.0016 | 0.0035 |
| 39 | 0.037 | 0.12 | 0.10 |  | 0.0035 | 0.0316 | 0.0410 |  | 0.007 | 0.0031 | 0.0078 |
| 40 |  | 0.10 | 0.12 | 0.0047 |  | 0.0444 |  | 0.0354 | 0.006 | 0.0010 | 0.0069 |
| 41 | 0.034 | 0.12 | 0.07 | 0.0023 | 0.0030 |  |  |  | 0.000 | 0.0041 | 0.0051 |
| 42 | 0.052 | 0.03 | 0.02 | 0.0004 |  | 0.0111 |  | 0.0391 | 0.011 | 0.0014 | 0.0064 |
| 43 | 0.012 | 0.11 | 0.11 | 0.0032 |  |  | 0.0379 | 0.0105 | 0.016 | 0.0018 | 0.0058 |
| 44 | 0.148 | 0.01 | 0.04 | 0.0008 |  |  |  |  | 0.007 | 0.0047 | 0.0005 |
| 45 |  | 0.03 | 0.13 | 0.0047 |  |  |  |  | 0.018 | 0.0004 | 0.0029 |
| 46 |  | 0.01 | 0.04 | 0.0018 | 0.0041 | 0.0381 |  | 0.0152 | 0.005 | 0.0025 | 0.0076 |
| 47 |  | 0.00 | 0.06 |  | 0.0038 |  |  |  | 0.000 | 0.0011 | 0.0081 |
| 48 |  | 0.09 | 0.07 | 0.0015 |  |  |  | 0.0379 | 0.002 | 0.0042 | 0.0025 |
| 49 |  | 0.06 | 0.01 | 0.0024 | 0.0022 |  | 0.0433 | 0.0305 | 0.019 | 0.0039 | 0.0044 |
| 50 | 0.093 | 0.01 | 0.12 | 0.0017 |  | 0.0196 | 0.0255 |  | 0.004 | 0.0037 | 0.0013 |

TABLE 5

TABLE 5 (to be continued in TABLE 6)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 1 | GTAW | 5 | 1150 | 32 | 12 | 750 | 30 | 11968 |
| 2 | GTAW | 5 | 1150 | 32 | 35 | 750 | 30 | 11968 |
| 3 | GTAW | 5 | 1150 | 32 | 12 | 750 | 40 | 12096 |
| 4 | GTAW | 5 | 1150 | 35 | 10 | 750 | 40 | 12096 |
| 5 | GTAW | 20 | 1070 | 36 | 10 | 750 | 35 | 12037 |
| 6 | GTAW | 20 | 1070 | 38 | 10 | 750 | 35 | 12037 |
| 7 | GTAW | 20 | 1070 | 32 | 10 | 750 | 35 | 12037 |
| 8 | GTAW | 20 | 1070 | 31 | 10 | 750 | 35 | 12037 |
| 9 | GTAW | 20 | 1070 | 35 | 10 | 750 | 60 | 12276 |
| 10 | GTAW | 20 | 1070 | 35 | 10 | 750 | 60 | 12276 |
| 11 | GTAW | 20 | 1070 | 30 | 8 | 750 | 90 | 12456 |
| 12 | GTAW | 20 | 1070 | 30 | 5 | 750 | 60 | 12276 |
| 13 | GTAW | 20 | 1070 | 32 | 5 | 750 | 60 | 12276 |
| 14 | SAW | 20 | 1070 | 33 | 2 | 760 | 60 | 12396 |
| 15 | SAW | 15 | 1100 | 32 | 5 | 760 | 60 | 12396 |
| 16 | SAW | 15 | 1100 | 31 | 5 | 760 | 60 | 12396 |

TABLE 5-continued

TABLE 5 (to be continued in TABLE 6)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 17 | GTAW | 15 | 1100 | 32 | 28 | 760 | 60 | 12396 |
| 18 | GTAW | 15 | 1100 | 33 | 32 | 760 | 60 | 12396 |
| 19 | GTAW | 15 | 1100 | 32 | 32 | 760 | 60 | 12396 |
| 20 | GTAW | 15 | 1100 | 32 | 31 | 760 | 120 | 12707 |
| 21 | GTAW | 15 | 1100 | 32 | 31 | 760 | 120 | 12707 |
| 22 | GTAW | 15 | 1100 | 32 | 35 | 760 | 120 | 12707 |
| 23 | SMAW | 15 | 1100 | 31 | 35 | 760 | 120 | 12707 |
| 24 | SMAW | 15 | 1100 | 32 | 35 | 760 | 120 | 12707 |
| 25 | GTAW | 15 | 1100 | 35 | 35 | 760 | 120 | 12707 |
| 26 | GTAW | 2 | 1180 | 35 | 35 | 720 | 120 | 12215 |
| 27 | GTAW | 6 | 1190 | 35 | 36 | 740 | 120 | 12461 |
| 28 | GTAW | 3 | 1160 | 35 | 40 | 760 | 120 | 12707 |
| 29 | GTAW | 7 | 1150 | 32 | 40 | 770 | 60 | 12516 |
| 30 | GTAW | 9 | 1180 | 32 | 25 | 780 | 60 | 12636 |
| 31 | GTAW | 5 | 1200 | 32 | 25 | 780 | 60 | 12636 |
| 32 | GTAW | 10 | 1190 | 35 | 25 | 780 | 60 | 12636 |
| 33 | GTAW | 14 | 1200 | 40 | 25 | 780 | 60 | 12636 |
| 34 | GTAW | 20 | 1180 | 45 | 25 | 780 | 60 | 12636 |
| 35 | GTAW | 30 | 1190 | 52 | 25 | 780 | 60 | 12636 |
| 36 | GTAW | 8 | 1180 | 35 | 25 | 780 | 60 | 12636 |
| 37 | GTAW | 12 | 1150 | 31 | 25 | 750 | 90 | 12456 |
| 38 | GTAW | 12 | 1150 | 30 | 25 | 760 | 80 | 12525 |
| 39 | GTAW | 12 | 1150 | 30 | 20 | 760 | 60 | 12396 |
| 40 | GTAW | 30 | 1050 | 30 | 20 | 760 | 60 | 12396 |
| 41 | GTAW | 2 | 1190 | 35 | 15 | 760 | 60 | 12396 |
| 42 | GTAW | 2 | 1190 | 35 | 12 | 760 | 60 | 12396 |
| 43 | GTAW | 2 | 1190 | 35 | 12 | 760 | 60 | 12396 |
| 44 | GTAW | 2 | 1190 | 35 | 5 | 760 | 60 | 12396 |
| 45 | GTAW | 10 | 1150 | 40 | 3 | 760 | 60 | 12396 |
| 46 | EB | 10 | 1150 | 40 | 4 | 760 | 60 | 12396 |
| 47 | EB | 10 | 1100 | 32 | 6 | 760 | 60 | 12396 |
| 48 | LASER | 10 | 1100 | 32 | 4 | 760 | 60 | 12396 |
| 49 | GTAW | 10 | 1100 | 35 | 3 | 725 | 2500 | 13593 |
| 50 | GTAW | 10 | 1120 | 35 | 4 | 730 | 3200 | 13768 |

GTAW: gas-coated arc welding
SAW: coated arc welding
SMAW: hand-rod-type coated arc welding
EB: electronic beam welding
LASER: laser welding
Operation area ratio of pre-weld heat treatment: ratio between total area of steel outer-layer surfaces except edge surface and total area of outer-layer portions subjected to pre-weld heat treatment
TTP: temperature/time equivalent parameter calculated based on formula (1)

TABLE 6

TABLE 6 (continued from TABLE 5)

| Steel No. | BCR (MPa) | WCR (MPa) | Δ CR (MPa) | BCH (J) | WCH (J) | P (%) | R (nm) | DP (nm) | Shape of welded object |
|---|---|---|---|---|---|---|---|---|---|
| 1 | 78 | 76 | 2 | 65 | 61 | 46 | 60 | 83 | steel plate for pressure container |
| 2 | 78 | 77 | 1 | 175 | 174 | 43 | 138 | 147 | steel pipe |
| 3 | 77 | 77 | 0 | 95 | 87 | 47 | 287 | 171 | steel plate for pressure container |
| 4 | 77 | 77 | 0 | 51 | 43 | 49 | 97 | 55 | steel plate for pressure container |
| 5 | 76 | 76 | 0 | 57 | 48 | 43 | 171 | 97 | steel plate for pressure container |
| 6 | 76 | 75 | 1 | 150 | 142 | 43 | 137 | 100 | steel plate for pressure container |
| 7 | 75 | 75 | 0 | 100 | 91 | 50 | 262 | 104 | steel plate for pressure container |
| 8 | 78 | 78 | 0 | 174 | 165 | 46 | 178 | 45 | steel plate for pressure container |
| 9 | 80 | 80 | 0 | 51 | 45 | 49 | 124 | 80 | steel plate for pressure container |
| 10 | 82 | 82 | 0 | 115 | 98 | 45 | 154 | 82 | steel plate for pressure container |
| 11 | 85 | 85 | 0 | 172 | 167 | 49 | 281 | 176 | steel plate for pressure container |
| 12 | 80 | 80 | 0 | 35 | 30 | 50 | 165 | 33 | steel plate for pressure container |
| 13 | 81 | 81 | 0 | 90 | 75 | 45 | 152 | 77 | steel plate for pressure container |
| 14 | 82 | 82 | 0 | 159 | 130 | 43 | 162 | 166 | steel plate for pressure container |
| 15 | 91 | 91 | 0 | 78 | 62 | 48 | 118 | 170 | steel plate for pressure container |
| 16 | 95 | 90 | 5 | 151 | 141 | 42 | 160 | 95 | steel pipe |
| 17 | 98 | 89 | 9 | 60 | 48 | 50 | 198 | 111 | steel pipe |
| 18 | 94 | 89 | 5 | 104 | 102 | 44 | 263 | 115 | steel pipe |
| 19 | 92 | 88 | 4 | 110 | 105 | 49 | 262 | 45 | steel pipe |
| 20 | 100 | 93 | 7 | 34 | 30 | 43 | 199 | 119 | steel pipe |

TABLE 6-continued

TABLE 6 (continued from TABLE 5)

| Steel No. | BCR (MPa) | WCR (MPa) | Δ CR (MPa) | BCH (J) | WCH (J) | P (%) | R (nm) | DP (nm) | Shape of welded object |
|---|---|---|---|---|---|---|---|---|---|
| 21 | 101 | 98 | 3 | 110 | 104 | 51 | 185 | 61 | steel pipe |
| 22 | 99 | 99 | 0 | 84 | 76 | 49 | 121 | 107 | steel pipe |
| 23 | 97 | 96 | 1 | 109 | 101 | 46 | 232 | 177 | steel pipe |
| 24 | 121 | 119 | 2 | 173 | 160 | 44 | 268 | 115 | steel pipe |
| 25 | 105 | 103 | 2 | 105 | 88 | 50 | 174 | 67 | steel pipe |
| 26 | 102 | 101 | 1 | 137 | 117 | 49 | 183 | 92 | steel pipe |
| 27 | 98 | 98 | 0 | 117 | 104 | 49 | 203 | 167 | steel pipe |
| 28 | 90 | 89 | 1 | 117 | 96 | 47 | 249 | 105 | steel pipe |
| 29 | 90 | 89 | 1 | 57 | 53 | 42 | 245 | 131 | steel pipe |
| 30 | 85 | 85 | 0 | 146 | 122 | 45 | 114 | 90 | steel pipe |
| 31 | 85 | 85 | 0 | 53 | 51 | 50 | 236 | 90 | steel pipe |
| 32 | 77 | 77 | 0 | 97 | 82 | 47 | 183 | 86 | steel pipe |
| 33 | 77 | 77 | 0 | 112 | 108 | 47 | 231 | 148 | steel pipe |
| 34 | 76 | 76 | 0 | 160 | 153 | 45 | 274 | 77 | steel pipe |
| 35 | 76 | 76 | 0 | 117 | 113 | 45 | 157 | 155 | steel pipe |
| 36 | 76 | 76 | 0 | 59 | 55 | 43 | 95 | 177 | steel pipe |
| 37 | 80 | 80 | 0 | 141 | 114 | 50 | 129 | 90 | steel pipe |
| 38 | 89 | 85 | 4 | 68 | 61 | 53 | 173 | 92 | steel pipe |
| 39 | 94 | 90 | 4 | 69 | 65 | 52 | 177 | 178 | steel pipe |
| 40 | 99 | 95 | 4 | 126 | 122 | 46 | 159 | 145 | steel pipe |
| 41 | 100 | 98 | 2 | 96 | 85 | 45 | 242 | 120 | steel pipe |
| 42 | 102 | 100 | 2 | 46 | 40 | 52 | 180 | 143 | steel pipe |
| 43 | 101 | 101 | 0 | 90 | 78 | 44 | 116 | 58 | steel pipe |
| 44 | 97 | 97 | 0 | 71 | 59 | 45 | 153 | 123 | steel plate for pressure container |
| 45 | 98 | 98 | 0 | 127 | 101 | 47 | 266 | 106 | steel plate for pressure container |
| 46 | 95 | 95 | 0 | 170 | 156 | 44 | 211 | 90 | steel plate for pressure container |
| 47 | 94 | 92 | 2 | 162 | 134 | 48 | 175 | 60 | steel plate for pressure container |
| 48 | 92 | 91 | 1 | 161 | 151 | 45 | 266 | 53 | steel plate for pressure container |
| 49 | 88 | 88 | 0 | 165 | 148 | 49 | 152 | 40 | steel plate for pressure container |
| 50 | 80 | 80 | 0 | 114 | 96 | 45 | 151 | 162 | steel plate for pressure container |

WCH: impact energy absorbed by welded-joint bond
BCH: impact energy absorbed by base material at 0° C.
R: average precipitate grain size on HAZ large-angle grain boundaries
DP: inter-particle-surface distance on HAZ large-angle grain boundaries
P: grain-boundary coverage of HAZ large-angle grain boundaries with precipitates The steel pipes or steel plates thus worked were machined to form a weld edge, and the "pre-weld heat treatment" was performed in the manner shown in Table 5. The edge used was a V edge, where each edge surface had an angle of 15°, and each root had a butted portion with a thickness of 1 mm.

Thereafter, welding was performed with an amount of weld heat input of about 0.5 to 5.0 kJ/mm and using GTAW (gas-shield type coated arc welding using tungsten electrodes), SMAW (hand-rod-type coated arc welding), SAW (coated arc welding), EB (electron-beam welding) or LASER (laser welding). Subsequently, the post-weld heat treatment was performed on the joint in the temperature range of 720 to 780° C. for 30 minutes or longer, depending on the thickness and shape of the parts or formed products. The weld metal used was Alloy 625 Ni-based alloy shown in Table 2, and care was taken to prevent creep rupture from the weld metal.

To measure the creep properties of the welded joint, a brimmed round-bar test specimen with a parallel-portion diameter of 6 mm and a parallel-portion length of 30 mm extending in the direction perpendicular to the direction of welding and perpendicular to the plate-thickness direction of the steel pipe or steel plate was extracted such that a portion of the heat-affected zone of the welded joint was present in the parallel portion; then, creep tests at 600° C., 650° C. and 700° C. were performed for about 10,000 hours, and a cubic regression curve using the Larson-Miller method was used to calculate the estimated creep rupture strength for 100,000 hours at 600° C. To increase accuracy and represent the curve shape as correctly as possible, data scores were taken until the standard deviation was 0.10 or less, the optimized constant C was calculated, and the representative curve was obtained using the following approximation equation.

$$(\text{test temperature}+273.15) \times (\log(t_r)+C) = \alpha \log(\sigma) + b [\log(\sigma)]^2 + c[\log(\sigma)]^3 \quad [\text{Formula 1}]$$

This is the so-called Larson-Miller parameter method. Other than this method, any approximation equation using the time-temperature parameter method, such as Orr-Shrby-Dorn method or Manson-Hafeld method may be used to produce substantially equal estimate values. Thus, the Larson-Miller parameter method was used since it is widely used in standards.

Similarly, the 2 mm V-notch Charpy impact testing described in JIS Z2242 was conducted on base materials with a V notch with 45° in the middle portion of a test specimen with a square of 10×10 mm and a length of 55 mm at 0° C. Since the base material, as a structure to be worked, requires an amount of absorbed energy of 27 J or more at 0° C., a threshold of 27 J was set. The results are shown in Table 6 in the BCH column (J). The values were obtained for comparison with the toughness of the welded joint described below and are not essential requirements of the present invention; they were used to determine whether the toughness of the joint of the present invention decreased due to the low base-material toughness.

To evaluate the toughness of HAZ grain boundaries of the welded joint, a test specimen was extracted from central portions along the plate thickness, again in accordance with the method described in JIS Z2242 and depending on the shape of the test specimen, and absorbed energy was measured at 0° C. The notch was provided based on the point at which the interface between the welded-joint metal and HAZ crosses the central line as determined along the plate-thickness direction (i.e. central position along the plate thickness with respect to the border surface), and was machined to be parallel to the plate-thickness direction. The direction in which the notch was machined was parallel to the direction of the weld line. The threshold was 27 J at 0° C., which is said to be the lowest absorbed energy at which no crack occurs during the processing of members for thermal power plants. The results are shown in Table 6 in the WCH column (J).

Further, the properties of the base material were evaluated by extracting a creep test specimen with the same shape as the welded joint from unwelded steel at a position where no weld edge was formed such that the entire parallel portion was made of the microstructure of the base material, and performing creep tests under the same test conditions as the welded joint. The threshold for the base material was 75 MPa because long-time creep tests using the TTP method as with the welded joint had shown that the base material had a creep strength of 75 MPa or higher at 600° C. for 100,000 hours. The differences between this result and the creep rupture strength of the welded joint must not be 20 MPa or larger, because the most important object of the present invention is to prevent a reduction in the local creep strength of the welded joint, and to prevent Type IV damage, which is the most harmful phenomenon in this respect. In Table 6, the creep rupture strength of the base material is shown in the BCR column (MPa), the creep rupture strength of the welded joint in the WCR column (MPa) and the difference therebetween in the $\Delta$CR column (MPa). $\Delta$CR is a value defined by the following formula, (3), and the maximum value tolerable in connection with the present invention is 20 MPa.

$$\Delta CR = \text{(creep rupture strength of base material)} - \text{(creep rupture strength of welded joint)} \quad (3).$$

Creep rupture strength as used herein means an estimated value calculated by the TTP method at 600° C. and for 100,000 hours.

After the post-weld heat treatment, the test specimen was cut along a cross section perpendicular to the weld line, and was subjected to corrosion (using an etching agent mainly composed of picric acid alcohol according to the present invention) to cause grain boundaries to appear, thereby causing an HAZ to appear. After a sample for electron microscopy was machined and extracted from the HAZ, SEM was used to measure the grain-boundary coverage with $M_{23}C_6$-type carbides on grain boundaries. $M_{23}C_6$-type carbides in this case were identified by EDX and a pattern analysis of reflection peaks by X-ray diffraction of residual dross from electrolytic extraction. This method is effective because, with the component ranges of the inventive steel, most of precipitates are $M_{23}C_6$-type carbides at the stage of the post-weld heat treatment. However, before the SEM observation, the angles of adjacent concentrated grains on grain boundaries were measured in advance by EBSD to determine that the grain boundaries for which the grain-boundary coverage with $M_{23}C_6$-type carbides was measured were large-angle grain boundaries, that is, the angles about the shared rotational axis were 60° and 54°. Grain boundaries with 16°, which is another large angle, were hardly observed in the experiments.

An approximation of the inter-particle distance on the large-angle grain boundaries was made by using the method shown in FIG. 2 to measure the inter-particle distance on the image from the observation results of $M_{23}C_6$-type carbides obtained by the microscopic observation, assuming that these particles are in a square distribution on boundary surfaces, and using formula (2) to make an approximation.

Table 6 shows main parameters of the present invention, i.e. the average grain size R (nm) of $M_{23}C_6$-type carbides that precipitated on the large-angle grain boundaries in the weld heat-affected zone, the grain-boundary coverage P (%) with these precipitates, and the inter-particle distance DP (nm) of these precipitates on the large-angle grain boundaries.

To determine that the effects of the present invention were produced, the present invention determined that the result of the temperature-promoted creep testing for the welded joint (creep tests for 1,000 hours at 700° C., corresponding to 100,000 hours at 650° C.) was not below 5%, which is the tolerable variance of creep strength of the base material defined by the ASME standards and ASTM standards.

Actually, the fracture surface of the creep rupture test specimen was observed at the same time and it was determined at the same time whether there was Type IV damage, where it was determined that there was no Type IV damage if the strength from the temperature-promoted creep testing for the creep rupture strength of the welded joint was below 5% of the creep rupture test strength of the base material, which meets the above criterion. That is, it was determined that no low-ductility fracture surface with connected creep voids was present along the outer fringe of the HAZ.

Table 5 shows the conditions of the pre-weld heat treatment performed on the welded joint (the depth or width relative to the created weld edge surface that were heated to the $Ac_3$ point or higher (both meaning the same thing, where the dimension of the heated region measured from the edge surface in the direction of heating are represented as the depth or width in the plate-width direction; in a preliminary experiment, the heated region was actually measured by a measurement method using embedded thermocouples, and the depth or width was estimated based on the correspondence between these measurements and the associated heating conditions), temperature and holding time) and the post-weld heat treatment conditions (temperature and holding time). The worked area ratio of the pre-weld heat treatment is the ratio between the total area of the steel outer-layer surfaces except the edge surface and the total area of the outer-layer portions subjected to the pre-weld heat treatment. The TTP column of Table 5 shows actual calculation results that show whether the post-weld heat treatment condition requirement formula shown in formula (1) was satisfied. It can be seen that the present invention falls within formula (1).

Tables 7 and 8 show the chemical compositions comparative example steels, and Tables 9 and 10 show the associated welded-joint manufacture conditions, pre-weld heat treatment conditions, post-weld heat treatment conditions, toughness values, creep test results and analysis results of precipitate state, in a manner similar to that for Tables 5 and 6.

TABLE 7

TABLE 7 (to be continued in TABLE 8)

Chemical components (in mass %, balance Fe and impurities)

| Steel No. | C | Si | Mn | Cr | P | S | Mo | Nb | V | N | W | Re | Ti |
|---|---|---|---|---|---|---|---|---|---|---|---|---|---|
| 61 | 0.022 | 0.07 | 0.55 | 10.53 | 0.0101 | 0.0062 | 0.62 | 0.072 | 0.474 | 0.0364 | 1.72 | 2.42 | 0.127 |
| 62 | 0.165 | 0.33 | 0.72 | 10.66 | 0.0073 | 0.0029 | 0.44 | 0.085 | 0.090 | 0.0424 | 1.89 | 0.57 | 0.039 |
| 63 | 0.112 | 0.01 | 0.65 | 11.00 | 0.0027 | 0.0037 | 0.35 | 0.021 | 0.230 | 0.0089 | 1.79 | 0.97 | 0.028 |
| 64 | 0.077 | 0.67 | 0.69 | 10.15 | 0.0044 | 0.0010 | 0.81 | 0.050 | 0.450 | 0.0770 | 1.68 | 2.47 | 0.014 |
| 65 | 0.080 | 0.29 | 0.25 | 9.94 | 0.0017 | 0.0005 | 0.93 | 0.036 | 0.061 | 0.0348 | 1.83 | 2.64 | 0.089 |
| 66 | 0.054 | 0.19 | 0.91 | 9.07 | 0.0070 | 0.0036 | 0.73 | 0.053 | 0.444 | 0.0762 | 1.57 | 3.19 | 0.116 |
| 67 | 0.084 | 0.15 | 0.58 | 7.03 | 0.0079 | 0.0050 | 1.21 | 0.044 | 0.248 | 0.0734 | 1.83 | 3.35 | 0.096 |
| 68 | 0.052 | 0.23 | 0.72 | 13.98 | 0.0086 | 0.0034 | 0.31 | 0.041 | 0.197 | 0.0116 | 1.74 | 1.97 | 0.135 |
| 69 | 0.111 | 0.36 | 0.68 | 9.98 | 0.0364 | 0.0009 | 0.47 | 0.049 | 0.012 | 0.0157 | 1.78 | 2.63 | 0.066 |
| 70 | 0.065 | 0.06 | 0.64 | 10.01 | 0.0023 | 0.0162 | 1.19 | 0.074 | 0.414 | 0.0177 | 1.94 | 2.12 | 0.016 |
| 71 | 0.057 | 0.13 | 0.42 | 8.02 | 0.0074 | 0.0002 | 0.22 | 0.013 | 0.357 | 0.0776 | 1.84 | 1.13 | 0.040 |
| 72 | 0.068 | 0.13 | 0.69 | 8.44 | 0.0013 | 0.0050 | 1.98 | 0.070 | 0.148 | 0.0581 | 1.54 | 1.20 | 0.061 |
| 73 | 0.087 | 0.26 | 0.73 | 10.90 | 0.0063 | 0.0056 | 0.46 | 0.002 | 0.103 | 0.0395 | 1.75 | 0.90 | 0.146 |
| 74 | 0.055 | 0.09 | 0.67 | 8.26 | 0.0032 | 0.0056 | 0.85 | 0.191 | 0.192 | 0.0688 | 1.84 | 1.15 | 0.038 |
| 75 | 0.111 | 0.10 | 0.62 | 9.86 | 0.0113 | 0.0003 | 0.91 | 0.042 | 0.003 | 0.0770 | 1.81 | 2.05 | 0.076 |
| 76 | 0.083 | 0.40 | 0.59 | 8.90 | 0.0015 | 0.0028 | 1.05 | 0.050 | 0.840 | 0.0116 | 1.84 | 2.55 | 0.010 |
| 77 | 0.073 | 0.07 | 0.49 | 8.74 | 0.0043 | 0.0046 | 1.15 | 0.058 | 0.087 | 0.0016 | 1.65 | 2.36 | 0.141 |
| 78 | 0.069 | 0.14 | 0.55 | 9.10 | 0.0023 | 0.0029 | 0.71 | 0.052 | 0.018 | 0.0963 | 1.85 | 3.33 | 0.106 |
| 79 | 0.061 | 0.06 | 0.69 | 8.81 | 0.0045 | 0.0059 | 1.06 | 0.025 | 0.191 | 0.0741 | 3.22 | 1.92 | 0.070 |
| 80 | 0.055 | 0.30 | 0.70 | 10.33 | 0.0041 | 0.0017 | 1.03 | 0.092 | 0.242 | 0.0571 | 1.89 | 4.12 | 0.148 |
| 81 | 0.099 | 0.34 | 0.42 | 11.17 | 0.0004 | 0.0032 | 0.33 | 0.085 | 0.321 | 0.0369 | 1.60 | 2.01 | 0.361 |
| 82 | 0.091 | 0.11 | 0.42 | 9.66 | 0.0107 | 0.0063 | 0.94 | 0.009 | 0.111 | 0.0651 | 1.63 | 2.05 | 0.044 |
| 83 | 0.061 | 0.13 | 0.49 | 11.48 | 0.0004 | 0.0028 | 1.14 | 0.042 | 0.346 | 0.0060 | 1.77 | 3.26 | 0.051 |
| 84 | 0.061 | 0.06 | 0.71 | 8.01 | 0.0010 | 0.0033 | 0.65 | 0.020 | 0.393 | 0.0179 | 1.81 | 0.72 | 0.086 |
| 85 | 0.075 | 0.28 | 0.52 | 11.25 | 0.0116 | 0.0005 | 1.25 | 0.078 | 0.171 | 0.0211 | 1.56 | 2.77 | 0.134 |
| 86 | 0.074 | 0.15 | 0.45 | 11.78 | 0.0100 | 0.0034 | 0.86 | 0.081 | 0.463 | 0.0332 | 1.50 | 0.84 | 0.047 |
| 87 | 0.106 | 0.31 | 0.69 | 11.44 | 0.0099 | 0.0022 | 1.19 | 0.090 | 0.309 | 0.0432 | 1.81 | 0.66 | 0.108 |
| 88 | 0.111 | 0.20 | 0.41 | 8.71 | 0.0064 | 0.0021 | 1.09 | 0.093 | 0.334 | 0.0596 | 1.58 | 1.65 | 0.145 |
| 89 | 0.078 | 0.39 | 0.72 | 10.84 | 0.0091 | 0.0046 | 0.74 | 0.051 | 0.131 | 0.0191 | 1.89 | 2.51 | 0.128 |
| 90 | 0.105 | 0.15 | 0.61 | 11.67 | 0.0061 | 0.0005 | 0.66 | 0.052 | 0.023 | 0.0210 | 1.60 | 2.97 | 0.009 |
| 91 | 0.094 | 0.19 | 0.70 | 9.56 | 0.0063 | 0.0042 | 0.30 | 0.092 | 0.140 | 0.0526 | 1.76 | 0.56 | 0.053 |
| 92 | 0.080 | 0.22 | 0.46 | 10.53 | 0.0035 | 0.0060 | 0.63 | 0.063 | 0.223 | 0.0320 | 1.89 | 1.84 | 0.112 |
| 93 | 0.072 | 0.09 | 0.59 | 8.11 | 0.0111 | 0.0025 | 0.97 | 0.057 | 0.364 | 0.0410 | 1.53 | 2.82 | 0.031 |
| 94 | 0.050 | 0.30 | 0.54 | 9.03 | 0.0004 | 0.0003 | 0.75 | 0.047 | 0.210 | 0.0637 | 1.82 | 1.31 | 0.088 |
| 95 | 0.069 | 0.06 | 0.59 | 10.82 | 0.0038 | 0.0050 | 0.34 | 0.047 | 0.015 | 0.0188 | 1.73 | 0.53 | 0.106 |
| 96 | 0.085 | 0.28 | 0.60 | 10.42 | 0.0013 | 0.0045 | 0.62 | 0.093 | 0.453 | 0.0353 | 1.89 | 2.56 | 0.033 |
| 97 | 0.091 | 0.25 | 0.74 | 11.76 | 0.0024 | 0.0048 | 0.81 | 0.059 | 0.371 | 0.0077 | 1.59 | 1.37 | 0.117 |
| 98 | 0.103 | 0.39 | 0.44 | 8.18 | 0.0054 | 0.0026 | 1.09 | 0.067 | 0.386 | 0.0489 | 1.83 | 2.72 | 0.141 |
| 99 | 0.093 | 0.13 | 0.41 | 8.35 | 0.0114 | 0.0048 | 0.81 | 0.081 | 0.194 | 0.0763 | 1.50 | 2.66 | 0.012 |
| 100 | 0.080 | 0.23 | 0.64 | 9.72 | 0.0087 | 0.0012 | 0.89 | 0.048 | 0.043 | 0.0736 | 1.59 | 2.58 | 0.127 |
| 101 | 0.101 | 0.02 | 0.48 | 9.70 | 0.0058 | 0.0036 | 1.06 | 0.048 | 0.466 | 0.0481 | 1.56 | 2.68 | 0.148 |
| 102 | 0.069 | 0.32 | 0.70 | 11.60 | 0.0082 | 0.0048 | 0.85 | 0.076 | 0.344 | 0.0729 | 1.58 | 3.37 | 0.109 |

TABLE 8

TABLE 8 (continued from TABLE 7)

Chemical components (in mass %, balance Fe and impurities)

| Steel No. | Zr | Ni | Cu | Ca | Mg | Y | Ce | La | Al | B | O |
|---|---|---|---|---|---|---|---|---|---|---|---|
| 61 | 0.105 | 0.14 | 0.12 | 0.0023 | 0.0026 | 0.0169 | 0.0444 | 0.0272 | 0.001 | 0.0031 | 0.0008 |
| 62 | 0.034 | 0.04 | 0.05 | 0.0016 | 0.0014 | 0.0306 | 0.0187 | 0.0248 | 0.020 | 0.0040 | 0.0004 |
| 63 | 0.101 | 0.04 | 0.07 | 0.0024 | 0.0035 | 0.0308 | 0.0327 | 0.0220 | 0.002 | 0.0002 | 0.0122 |
| 64 | 0.105 | 0.09 | 0.13 | 0.0005 | 0.0046 | 0.0131 | 0.0172 | 0.0198 | 0.012 | 0.0019 | 0.0027 |
| 65 | 0.045 | 0.02 | 0.15 | 0.0043 | 0.0045 | 0.0447 | 0.0134 | 0.0123 | 0.006 | 0.0036 | 0.0167 |
| 66 | 0.055 | 0.08 | 0.14 | 0.0005 | 0.0005 | 0.0153 | 0.0278 | 0.0370 | 0.002 | 0.0036 | 0.0055 |
| 67 | 0.067 | 0.08 | 0.07 | 0.0011 | 0.0039 | 0.0440 | 0.0205 | 0.0349 | 0.013 | 0.0039 | 0.0072 |
| 68 | 0.075 | 0.09 | 0.14 | 0.0023 | 0.0022 | 0.0444 | 0.0317 | 0.0332 | 0.000 | 0.0003 | 0.0018 |
| 69 | 0.028 | 0.03 | 0.07 | 0.0017 | 0.0032 | 0.0449 | 0.0287 | 0.0174 | 0.013 | 0.0039 | 0.0053 |
| 70 | 0.085 | 0.08 | 0.00 | 0.0032 | 0.0004 | 0.0250 | 0.0243 | 0.0400 | 0.020 | 0.0003 | 0.0091 |
| 71 | 0.086 | 0.11 | 0.11 | 0.0047 | 0.0006 | 0.0154 | 0.0195 | 0.0294 | 0.002 | 0.0017 | 0.0046 |
| 72 | 0.132 | 0.10 | 0.04 | 0.0010 | 0.0019 | 0.0287 | 0.0191 | 0.0223 | 0.011 | 0.0047 | 0.0061 |
| 73 | 0.063 | 0.05 | 0.04 | 0.0015 | 0.0017 | 0.0136 | 0.0387 | 0.0425 | 0.010 | 0.0020 | 0.0092 |
| 74 | 0.128 | 0.12 | 0.02 | 0.0016 | 0.0018 | 0.0365 | 0.0158 | 0.0278 | 0.019 | 0.0022 | 0.0094 |
| 75 | 0.082 | 0.06 | 0.05 | 0.0028 | 0.0020 | 0.0133 | 0.0130 | 0.0278 | 0.002 | 0.0003 | 0.0087 |
| 76 | 0.028 | 0.10 | 0.01 | 0.0006 | 0.0005 | 0.0231 | 0.0288 | 0.0182 | 0.002 | 0.0036 | 0.0015 |
| 77 | 0.070 | 0.06 | 0.10 | 0.0017 | 0.0022 | 0.0329 | 0.0293 | 0.0348 | 0.020 | 0.0031 | 0.0089 |
| 78 | 0.129 | 0.02 | 0.10 | 0.0008 | 0.0037 | 0.0119 | 0.0280 | 0.0426 | 0.016 | 0.0044 | 0.0077 |
| 79 | 0.120 | 0.05 | 0.09 | 0.0039 | 0.0045 | 0.0407 | 0.0437 | 0.0347 | 0.017 | 0.0009 | 0.0027 |

TABLE 8-continued

TABLE 8 (continued from TABLE 7)

Chemical components (in mass %, balance Fe and impurities)

| Steel No. | Zr | Ni | Cu | Ca | Mg | Y | Ce | La | Al | B | O |
|---|---|---|---|---|---|---|---|---|---|---|---|
| 80 | 0.013 | 0.04 | 0.05 | 0.0041 | 0.0021 | 0.0245 | 0.0201 | 0.0428 | 0.009 | 0.0024 | 0.0016 |
| 81 | 0.117 | 0.09 | 0.02 | 0.0016 | 0.0042 | 0.0436 | 0.0390 | 0.0366 | 0.016 | 0.0045 | 0.0015 |
| 82 | 0.242 | 0.10 | 0.13 | 0.0019 | 0.0009 | 0.0218 | 0.0225 | 0.0265 | 0.006 | 0.0031 | 0.0055 |
| 83 | 0.126 | 0.33 | 0.04 | 0.0009 | 0.0004 | 0.0252 | 0.0447 | 0.0335 | 0.015 | 0.0045 | 0.0057 |
| 84 | 0.034 | 0.02 | 0.41 | 0.0027 | 0.0038 | 0.0245 | 0.0345 | 0.0140 | 0.020 | 0.0030 | 0.0092 |
| 85 | 0.089 | 0.08 | 0.10 | 0.0093 | 0.0048 | 0.0149 | 0.0364 | 0.0224 | 0.000 | 0.0035 | 0.0079 |
| 86 | 0.110 | 0.14 | 0.13 | 0.0043 | 0.0076 | 0.0312 | 0.0288 | 0.0311 | 0.020 | 0.0041 | 0.0095 |
| 87 | 0.074 | 0.03 | 0.12 | 0.0036 | 0.0024 | 0.0992 | 0.0439 | 0.0332 | 0.020 | 0.0044 | 0.0071 |
| 88 | 0.113 | 0.03 | 0.06 | 0.0043 | 0.0035 | 0.0291 | 0.1210 | 0.0219 | 0.016 | 0.0043 | 0.0004 |
| 89 | 0.104 | 0.12 | 0.02 | 0.0007 | 0.0042 | 0.0231 | 0.0433 | 0.0870 | 0.012 | 0.0016 | 0.0053 |
| 90 | 0.052 | 0.07 | 0.06 | 0.0027 | 0.0013 | 0.0215 | 0.0122 | 0.0442 | 0.046 | 0.0030 | 0.0018 |
| 91 | 0.015 | 0.08 | 0.02 | 0.0013 | 0.0004 | 0.0320 | 0.0197 | 0.0194 | 0.016 | 0.0121 | 0.0098 |
| 92 | 0.102 | 0.14 | 0.04 | 0.0044 | 0.0041 | 0.0116 | 0.0217 | 0.0150 | 0.001 | 0.0042 | 0.1667 |
| 93 | 0.015 | 0.02 | 0.04 | 0.0035 | 0.0036 | 0.0221 | 0.0164 | 0.0334 | 0.014 | 0.0007 | 0.0072 |
| 94 | 0.022 | 0.01 | 0.00 | 0.0021 | 0.0039 | 0.0133 | 0.0257 | 0.0323 | 0.006 | 0.0033 | 0.0026 |
| 95 | 0.138 | 0.04 | 0.04 | 0.0034 | 0.0026 | 0.0306 | 0.0269 | 0.0148 | 0.013 | 0.0012 | 0.0066 |
| 96 | 0.046 | 0.12 | 0.12 | 0.0043 | 0.0041 | 0.0123 | 0.0374 | 0.0313 | 0.020 | 0.0028 | 0.0058 |
| 97 | 0.020 | 0.06 | 0.10 | 0.0038 | 0.0048 | 0.0118 | 0.0270 | 0.0398 | 0.003 | 0.0010 | 0.0032 |
| 98 | 0.039 | 0.02 | 0.04 | 0.0036 | 0.0028 | 0.0125 | 0.0354 | 0.0112 | 0.008 | 0.0011 | 0.0044 |
| 99 | 0.071 | 0.01 | 0.11 | 0.0012 | 0.0026 | 0.0131 | 0.0122 | 0.0387 | 0.015 | 0.0031 | 0.0031 |
| 100 | 0.032 | 0.04 | 0.13 | 0.0029 | 0.0037 | 0.0279 | 0.0111 | 0.0308 | 0.001 | 0.0008 | 0.0077 |
| 101 | 0.011 | 0.01 | 0.07 | 0.0039 | 0.0019 | 0.0265 | 0.0374 | 0.0181 | 0.017 | 0.0016 | 0.0025 |
| 102 | 0.086 | 0.03 | 0.03 | 0.0027 | 0.0019 | 0.0248 | 0.0323 | 0.0370 | 0.018 | 0.0017 | 0.0022 |

TABLE 9

TABLE 9 (to be continued in TABLE 10)

| | | Pre-weld heat treatment | | | | Post-weld heat treatment | | |
|---|---|---|---|---|---|---|---|---|
| Steel No. | Weld method | Holding time (min) | Temp. (° C.) | Depth (width) (mm) | Operation area ratio (%) | Temp. (° C.) | Holding time (min) | TTP |
| 61 | GTAW | 5 | 1100 | 48 | 20 | 760 | 60 | 12396 |
| 62 | GTAW | 5 | 1100 | 96 | 20 | 760 | 60 | 12396 |
| 63 | GTAW | 5 | 1100 | 88 | 20 | 760 | 60 | 12396 |
| 64 | GTAW | 5 | 1100 | 90 | 8 | 740 | 60 | 12156 |
| 65 | GTAW | 5 | 1100 | 37 | 17 | 740 | 60 | 12156 |
| 66 | GTAW | 5 | 1100 | 47 | 37 | 740 | 60 | 12156 |
| 67 | GTAW | 5 | 1100 | 60 | 20 | 740 | 60 | 12156 |
| 68 | GTAW | 10 | 1100 | 49 | 17 | 740 | 60 | 12156 |
| 69 | GTAW | 10 | 1100 | 95 | 15 | 750 | 60 | 12276 |
| 70 | GTAW | 10 | 1100 | 98 | 38 | 750 | 60 | 12276 |
| 71 | GTAW | 10 | 1100 | 91 | 14 | 750 | 60 | 12276 |
| 72 | GTAW | 10 | 1100 | 91 | 32 | 750 | 60 | 12276 |
| 73 | GTAW | 10 | 1100 | 93 | 24 | 750 | 60 | 12276 |
| 74 | GTAW | 10 | 1100 | 92 | 14 | 770 | 60 | 12516 |
| 75 | GTAW | 10 | 1150 | 95 | 14 | 770 | 60 | 12516 |
| 76 | GTAW | 10 | 1150 | 97 | 9 | 770 | 60 | 12516 |
| 77 | GTAW | 10 | 1150 | 88 | 5 | 770 | 60 | 12516 |
| 78 | GTAW | 10 | 1150 | 86 | 38 | 770 | 60 | 12516 |
| 79 | Welding impossible | — | — | — | — | — | — | |
| 80 | GTAW | 10 | 1150 | 88 | 38 | 770 | 60 | 12516 |
| 81 | GTAW | 5 | 1150 | 98 | 36 | 770 | 60 | 12516 |
| 82 | GTAW | 5 | 1150 | 95 | 36 | 770 | 60 | 12516 |
| 83 | GTAW | 5 | 1150 | 90 | 36 | 770 | 60 | 12516 |
| 84 | GTAW | 5 | 1150 | 91 | 11 | 770 | 60 | 12516 |
| 85 | GTAW | 5 | 1150 | 80 | 27 | 770 | 60 | 12516 |
| 86 | GTAW | 5 | 1150 | 74 | 5 | 770 | 60 | 12516 |
| 87 | GTAW | 25 | 1150 | 85 | 34 | 770 | 60 | 12516 |
| 88 | GTAW | 25 | 1150 | 83 | 37 | 770 | 60 | 12516 |
| 89 | GTAW | 25 | 1150 | 75 | 7 | 770 | 60 | 12516 |
| 90 | GTAW | 25 | 1150 | 74 | 11 | 770 | 60 | 12516 |
| 91 | GTAW | 25 | 1150 | 98 | 35 | 770 | 60 | 12516 |
| 92 | GTAW | 25 | 1180 | 82 | 24 | 770 | 60 | 12516 |
| 93 | GTAW | 1 | 1180 | 50 | 38 | 770 | 60 | 12516 |
| 94 | GTAW | 60 | 1180 | 95 | 16 | 770 | 60 | 12516 |
| 95 | GTAW | 20 | 950 | 78 | 13 | 740 | 120 | 12461 |
| 96 | GTAW | 20 | 1250 | 47 | 6 | 740 | 120 | 12461 |

TABLE 9-continued

TABLE 9 (to be continued in TABLE 10)

| Steel No. | Weld method | Pre-weld heat treatment | | | | Post-weld heat treatment | | TTP |
| --- | --- | --- | --- | --- | --- | --- | --- | --- |
| | | Holding time (min) | Temp. (° C.) | Depth (width) (mm) | Operation area ratio (%) | Temp. (° C.) | Holding time (min) | |
| 97 | GTAW | 20 | 1180 | 15 | 14 | 740 | 120 | 12461 |
| 98 | GTAW | 20 | 1180 | 42 | 71 | 760 | 120 | 12707 |
| 99 | GTAW | 20 | 1180 | 100 | 38 | 700 | 60 | 11676 |
| 100 | GTAW | 20 | 1180 | 100 | 46 | 810 | 60 | 12996 |
| 101 | GTAW | 20 | 1180 | 100 | 46 | 760 | 10 | 11592 |
| 102 | GTAW | 20 | 1180 | 100 | 33 | 720 | 6000 | 13902 |

GTAW: gas-coated arc welding
SAW: coated arc welding
SMAW: hand-rod-type coated arc welding
EB: eletronic beam welding
LASER: laser welding
Operation area ratio of pre-weld heat treatment: ratio between total area of steel outer-layer surfaces except edge surface and total area of outer-layer portions subjected to pre-weld heat treatment
TTP: temperature/time equivalent parameter calculated based on formula (1)

TABLE 10

TABLE 10 (continued from TABLE 9)

| Steel No. | BCR (MPa) | WCR (MPa) | Δ CR (MPa) | BCH (J) | WCH (J) | P (%) | R (nm) | DP (nm) | Shape of welded object |
| --- | --- | --- | --- | --- | --- | --- | --- | --- | --- |
| 61 | 67 | 48 | 19 | 81 | 30 | 22 | 136 | 442 | steel plate for pressure container |
| 62 | 70 | 70 | 0 | 30 | 28 | 49 | 456 | 309 | steel plate for pressure container |
| 63 | 77 | 75 | 2 | 22 | 28 | 55 | 182 | 45 | steel plate for pressure container |
| 64 | 74 | 72 | 2 | 25 | 21 | 53 | 258 | 190 | steel plate for pressure container |
| 65 | 100 | 98 | 2 | 17 | 9 | 46 | 135 | 86 | steel plate for pressure container |
| 66 | 61 | 58 | 3 | 114 | 47 | 46 | 342 | 85 | steel plate for pressure container |
| 67 | 70 | 68 | 2 | 85 | 46 | 33 | 196 | 287 | steel plate for pressure container |
| 68 | 64 | 60 | 4 | 18 | 21 | 30 | 545 | 305 | steel plate for pressure container |
| 69 | 114 | 110 | 4 | 12 | 9 | 47 | 179 | 84 | steel plate for pressure container |
| 70 | 77 | 76 | 1 | 15 | 8 | 51 | 127 | 33 | steel plate for pressure container |
| 71 | 67 | 65 | 2 | 110 | 35 | 38 | 67 | 224 | steel plate for pressure container |
| 72 | 71 | 70 | 1 | 109 | 34 | 62 | 398 | 54 | steel plate for pressure container |
| 73 | 70 | 70 | 0 | 87 | 36 | 52 | 146 | 154 | steel plate for pressure container |
| 74 | 72 | 68 | 4 | 113 | 54 | 54 | 152 | 106 | steel plate for pressure container |
| 75 | 71 | 70 | 1 | 115 | 52 | 51 | 166 | 160 | steel plate for pressure container |
| 76 | 73 | 72 | 1 | 20 | 18 | 55 | 160 | 163 | steel plate for pressure container |
| 77 | 66 | 65 | 1 | 78 | 102 | 54 | 124 | 177 | steel plate for pressure container |
| 78 | 70 | 70 | 0 | 13 | 7 | 43 | 183 | 62 | steel pipe |
| 79 | — | — | — | 5 | 2 | — | — | — | steel plate for pressure container |
| 80 | 96 | 93 | 3 | 4 | 3 | 44 | 332 | 158 | steel pipe |
| 81 | 81 | 80 | 1 | 12 | 6 | 42 | 122 | 164 | steel pipe |
| 82 | 96 | 94 | 2 | 9 | 6 | 55 | 129 | 44 | steel pipe |
| 83 | 55 | 50 | 5 | 99 | 32 | 46 | 181 | 124 | steel pipe |
| 84 | 88 | 87 | 1 | 12 | 49 | 50 | 128 | 103 | steel pipe |
| 85 | 106 | 102 | 4 | 15 | 9 | 43 | 154 | 123 | steel pipe |
| 86 | 107 | 106 | 1 | 13 | 7 | 42 | 158 | 71 | steel pipe |
| 87 | 101 | 100 | 1 | 12 | 4 | 52 | 134 | 140 | steel pipe |
| 88 | 96 | 95 | 1 | 9 | 4 | 52 | 190 | 32 | steel pipe |
| 89 | 98 | 96 | 2 | 12 | 6 | 53 | 135 | 48 | steel pipe |
| 90 | 71 | 71 | 0 | 18 | 15 | 49 | 172 | 47 | steel pipe |
| 91 | 89 | 88 | 1 | 5 | 2 | 48 | 151 | 108 | steel pipe |
| 92 | 98 | 95 | 3 | 12 | 7 | 49 | 182 | 134 | steel plate for pressure container |
| 93 | 89 | 47 | 42 | 89 | 38 | 32 | 180 | 412 | steel pipe |
| 94 | 95 | 55 | 40 | 72 | 31 | 30 | 385 | 299 | steel plate for pressure container |
| 95 | 107 | 61 | 46 | 82 | 30 | 22 | 312 | 252 | steel pipe |
| 96 | 105 | 100 | 5 | 9 | 62 | 56 | 155 | 134 | steel plate for pressure container |
| 97 | 85 | 49 | 36 | 91 | 47 | 30 | 400 | 285 | steel pipe |
| 98 | 83 | 48 | 35 | 105 | 44 | 26 | 366 | 281 | steel plate for pressure container |
| 99 | 100 | 72 | 28 | 75 | 45 | 33 | 90 | 266 | steel pipe |

TABLE 10-continued

TABLE 10 (continued from TABLE 9)

| Steel No. | BCR (MPa) | WCR (MPa) | Δ CR (MPa) | BCH (J) | WCH (J) | P (%) | R (nm) | DP (nm) | Shape of welded object |
|---|---|---|---|---|---|---|---|---|---|
| 100 | 102 | 74 | 28 | 92 | 58 | 38 | 512 | 316 | steel plate for pressure container |
| 101 | 99 | 98 | 1 | 94 | 12 | 45 | 186 | 171 | steel pipe |
| 102 | 83 | 73 | 10 | 100 | 53 | 40 | 299 | 185 | steel plate for pressure container |

WCH: impact energy absorbed by welded-joint bond
BCH: impact energy absorbed by base material at 0° C.
R: average precipitate grain size on HAZ large-angle grain boundaries
DP: inter-particle-surface distance on HAZ large-angle grain boundaries
P: grain-boundary coverage of HAZ large-angle grain boundaries with precipitates Out of the chemical composition of $M_{23}C_6$-type carbides observed on the large-angle grain boundaries in the fine-grain HAZ of each of the inventive steels having the chemical compositions shown in Tables 3 and 4, M was determined to be made of essentially 70 atom % or more Cr, Fe, Mo or W, by separately extracting a test specimen for observation by transmission electron microscopy when preparing a creep test specimen for evaluation of the welded joint and performing an EDX analysis with a magnifying power of 10,000. A deviation may occur from this composition when the post-weld heat treatment conditions of the present invention are not satisfied; particularly, when $M_{23}C_6$-type carbides mainly composed of Mn are produced, degeneration may occur due to diffusion control of the component elements of M such that the grain-boundary coverage may change in creep-test environments for a long time. In some cases, the creep rupture strength of the welded joint may decrease, which requires attention.

The comparative examples will be evaluated. For 61, the amount of C added was small and thus precipitation of $M_{23}C_6$-type carbides was insufficient such that the grain-boundary coverage with these carbides did not reach 40% even though the pre-weld heat treatment conditions and the post-weld heat treatment conditions of the present invention were properly met; also, the inter-particle distance was larger than 200 nm, and the creep strengths of both the base material and welded joint decreased. Many locations showed a microstructure similar to a Type-IV-damage developing microstructure. For 62, the amount of C added was excessively large, and coarsening of carbides was promoted and the creep strength of the base material decreased, while, in the welded joint, coarsening of carbides also occurred and the creep strength decreased at the same time. At this time, the inter-particle distance became larger due to coarsening, above 200 nm. This shows that changes in the state of precipitates of $M_{23}C_6$-type carbides on grain boundaries significantly affect creep strength.

For 63, the amount of Si added was insufficient and deoxidization was insufficient such that the O concentration was high and oxides were produced, reducing the toughness in both the base material and welded joint. For 64, the amount of Si added was excessively large, which promoted precipitation of $Fe_2Mo$-type Laves phase, reducing creep strength, and, at the same time, clusters of oxides of Si were produced, which reduced toughness.

For 65, the amount of Mn added was insufficient and the O concentration was high, which produced large numbers of oxide particles, reducing the toughness in both the base material and welded joint. For 66, the amount of Mn added was excessively large, resulting in a decrease in the creep strength in both the base material and welded joint; the mobility of dislocations increased and, as a result, coarsening of carbides was accelerated by diffusion of dislocation cores such that the average grain size of $M_{23}C_6$-type carbides exceeded 300 nm.

For 67, the amount of Cr added was small, and thus the amount of produced $M_{23}C_6$-type carbides, required by the present invention, was small and the inter-particle distance on large-angle grain boundaries was large, i.e. above 200 nm; at the same time, the grain-boundary coverage with precipitates decreased and the creep strength in both the base material and weld heat-affected zone decreased. For 68, the amount of Cr added was excessively large, causing coarsening of $M_{23}C_6$-type carbides above 300 nm, resulting in a reduction in the number density of precipitates and an increase in the inter-particle distance, which reduced the grain-boundary coverage with precipitates, reducing the creep strength in both the base material and weld heat-affected zone.

For 69, the content of P, which is an impurity, exceeded the upper limit of the present invention, promoting grain-boundary segregation, which reduced the toughness in both the base material and welded joint. Similarly, for 70, the amount of S, which is an impurity, exceeded the upper limit, producing a large number of MnS particles, each extended in the longitudinal direction during hot working, which provided crack initiation points during impact tests, reducing the toughness in the base material; at the same time, the same phenomena occurred in the welded joint, reducing the toughness.

For 71, the amount of Mo added was insufficient such that almost no $Fe_2Mo$ precipitated on large-angle grain boundaries during the long-time creep test, reducing the creep strength for longer hours; the $M_{23}C_6$-type carbides at the stage of the post-weld heat treatment had smaller particle sizes because of the insufficient amount of Mo accounting for M of these precipitates, which increased the inter-particle distance beyond the range of the present invention, resulting in a reduction in the grain-boundary coverage with particles; For 72, the amount of Mo added was excessively large such that coarse particles of the inter-metallic compound $Fe_2Mo$ precipitated early on grain boundaries, which means an excess over the range of the present invention, while the inter-particle distance decreased and the grain-boundary coverage exceeded 40%; however, coarsening significantly progressed during the long-time creep test, which reduced the creep strength in both the base material and welded joint.

For 73, the amount of Nb added was small, and thus the strengthening by precipitates within grains did not effectively occur, increasing the apparent mobility of dislocations and reducing the creep strength in both the base material and welded joint. For 74, the amount of Nb added was excessively large such that $(Nb,V)_2N$-type Z phase precipitated early and coarsened early, reducing creep strength. For 75, the amount of V added was small such that the strengthening within grains by VN precipitation strengthening did not sufficiently occur, increasing the apparent mobility of dislocations, which reduced the creep strength both in the base material and welded joint. For 76, the amount of V was excessively large such that VN coarsened early and (Nb, V)$_2$N-type Z phase precipitated early and coarsened early, which reduced creep strength. Precipitation of coarse VN particles affected the toughness, i.e. reduced the toughness in both the base material and welded joint.

For 77, the nitrogen content was insufficient such that, in particular, strengthening by precipitation within grains due to VN precipitation did not occur, which increased the apparent mobility of dislocations, reducing the creep strength in both the base material and welded joint. For 78, the amount of N added was excessively large, which promoted precipitation of Vn such that VN either coarsened early or bonded with Nb and thus (Nb, V)$_2$N-type Z phase precipitated early and coarsened early, reducing creep strength.

For 79, the added amount of W, which is an optional element, was excessively large, and precipitated as x phase, rather than the intended inter-metallic compound Fe$_2$W-type Laves phase during hot working at high temperatures, which reduced hot workability and produced a large number of fine cracks in the steel, significantly reducing toughness and making it impossible to perform welding or creep testing.

For 80, the added amount of Re, which is an optional element, was excessively large, and thus coarse particles of Fe$_2$Re-type Laves phase precipitated early on large-angle grain boundaries such that the grain-boundary coverage with precipitates was improved and the inter-particle distance decreased, but particles themselves became larger, which reduced toughness.

For 81, the added amount of Ti, which is an optional element, was excessively large, which produced clusters of Ti—O-based oxides, reducing the toughness in both the base material and weld heat-affected zone. For 82, similarly, the added amount of Zr, which is an optional element, was excessively large, producing ZrO$_2$ oxide clusters, which reduced the toughness in both the base material and welded joint.

For 83, the added amount of Ni, which is an impurity according to the present invention, was excessively large, which increased the mobility of dislocations, accelerating creep deformation and thus reducing the estimated creep rupture strength in both the base material and welded joint.

For 84, the added amount of Cu, which is again an impurity according to the present embodiment, was excessively large such that, during hot working, Cu accumulated on grain boundaries in the outer layer of the steel plate due to selective oxidation, which caused embrittlement of grain boundaries, resulting in a reduction of the toughness in the base material.

For 85, the added amount of Ca, which is an optional element, was excessively large such that oxides mainly composed of CaO formed clusters whose decomposition temperature was above the melting point of the inventive steel, which reduced the toughness in various portions of the base material and welded joint.

Similarly, for 86, the added amount of Mg, which is an optional element, was excessively large such that oxides mainly composed of MgO formed coarse clusters whose decomposition temperature was above the melting point of the inventive steel, which reduced the toughness in various portions of the base material and welded joint.

Similarly, for 87, the added amount of Y, which is an optional element, was excessively large such that oxides mainly composed of Y$_2$O$_3$ formed coarse clusters whose decomposition temperature was above the melting point of the inventive steel, which reduced the toughness in various portions of the base material and welded joint.

Similarly, for 88, the added amount of Ce, which is an optional element, was excessively large such that oxides mainly composed of Ce$_2$O$_3$ formed coarse clusters whose decomposition temperature was above the melting point of the inventive steel, which reduced the toughness in various portions of the base material and welded joint.

Similarly, for 89, the added amount of Ce, which is an optional element, was excessively large such that oxides mainly composed of La$_2$O$_3$ formed coarse clusters whose decomposition temperature was above the melting point of the inventive steel, which reduced the toughness in various portions of the base material and welded joint.

For 90, the added amount of Al, which is categorized as an impurity in the inventive steel, was excessively large, which produced coarse AlN particles and reduced the toughness, and reduced production of VN and increased the apparent mobility of dislocations within grains, reducing the creep strength in the base material and welded joint.

For 91, B, whose added amount is limited according to the present invention, was added in an amount above the upper limit of added amount such that coarse particles of BN precipitated during tempering of the base material and during the post-weld heat treatment of the welded joint, which reduced the toughness in both the base material and welded joint.

For 92, the content of 0, which is an impurity, was higher than 100 ppm such that large amounts of oxide clusters, particularly Cr-based and Mn-based clusters were produced, which reduced the toughness in both the base material and welded joint.

93 and 94 are comparative examples relating to the pre-weld heat treatment conditions, which are crucial in the present invention. For 93, the pre-weld heat treatment was performed within the temperature range of the present invention, but the holding time was only 1 minute such that carbides, which had locally precipitated as coarse particles, remained incompletely dissolved, which reduced the grain-boundary coverage with grain-boundary precipitates in these portions and increased the average grain size of the particles themselves, increasing the inter-particle distance on grain boundaries and reducing the creep strength in the weld heat-affected zone, i.e. causing Type IV damage. For 94, the heat treatment time exceeded 30 minutes and no carbides from incomplete dissolution remained; however, in the heat-affected zone during the pre-weld heat treatment, not only did the heated weld edge heated the interior of the steel, but also other surfaces that reflected heat caused heat accumulation, thus making the temperature distribution inconstant; thus, in the outer fringe of the heat affected zone of the pre-weld heat treatment, M$_{23}$C$_6$-type carbides coarsened, which reduced the coverage, increased the average grain size and increased the inter-particle distance, causing Type IV damage. In this case, the change in the state of the carbide particles, essentially, did not represent a HAZ, but represented a portion that was subjected to substantially the same heat history as a HAZ; accordingly, the measurement result of the change in this microstructure is shown in the HAZ column.

Similarly, for 95, the heating temperature, which is a limitation relating to the pre-weld heat treatment, was below 1050° C., i.e. low, such that γ single phase was not obtained;

thus, in the γ phase that had been produced due to partial transformation shown in FIG. 3, carbide particles were not sufficiently dissolved due to the low temperature, resulting in a large number of remaining carbide particles that were not completely dissolved, which reduced grain-boundary coverage, increased the average grain size and increased the inter-particle distance, causing Type IV damage. For 95, the pre-weld heat treatment temperature was excessively high, coarsening the prior γ grains in size and reducing the toughness in the base material.

For 97, the operation width of the pre-weld heat treatment, i.e. the pre-weld heat treatment depth did not reach 30 mm, and thus portions of the HAZ were located outside the depth (or width) on which the pre-weld heat treatment was performed such that the effect of the pre-weld heat treatment was not obtained; in these portions, incomplete dissolution of carbides, coarsening of grains in size, a reduction of grain-boundary coverage and an increase of inter-particle distance were observed; thus, Type IV damage occurred from these portions, reducing the creep rupture strength of the welded joint.

For 98, if the operation region of the pre-weld heat treatment is defined as central portions in the plate thickness that are heated to the $Ac_3$ point or higher, this region exceeded 50% such that the entire member was heated, as with 94; thus, reflection of heat and heat accumulation, i.e. factors other than heat transfer from the heated edge surface, made the temperature distribution of the pre-weld heat treatment inconstant such that $M_{23}C_6$-type carbides on the outer fringe of the heat-affected zone of the pre-weld heat treatment coarsened, which reduced the grain-boundary coverage, increased the average grain size and increased the inter-particle distance, causing Type IV damage. In this example, too, the change in the state of carbide particles, essentially, did not represent a HAZ, but represented a portion that was subjected to the same heat history as a HAZ; accordingly, the measurement result of the change in this microstructure is shown in the HAZ column.

For 99, the temperature of the post-weld heat treatment was low, and the average grain size of the $M_{23}C_6$-type carbides was small but the amount of precipitation was insufficient, which reduced the grain-boundary coverage with such particles and thus increased the average inter-particle-surface distance; as a result, although a low-ductility fracture such as Type IV damage did not occur, the creep strength of the welded joint decreased.

For 100, the post-weld heat treatment temperature was excessively high, such that the average grain size of $M_{23}C_6$-type carbides on grain boundaries was large; as a result, the inter-particle distance was large and the grain-boundary coverage with particles decreased; thus, although a low-ductility fracture such as Type IV damage did not occur, the creep strength of the welded joint decreased.

For 101, the post-weld heat treatment temperature was appropriate but the heat treatment time was short; thus, the remaining stresses that were produced during welding of the welded joint were not sufficiently removed, which reduced the toughness of the welded joint, i.e. bond. For 102, the post-weld heat treatment time was excessively long, such that softening of the welded portion reduced welded strength, which reduced the creep rupture strength of the welded joint. This example exceeded the specified ranges of temperature and holding time specified by formula (1). However, this is not a reduction in strength caused by Type IV damage.

The invention claimed is:

1. A method of manufacturing a welded structure of a ferritic heat-resistant steel including a base material, a weld heat-affected zone and a weld metal, comprising:
   the step of preparing the base material, the base material having a chemical composition including, in mass %:
   0.05 to 0.12% C;
   0.02 to 0.45% Si;
   0.40 to 0.80% Mn;
   8.0 to 12.0% Cr;
   0.003 to 0.080% N;
   0.30 to 1.30% Mo;
   0.005 to 0.10% Nb;
   0.005 to 0.50% V;
   0 to 2.0% W;
   0 to 3.5% Re;
   0 to 0.15% Ti;
   0 to 0.15% Zr;
   0 to 0.0050% Ca;
   0 to 0.0050% Mg;
   0 to 0.0500% Y;
   0 to 0.0500% Ce; and
   0 to 0.0500% La,
   Ni being limited to below 0.20%,
   Cu below 0.20%,
   B below 0.005%,
   Al below 0.025%,
   P below 0.020%,
   S below 0.010%, and
   O below 0.010%,
   the balance being Fe and impurities;
   the step of forming an edge on the base material;
   a pre-weld heat treatment step in which a region located between a surface of the edge and a position distant from the surface of the edge by a pre-weld heat treatment depth of 30 to 100 mm is heated to a temperature of 1050 to 1200° C. and is held at this temperature for 2 to 30 minutes;
   a welding step in which, after the pre-weld heat treatment step, the edge is welded to form the weld metal; and
   a post-weld heat treatment step in which, after the welding step, a region located between the surface of the edge and a position distant from the surface of the edge by a distance not smaller than the pre-weld heat treatment depth and not greater than 100 mm is heated to a temperature of 720 to 780° C. and is held at this temperature for a time period not shorter than 30 minutes and satisfying the following formula, (1):

$$(\text{Log}(t)+12)\cdot(T+273)<13810 \quad (1),$$

where t is the holding time and T is the temperature; the unit of t is hour and the unit of T is ° C.; and Log is the common logarithm.

2. The method of manufacturing a welded structure of a ferritic heat-resistant steel according to claim 1, wherein the pre-weld heat treatment step is performed in two or more divided sub-steps.

3. The method of manufacturing a welded structure of a ferritic heat-resistant steel according to claim 1, wherein an average grain size of $M_{23}C_6$-type carbides precipitated on large-angle grain boundaries of the weld heat-affected zone is not greater than 300 nm, each of the large-angle grain boundaries being a grain boundary with an angle relative to an adjacent crystal grain of 15° or larger,
   an average inter-particle-surface distance of the $M_{23}C_6$-type carbides on the large-angle grain boundaries is not greater than 200 nm, and a coverage of the large-angle grain boundaries with the $M_{23}C_6$-type carbides is not smaller than 40%, and wherein M in the $M_{23}C_6$-type carbides is one or more of Cr, Fe, Mo and W in a total of 70 atom % or more.

4. The method of manufacturing a welded structure of a ferritic heat-resistant steel according to claim 1, wherein the base material has a chemical composition including one or two selected from the group consisting of, in mass %:

1.5 to 2.0% W; and 0.5 to 3.5% Re.

5. The method of manufacturing a welded structure of a ferritic heat-resistant steel according to claim 1, wherein the base material has a chemical composition including one or two selected from the group consisting of, in mass %:

0.005 to 0.15% Ti; and 0.005 to 0.15% Zr.

6. The method of manufacturing a welded structure of a ferritic heat-resistant steel according to claim 1, wherein the base material has a chemical composition including one or more selected from the group consisting of, in mass %:

0.0003 to 0.0050% Ca;

0.0003 to 0.0050% Mg;

0.0100 to 0.0500% Y;

0.0100 to 0.0500% Ce; and 0.0100 to 0.0500% La.

* * * * *